US006463537B1

(12) United States Patent
Tello

(10) Patent No.: US 6,463,537 B1
(45) Date of Patent: Oct. 8, 2002

(54) MODIFIED COMPUTER MOTHERBOARD SECURITY AND IDENTIFICATION SYSTEM

(75) Inventor: Jose Alberto Tello, Vancouver (CA)

(73) Assignee: Codex Technologies, Inc. (CA)

( * ) Notice: Subject to any disclaimer, the term of this patent is extended or adjusted under 35 U.S.C. 154(b) by 0 days.

(21) Appl. No.: 09/223,821

(22) Filed: Jan. 4, 1999

(51) Int. Cl.[7] .............................................. G06F 1/24
(52) U.S. Cl. ...................... 713/182; 713/185; 380/277
(58) Field of Search ................................ 713/182, 185, 713/168, 172; 380/277, 255

(56) References Cited

U.S. PATENT DOCUMENTS

| 5,432,941 A | * | 7/1995 | Crick et al. ................... 713/1 |
| 5,613,123 A | * | 3/1997 | Tsang et al. ................... 713/1 |
| 5,675,793 A | * | 10/1997 | Crick et al. ................... 713/1 |
| 5,781,797 A | * | 7/1998 | Crick et al. ................... 710/10 |
| 6,141,705 A | * | 10/2000 | Anand et al. ................. 710/15 |
| 6,233,624 B1 | * | 5/2001 | Hyder et al. ................ 709/327 |

* cited by examiner

Primary Examiner—Thomas R. Peeso
(74) Attorney, Agent, or Firm—Blakely Sokoloff Taylor & Zafman

(57) ABSTRACT

A 'personalized' computer with a unique encrypted digital signature which will not boot up or recognize any data storage or communication peripheral devices without a matching 'personalized' smart card containing a complementary encrypted digital signature. A modified BIOS (Basic Input Output System) replaces the standard BIOS of a motherboard and allows a security engine microprocessor to take over preboot control of the computer from the motherboard CPU (Central Processing Unit), configures and operates the encryption-based security system, and enables or disables selected data storage devices and other user selectable peripherals upon start up and shut down of the computer. This use of a modified BIOS also allows this invention to work with any operating system or computer microprocessor chipset. The enabling or disabling of peripheral devices involves the use of special enabling/disabling circuits and a procedure for checking the security engine for the presence of an encrypted list of allowed peripheral devices before any particular device driver will be operational. A modified DDL (Device Driver Layer), loaded in the hard drive of the computer as part of the resident O/S (Operating System) of the computer, and memory buffer circuits allows a real time encryption system to be in place for any communication or data storage device. A data encryption engine in the security engine microprocessor allows encryption and decryption of all data stored in data storage devices, including the smart card, and moved through communication devices such as a modem. Upon power up, reset or interrupt of the computer, the microprocessor looks for, and if present, reads from the smart card in the smart card reader which is logically connected to the security engine microprocessor. A software program compares a unique digital signature placed in the smart card to a digital signature assigned to the computer. If these two digital signatures are complementary, the boot up procedure is allowed to continue and access to the computer allowed up to a predetermined level depending on the level of access configured on the smart card. This invention can also be used to allow identification and authentication of the computer and its user in networks.

24 Claims, 35 Drawing Sheets

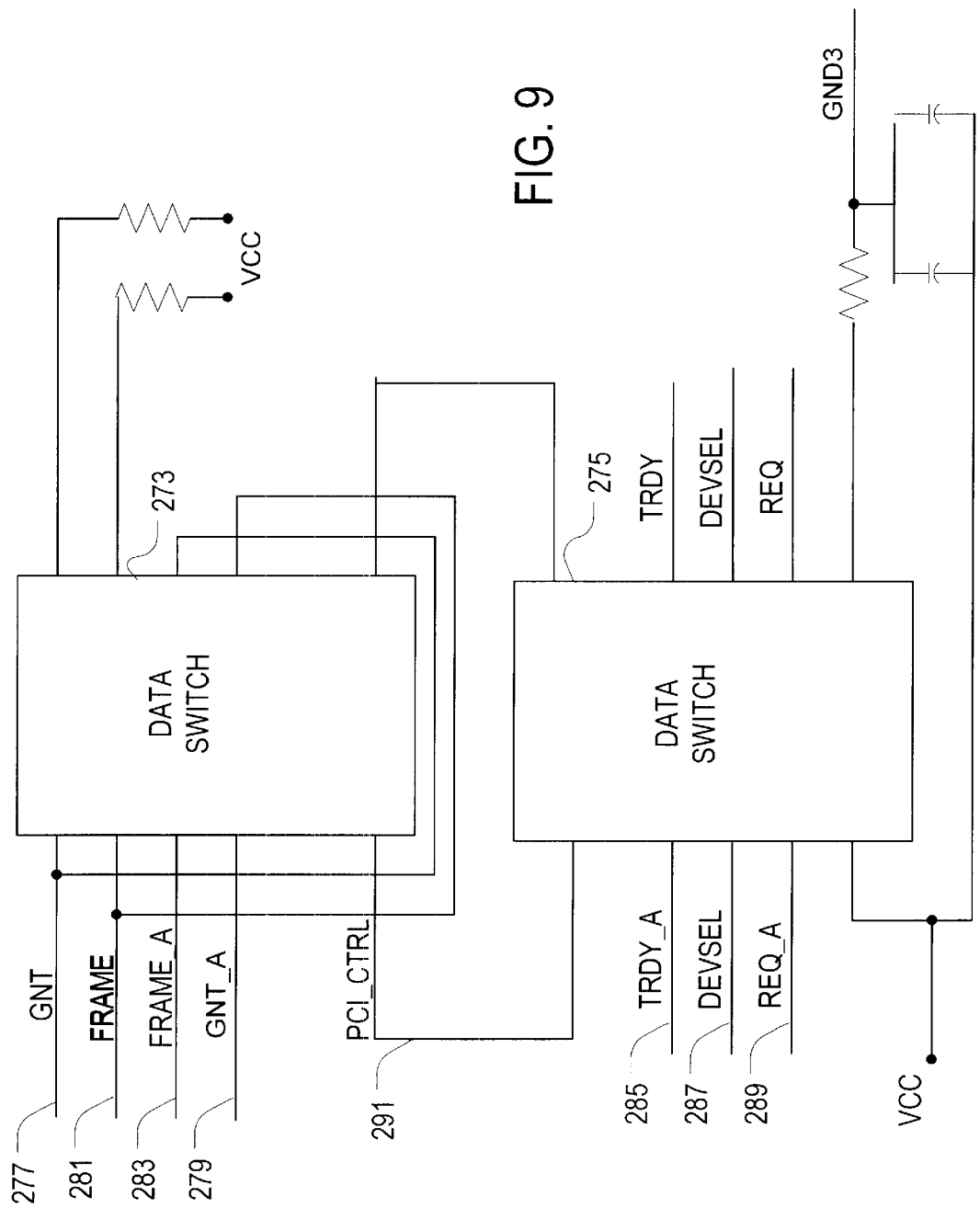

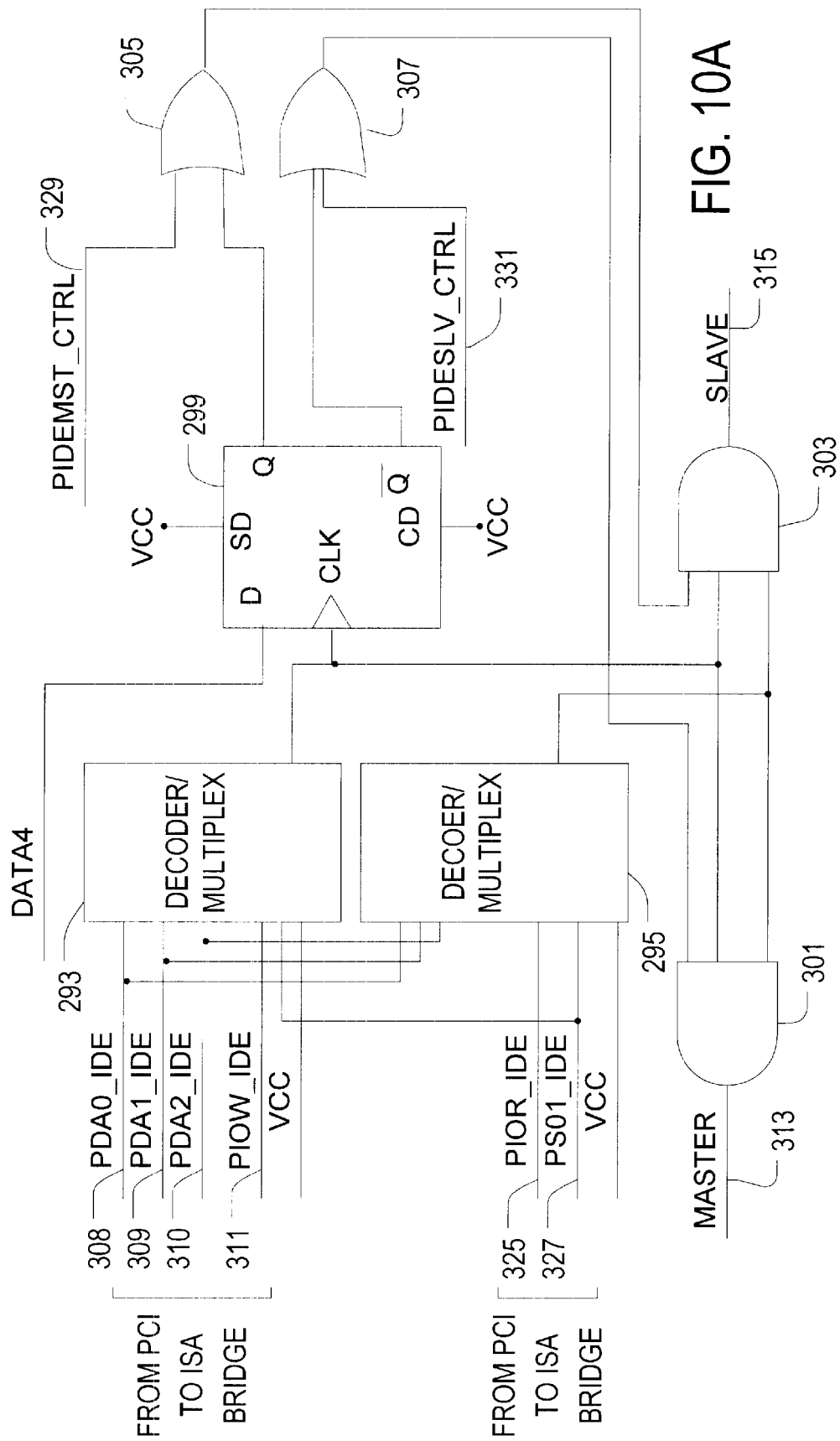

MODIFIED COMPUTER MOTHERBOARD SECURITY AND IDENTIFICATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

TECHNICAL FIELD OF THE INVENTION

The present invention pertains generally to computer security systems, and more specifically to a microprocessor based system to restrict access to a particular computer and deter its theft and secure stored and transmitted data.

BACKGROUND OF THE INVENTION

As the prevalence and importance of computers grows and their portability increases, so too does the need to protect these systems and the data stored within them from unauthorized access and theft. These lead to not only financial costs through the loss of valuable data, perpetration of fraud and sabotage, and the loss of equipment, but also privacy concerns as sensitive information is accessed without authorization. Unauthorized access becomes even more of an issue as the points of access to a computer increase through the use of networks and the Internet.

A wide variety of methods for preventing theft of computer data and equipment and unauthorized access have been developed. One method for securing computers is to physically secure them with some form of restraint or locking device. Typical among these are bolt-down metal enclosures or cable and lock devices which physically secure a computer to the floor or a desk. These devices are effective only as a deterrent to theft of the hardware and do not protect the data stored inside the computer should they be compromised.

To deter access to sensitive data and theft encryption algorithms have been employed to render the data unintelligible to unauthorized users. While the use of this method can protect the data stored in the computer if a secure enough algorithm is used, it is ineffective at deterring theft of the computer itself as all parts of the computer system are still fully functioning and require only that the encrypted data storage device(s) be replaced.

To address the problem of physical theft of the computer some security systems employ a means by which the data stored in the computer system such as the in the hard drive is physically or logically destroyed if unauthorized access is attempted or the computer is tampered with. Logical destruction of the data also destroys the data for authorized users and does not affect the functioning of the data storage device. Physical destruction of the hard drive renders the data and drive useless for both the unauthorized and authorized user but does not incapacitate the entire system as the drive can simply be replaced.

Another method for securing a computer system, specifically the data stored inside, is the use of identification and authentication systems by which a user provides a claimed identity to the system and establishes the validity of this claim before access is granted. The three main methods by which a user's claimed identity is verified are through the use of: 1.) something the individual knows such as a password or PIN (Personal Identification Number); 2.) something the individual possesses, such as a token—a magnetic stripe card or smart card for example; and/or 3.) something unique to the individual, such as a biometric characteristic—retina pattern or fingerprint for example. This method may be effective to a certain degree to deter theft or sabotage of data but is relatively ineffective as a deterrent to actual theft of the computer. In addition all these identification and authentication systems may be by-passed by such techniques as removing the hard drive from the secured machine and placing it in another unsecured machine thereby gaining access to the data stored inside or microscopically reading data stored in ROM (Read Only Memory).

U.S. Pat. No. 4,951,249 to McClung et al., Mar. 23, 1989, describes a personal computer security system which comprises an expansion card, a magnetic card reader, a tilt detecting means, a tamper detecting means and an alarm. This system protects a personal computer in two ways. The first is the physical protection of the hardware through the use of an alarm system which detects attempts to move the computer or tamper with the computer's housing. The second method involves the disabling of the keyboard and floppy drive to prevent the introduction of an unauthorized operating system, and the passing of control immediately prior to the loading of the operating system to a ROM device on the security system board which contains instructions involving the security procedures. One of the main security measures is the use of a magnetic card reader and magnetic card to identify the user of the computer. This system has several weaknesses. One weakness is that the expansion card may be simply removed from the computer slot or replaced by another. The lack of an intelligent device such as a microprocessor on the security board further adds to this weakness. In addition, the passing of control to the security card ROM may be by-passed at the BIOS or pre-boot level through a modification of the computer's BIOS. Another problem with this system is the inherent weakness of magnetic stripe cards. These cards generally lack any intelligent means to prevent copying or reading of the information stored on them. Finally, although the tamper alarm may be somewhat of a deterrent, if an unauthorized user can gain access to the data stored in the computer through methods such as the removal of the hard drive, the lack of encryption security leaves the data totally unprotected.

U.S. Pat. No. 5,146,499, to B. Geffrotin, Sep. 8, 1992 describes a data processing system comprising a pseudo random number generating means, a start up detecting microcircuit, a security microcircuit, and main BUS blocking circuit, all connected to a microprocessor and a smart card reader logically connected to the CPU of the computer. Upon start up of the computer system, an authentication procedure is executed by the microcircuit board in which identifies and authenticates the user through the verification of a smart card involving the comparison of encrypted keys created by the random number generator. Failure of this verification procedure results in a continuous blocking signal being sent to the main BUS shutting down the start up procedure. This differs from the present invention which uses modified device drivers and a number of enable/disable circuits to selectively enable or disable peripherals in the absence of proper authorization. Active physical attack of the security system described in U.S. Pat. No. 5,146,499 is prevented by locating part of the standard BIOS in the electronic microcircuit. This security system may be circumvented through the removal of the security microcircuit board and the reinstallation of a new BIOS in the EPROM (Electrically Programmable Read Only Memory) memory of the computer system. In addition, information within data storage devices such as the hard drive are not encrypted and therefor can be read by placing these devices in another machine.

U.S. Pat. No. 5,007,082 to M. Cummnins Apr. 9, 1991 describes a computer software encryption apparatus which also operates during the power on stage of the computer start up procedure. This system involves attaching an encryption algorithm to the computer's BIOS and comprises a fixed data storage medium such as a hard drive, a removable data storage medium such as a floppy disk and a buffer area for communicating with both of these data storage devices. Data flowing from the buffer to the removable data storage medium is intercepted and encrypted. Data flowing from the removable data storage medium to the buffer is similarly intercepted and decrypted. As a data security system this invention has many problems. Perhaps most important is the fact that the information on the 'fixed data storage medium' such as a hard drive is not encrypted and may be easily accessed by removing the storage device from the 'secure' computer and installing it in another computer. Also, the BIOS level software program may be replaced by replacing the modified routines stored in the computer's ROM (Read Only Memory) with new routines which do not contain the interrupt and encryption functions. Finally, this security system is hardware specific and must be reconfigured for each different type of computer CPU.

U.S. Pat. No. 5,610,981 to Mooney et al., Mar. 11, 1997 describes a computer access controlling device comprising a microprocessor-controlled card reader interface connected to a smart card reader and the CPU of the computer. The card reader interface includes an encryption engine for encrypting data in a data storage device and a boot ROM containing verification code which is executed during the start up procedure. Identification and authentication of the user is achieved through the asking of one or more predetermined questions once a smart card has been inserted in the card reader. The responses to these questions are compared to the answers stored on the smart card and if they match, the CPU is allowed to access all authorized peripherals. Attempts at unauthorized access will result in either freezing of the system BUS, or logical or physical destruction of data in data storage devices. This differs from the present invention in that the Mooney patent will only operate through an ISA (Interrupt Standard Architecture) Bus and therefor is not suitable for computer systems with the PCI (Peripheral Component Interconnect) Bus which is in common use in many systems. This system is also chipset dependent and must be redesigned for every new motherboard microprocessor chipset. Logical and particularly physical destruction of data represents an extreme measure and may permanently destroy valuable data for authorized users. In addition, simple freezing of the system BUS may be overcome by bypassing the card reader interface board and rebooting the computer. Without a modification to the system BIOS this device is also vulnerable during the ROM scan phase of the BIOS start up routine. An expansion card with on-board ROM could be used to introduce some code which could redirect the computer CPU to perform some unauthorized task at the preboot level.

U.S. Pat. No. 5,187,352 to W. Blair et al, Feb. 16, 1993 also describes a microprocessor controlled security system for computers. This security system involves a microprocessor which reads data from a magnetically encoded card and based on component access and time allotment data responsively sends enable or disable signals through a component interface circuit to the computer system component(s). The components that can be enabled/disabled are limited to the video display device, hard disk drive, and external CPUs of slave computers. The use of magnetically encoded cards presents a major weakness in this system as these cards are easily read and copied and therefor are not very secure.

In January 1998, Phoenix Technologies Inc. and RSA jointly and publicly announced a preboot security system which uses a modified BIOS and encryption engine. In this security system a programmable cipher device or 'cryptoengine' is placed in the bootblock partition of flash memory. This flash memory is protected from unauthorized updates by password and a token which contains the key(s) necessary to conduct such as operation. The security system involves the digital signing of adapter cards and ROM extensions for peripheral devices with the peripheral vendor's private key. During the ROM scan phase of the start up procedure of a computer, the BIOS compares a list of authorized public keys against the digital signatures of peripheral devices encountered during ROM scan. This requires that all approved peripheral devices be digitally signed with the vendor's private encryption key beforehand. Only approved peripheral devices are allowed to load and operate. This system is a bit awkward in that all authorized peripheral devices must have digital signatures embedded in them by the device vendor or manufacturer. The system is thus restricted to only those vendors or manufacturers who participate in this digital signature process. In addition, as far as can be determined from information concerning this system released to date, the Phoenix/RSA system differs from the present invention in that peripheral devices are not physically disabled making them accessible and vulnerable to a determined unauthorized user.

There is a need in the art for a computer security system which is less vulnerable to bypass and which, at the same time, deters physical theft of the computer itself by rendering it inoperable in the absence of the proper authorization and identification procedures. There is a further need to protect the data stored in peripheral data storage devices and which is communicated through the computer using a modem or other similar device. There is also a need for a computer security system which is not limited to any one computer CPU but can work universally with a variety of CPU's and does also not require unanimous participation of vendors and manufacturers to one particular standard in order to be effective. There exists a further need for a system which provides a means to identify and authenticate a computer system over a network before allowing it access to the network, in order to protect the security of the network itself and the data stored therein.

BRIEF SUMMARY OF THE INVENTION

The present invention overcomes the limitations of the prior art by providing a means for controlling access to a computer and sensitive data stored on its data storage devices at the pre-boot phase and during operation of the computer. The present invention provides a means for identifying and verifying the identity of authorized users through smart card identification performed at the BIOS level, the real time protection of sensitive data stored in data storage devices and communicated through devices such as a modem with encryption algorithms, restricting access to certain peripheral devices of a computer system through the use of individually configured smart cards and computers. It also acts as a deterrent to theft by providing the means to incapacitate the computer system by disabling peripheral devices in the absence of the proper authorization and identification procedure. This invention acts as a deterrent to theft in a similar manner to car radio systems which have removable face plates. In the case of this computer security system, the knowledge that without the proper smart card the computer will not operate, acts a deterrent to would be thieves. The invention comprises a modified motherboard with a microprocessor based security engine, enabling and disabling circuits, memory buffer circuits, and a modified BIOS, modified DDL, and a smart card reader and smart cards.

Upon power up or interrupt of the computer, the modified BIOS takes control and allows the security engine microprocessor to look for, and if present, read from a smart card in the smart card reader which is logically connected to the security engine microprocessor. If the smart card and the computer have not been previously 'personalized' a security setup procedure is initiated and a unique hash number (digital signature) placed in the smart card during the initial set up of the security system and a complementary hash number similarly assigned to the security engine memory. The hash number calculations are based on a set of personal information provided by the holder of a particular smart card and thus each computer and smart card is uniquely 'personalized' for that user. During start up or interrupt of the computer, a software program in the flash memory of the security engine compares the hash numbers in the smart card and the computer. If these two hash numbers are complements, the boot up procedure is allowed to continue and access to the computer allowed up to a predetermined level depending on the level of access configured in the security engine. The level of access allowed is determined by the presence or absence of encrypted keys in the memory of the security engine which are required before any device driver can load and initialize and recognize its respective peripheral communication or data storage device. This enable and disable capability is achieved through the placement of enable/disable circuits between the peripheral device connector and its respective Bus. If the proper smart card is not present in the card reader, no device drivers will be loaded and the computer will not be operable. Provisions are made within this invention to accommodate a hierarchy of users within a computer network and to allow identification and authentication procedures over a network of computers containing the present invention.

BRIEF DESCRIPTION OF THE DRAWINGS

FIG. 9 is a simplified schematic of the PCI slot enable/disable circuit.

FIGS. 10A & 10B together comprise a simplified schematic of the IDE enable/disable circuit.

DETAILED DESCRIPTION OF THE INVENTION

Figure 1:
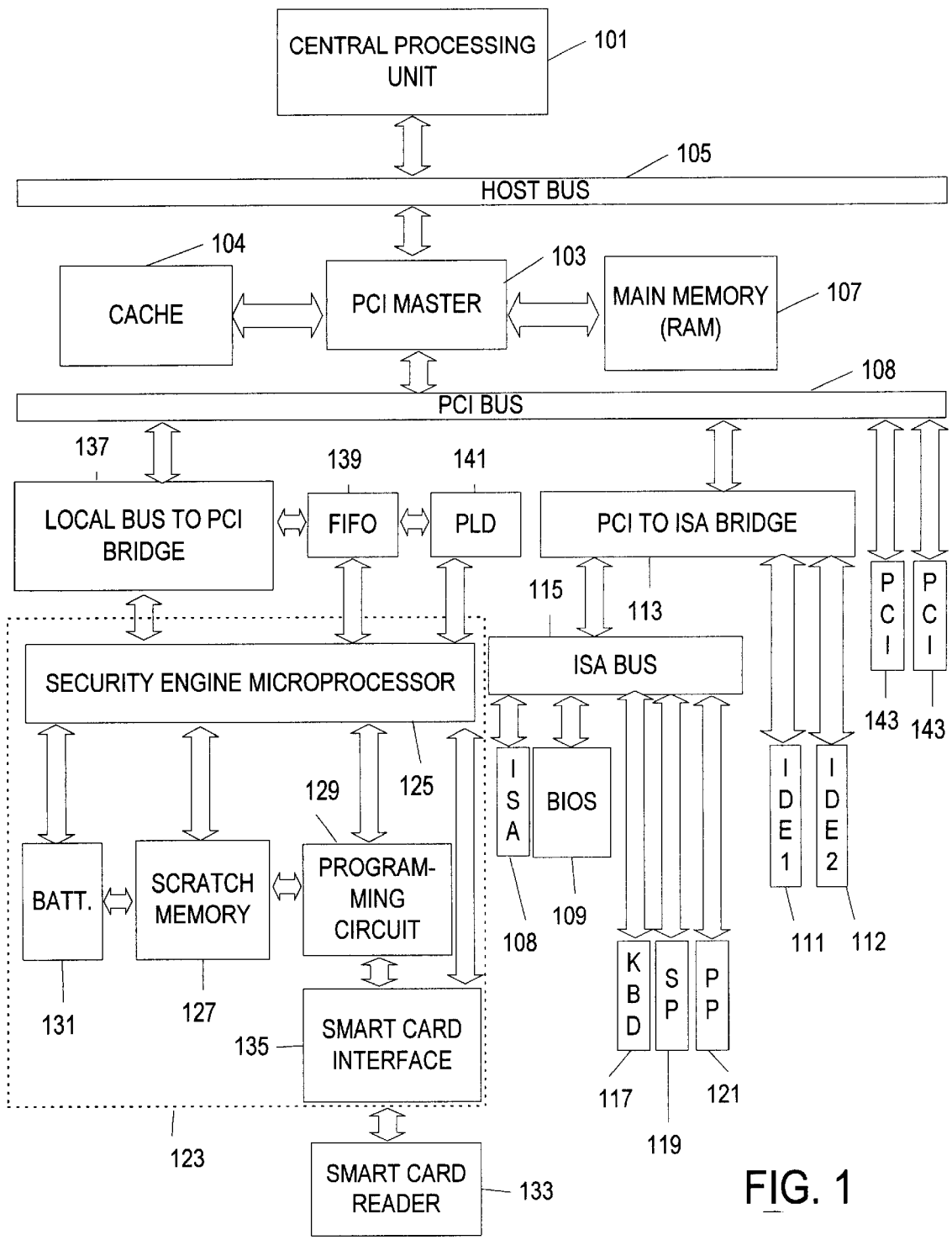
FIG. 1 is a block diagram of a computer motherboard according to the embodiment of the invention.

In one embodiment of the present invention, a microprocessor security engine, enable/disable circuits, memory buffer circuits, smart card reader interface, modified BIOS, and modified device driver layer are incorporated into the design of a standard motherboard to produce a 'security motherboard'. FIG. 1 is a simplified block diagram representing the implementation of this invention in a motherboard of a personal computer. The major functional components of a typical motherboard comprises a CPU 101, a chipset to control all Bus level interactions 103, a system cache 104, memory 107, and a BIOS 109. Peripheral devices such as data storage devices, keyboard, mouse, monitor, and modem are logically connected to the motherboard CPU through the Bus systems. Peripheral data storage devices such as a hard drive or CD ROM drive are connected to the CPU via an IDE interface which is connected to the motherboard main Bus 108 through a bridge circuit 113. Also connected to the main Bus 108 through the bridge circuit is the ISA Bus 115 to which peripheral devices such as the keyboard 117, audio, serial port 119, parallel port 121, and floppy drive controller are connected. The memory device that contains the BIOS 109 also operates through this Bus.

Security Engine

Symbolically represented within dashed lines, the security engine 123 of this invention comprises a microprocessor with internal RAM (random access memory) and flash memory 125 and a scratch memory buffer 127 consisting of SRAM (Static Random Access Memory), a programming circuit 129 and independent battery backup circuit 131.

The battery backup circuit 131 connected to the microprocessor 125 allows the security engine 123 to always have automatic power on during interrupts such as during manual resets and power failures. This also ensures a secure and proper shut down procedure. This same battery also supplies the SRAM of the scratch memory 127. The scratch memory 127 is connected to the security engine microprocessor 125 through two lines. These two lines control the flow of data and address. The amount of data flow can easily be increased through the addition of more SRAM. A power on/power off circuit is connected to the microprocessor and the computer power supply. This allows the security engine to automatically power on during the start up of the computer or after an interrupt.

Figure 2:
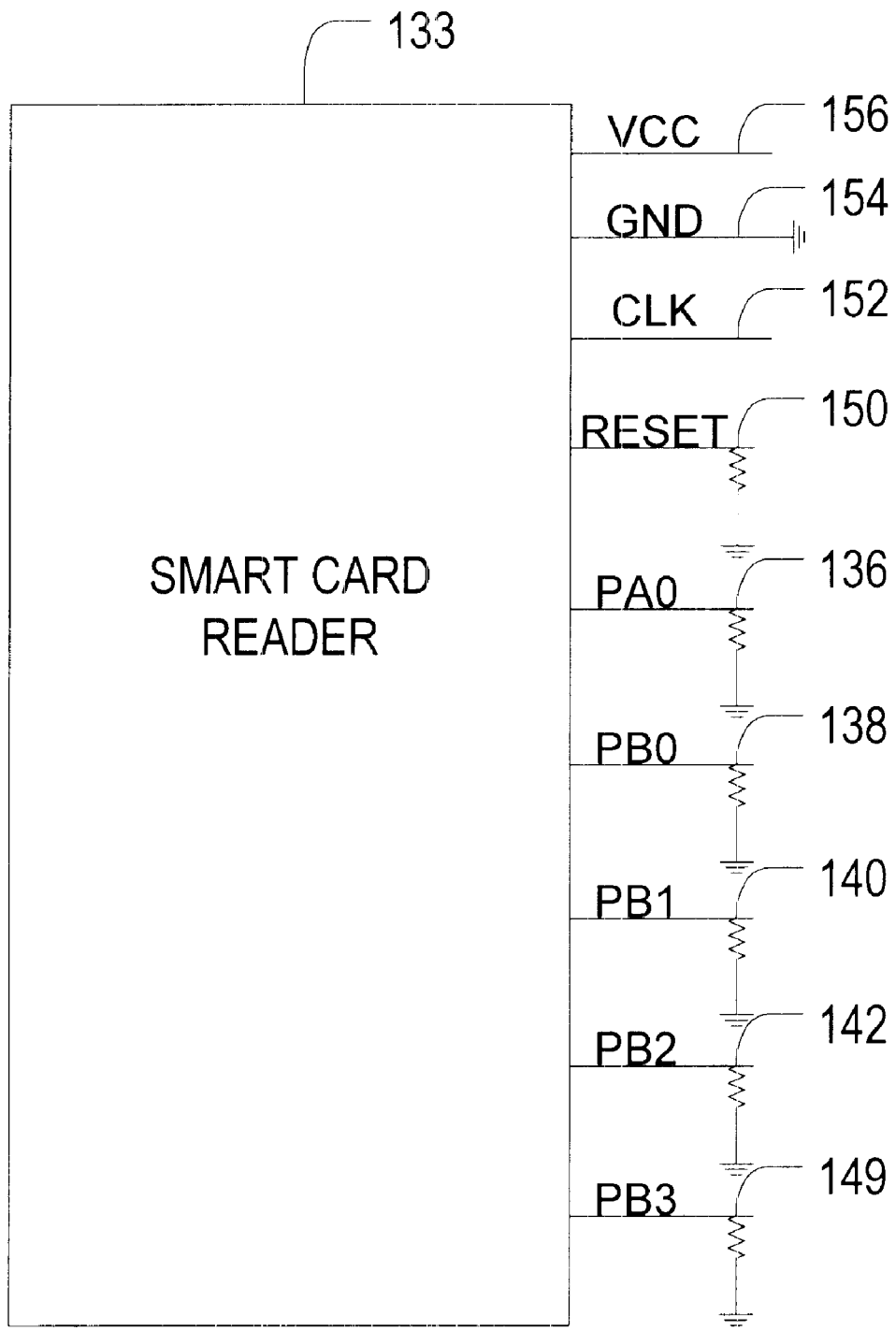
FIG. 2 is a simplified schematic diagram of the smart card interface.
Figure 3:
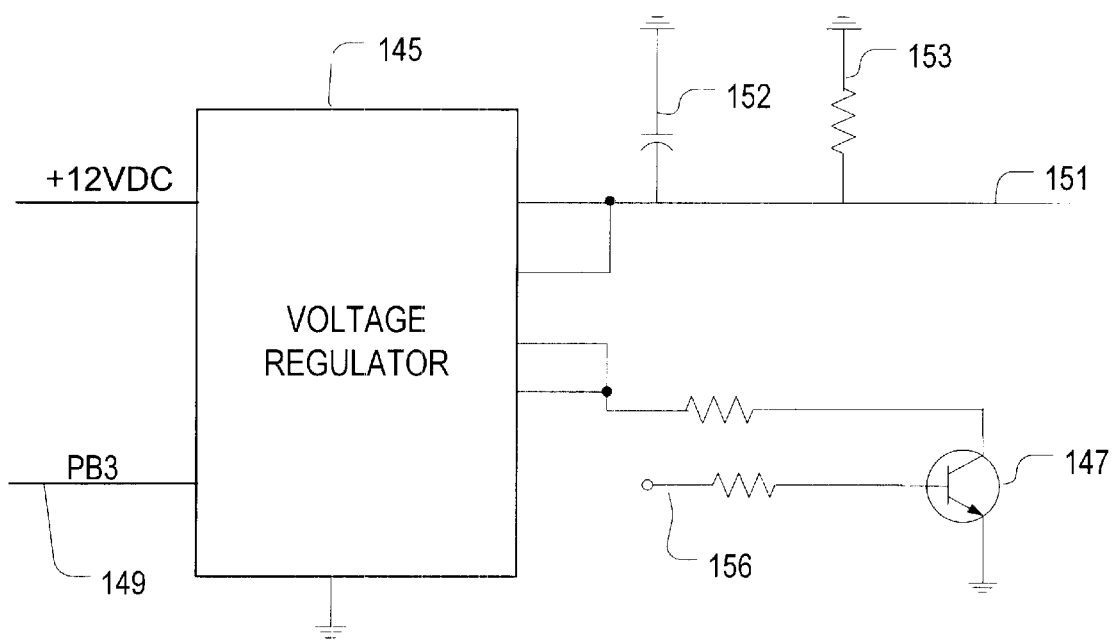
FIG. 3 is a simplified schematic of the programming circuit.

The programming circuit 129 is logically connected to the security engine microprocessor 123, the security engine scratch memory 127, and the smart card reader 133 through the smart card interface 135. The smart card interface 135 is shown in FIG. 2 and is comprised of PA0 136, PB0 138, PB1 140, PB2 142, PB3 149 and Reset 150 lines which have pull down resistors on them, and Clock 152, Ground 154, and (Supply voltage) VCC 156 lines. As shown in FIG. 3, the programming circuit is comprised of an IC (integrated circuit) 145 which is capable of regulating voltage and which is powered from the motherboard power supply, and a TTL (Transistor to transistor logic) latch device 147. The preferred IC is a voltage regulator although one skilled in the art can easily see that other components which perform a similar function may be substituted without materially changing the scope or spirit of the invention. The preferred TTL latch device is a transparent latch although one skilled in the art can easily see that other components which perform a similar function may be substituted without materially changing the scope or spirit of the invention.

The voltage regulator 145 of the programming circuit is connected to the smart card reader 133 through a PB3 line 149 which is part of the smart card interface 135. A Voltage Programmming Power supply (VPP) line 151 connects the voltage regulator 145 to the VPP pin of the security engine microprocessor 125. Logically connected to this line is a noise filter which is comprised of a grounded capacitor 152 and a grounded resistor 153 for the VPP signal. When this VPP line is set to High, the programming circuit 129 is able to burn data into the security engine microprocessor 125 flash memory.

The latch device 147 is logically connected to security engine microprocessor 125 through a multiplicity of data/address lines. Between the latch device 147 and the scratch memory 127 are an equal number of address lines. On the data/address lines between the security engine microprocessor and the TTL latch device 147, data lines connect the address/data lines to the scratch memory 127. The preferred number of data lines is eight to sixteen, although one skilled in the art can see that the number may vary without materially changing the scope or spirit of this invention. The address and data lines between the security engine microprocessor and the scratch memory are multiplexed in order that the security engine microprocessor can read or write data from the scratch memory.

The security engine is logically connected to the computer system's main Bus 108 which is constituted by the data, address and control lines. In the preferred embodiment of this invention, the main Bus is a PCI Bus although one skilled in the art can readily see that any other Bus that performs the same functions can be substituted without materially modifying the spirit and scope of this invention.

As was previously noted, the smart card interface circuit provides lines PA0, PB0, PB1, PB2, PB3, Clock, VCC, Ground and Reset which receive signals from an attached smart card reader 133. With communication lengths of 4, 6, and 8 bits available, the interface for different types of smart cards and other authentication and identification devices is provided.

Other identification and authentication devices are provided for in this invention through an SPI interface that is connected to the security engine microprocessor. This allows for the addition of devices such as a biometric reader to provide a higher level of security to the system.

An interrupt line leads from the security engine microprocessor to various circuits which control the interrupt for the computer CPU, reset, on-off, detecting the presence of a smart card in the reader, and timer. Other interrupts can be added to these in the future.

The flash memory of the security engine's microprocessor contains six encryption algorithms. One algorithm is used for the generation of the hash number from the personalized information entered by the holder of a smart card during the initial security set up. This hash number is used in the identification and authentication of the user of this invention. The preferred algorithm is HAVAL although one skilled in the art can easily see that a similar algorithm may be substituted without materially changing the invention.

This algorithm is used to generate 3 hash numbers (H1, H2, H3) which are generated from the personal information inputted by the user during the set up of the user security system. These hash numbers are stored in the flash memory of the security engine microprocessor 125.

A second algorithm is used for the performance of a second level of encryption to the hash numbers generated by the first algorithm to generate H1', H2'and H3'. The preferred algorithm is a linear congruency function such as XOR although one skilled in the art can easily see that an algorithm with similar characteristics may be substituted without materially changing the invention.

The third algorithm stored in the flash memory of the security engine microprocessor is used to generate a cryptographic key (CK) from H2' and for secure communications between the security engine and the smart card. This algorithm is the same as the one used by the smart card for all communications with the security engine. The preferred algorithm is IDEA although one skilled in the art can easily see that a similar algorithm may be substituted without materially changing the invention.

The fourth algorithm is used for the encryption of data in all peripheral storage devices and which passes through communication devices such as a modem. The preferred algorithm is an elliptic curve although one skilled in the art can easily see that an algorithm with similar characteristics may be substituted without materially changing the invention.

The fifth encryption algorithm is a public key algorithm used to encrypt selected data which is to be passed to or used by another computer or computers which contain this invention. The preferred algorithm is RSA although one skilled in the art can easily see that an algorithm with similar characteristics may be substituted without materially changing the invention.

In order to check for errors in the communications between the smart card and the security engine, the security engine EPROM contains a sixth algorithm which is used to create a CRC matrix. In this embodiment of the invention, the preferred algorithm for the CRC is the Hanuning algorithm, although one skilled in the art can readily see that other algorithms which perform a similar function may be substituted without materially modifying the scope or spirit of this invention.

For all algorithms used in this invention the key length will be limited to a certain maximum size. This allows for conformance to the laws concerning encryption key length established by various countries. The key lengths for the encryption algorithms which are to be available to the user, as determined by the encryption laws of the country in which this invention is used, are set before configuration of the user security system and before it is delivered to the country in which it will be used. The availability of a particular key length is determined by an encrypted key length parameter contained within a vendor smart card which is used to check and prepare the computer system for the set up of the security system. This key length is stored in the vendor smart card during the initial programming of its on board memory.

The flash memory of the security engine microprocessor contains a Real Time Operating System (RTOS). A kernel within the RTOS schedules the management of all tasks that all peripherals perform. As every computer has a different configuration of peripherals, this kernel creates different priorities according to the particular configuration of a specific computer. In order to facilitate this, every peripheral in a particular computer is assigned an adjustable address in the scratch memory of the security engine. All tasks involving a peripheral device pass through this address space and it is here that all encryption and decryption operations take place controlled by the security engine. The order of priority of all peripherals is determined by the computer operating system of the computer in which this invention is implemented.

The programs for all identification and authentication procedures are also stored within the flash memory. This includes storage of the security configuration for the motherboard and smart card(s). In addition, the flash memory contains the software which enables and disables the PCI and ISA slots, keyboard address, parallel port and serial port and facilitates the interface with any Operating System through the BIOS for security related functions.

Written into the flash memory of the security engine microprocessor during its manufacture is also a secret identification number used in the identification of computers containing this invention over a network. This number is the same for all motherboards which contain the present invention.

An encrypted table of smart card code numbers are also stored in the flash memory of the security engine. This table is used during the operation of the invention to identify the purpose and type of smart card inserted in the smart card reader which is logically connected to the security engine.

Enable/Disable Circuits

Figure 4:
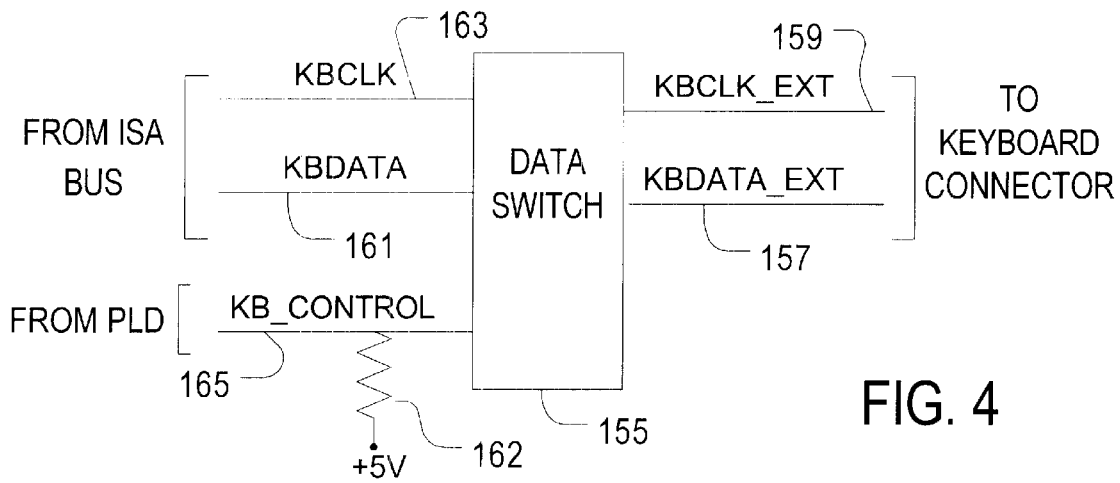
FIG. 4 is a simplified schematic of the keyboard enable/disable circuit.

Contained on the motherboard are a series of circuits which are logically connected to the security engine microprocessor 125 through data and address lines to a programmable device 141 which enables the security engine microprocessor to enable or disable (unhide or hide) peripheral devices during the start up of the computer. The preferred programmable device for this invention is a PLD (programmable logic device) although one skilled in the art would recognize that other components which perform the same function may be substituted without materially modifying the scope or spirit of this invention. This invention comprises the following enable/disable circuits:

Keyboard Enable/Disable Circuit: FIG. 4 shows a simplified schematic of the enable/disable circuit for the keyboard. This circuit comprises a data switch IC 155 with a keyboard data 157 and keyboard clock line 159 logically connected to the keyboard connector, two lines, keyboard data 161 and keyboard clock 163 logically connected to the ISA Bus 115, and a keyboard control line 165 logically connected to the programmable device which is connected to the security engine microprocessor. The preferred data switch IC for this invention is a high speed CMOS 8 bit Bus switch although one skilled in the art would recognize that other components which perform the same function may be substituted without materially modifying the scope or spirit of this invention. The keyboard control line is used to disable or enable the keyboard. Connected to the keyboard control line 165 between the data switch IC 155 and the programmable device 141 is a pull up resistor 162. When the keyboard control line 165 is set to High by the security engine microprocessor 125 via the programmable device 141, the clock 163 and data 161 lines are disabled and any device connected to the keyboard connector is effectively 'hidden' from the motherboard microprocessor 101. When the keyboard control line is set to Low, the pull up resistor 162 drops the line voltage to 0 V and the clock and data lines are enabled allowing the motherboard microprocessor 101 to recognize a device connected to the keyboard connector.

Figure 5:
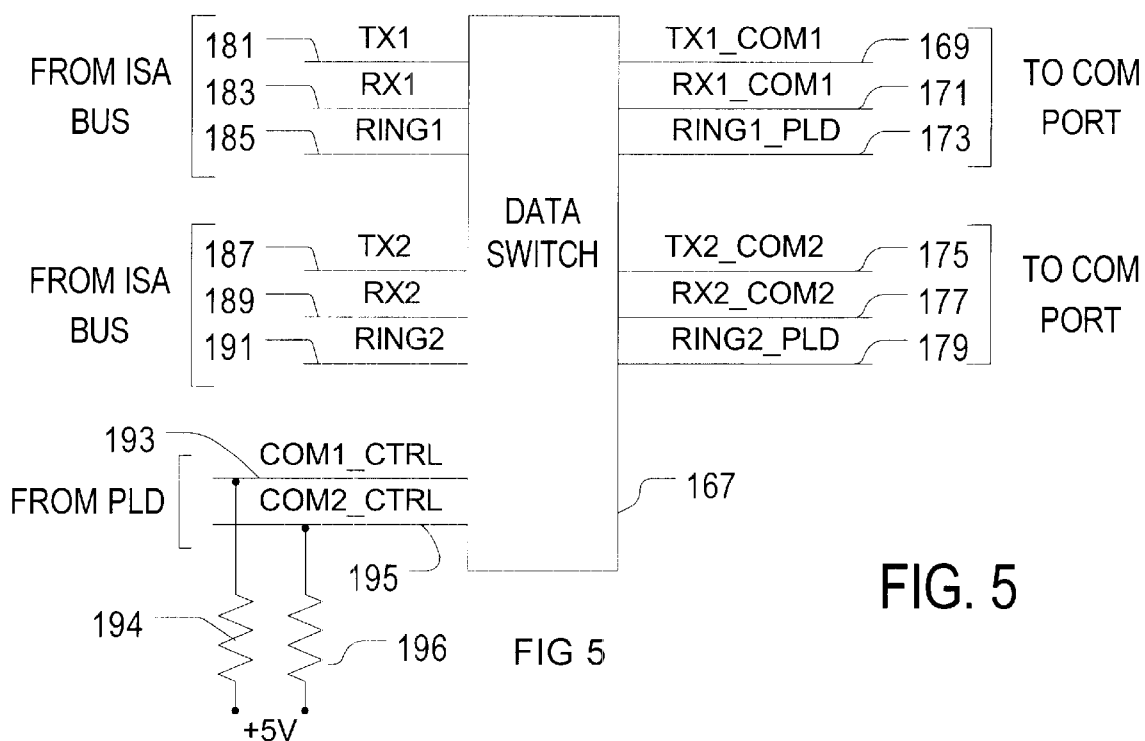
FIG. 5 is a simplified schematic of the COM port enable/disable circuit.

COM (Communications) Port Enable/Disable Circuit: FIG. 5 shows a simplified schematic of this circuit. This circuit comprises a data switch IC 167 with three lines, TX1 (transmit) 169, RX1 (receive) 171 and RING1 173 logically connected to one COM (Serial) port, another three TX2 (transmit) 175, RX2 (receive) 177 and RING2 179 lines logically connected to a second COM port if present, six lines TX1 181, RX1 183, RING1 185, TX2 187, RX2 189, and RING2 191 logically connected to the ISA Bus 115, and two COM Port control lines 193 & 195 logically connected to the programmable device 141 which is connected to the security engine microprocessor. The preferred data switch IC for this invention is a high speed CMOS 8 bit Bus switch although one skilled in the art would recognize that other components which perform the same function may be substituted without materially modifying the scope or spirit of this invention. One of the COM Port control lines, COM1_CONTROL 193, is used to disable or enable COM Port 1. COM2_CONTROL 195 is used to disable or enable COM Port 2. Connected to the COM1_CONTROL line 193 and COM2_CONTROL line 195 between the data switch IC 167 and the programmable device 141 is a pull up resistor 194 & 196 on each line. When COM1_CONTROL or COM2_CONTROL is set to High by the security engine microprocessor via the programmable device, the TX, RX, and RING lines are disabled and any device connected to the COM port is effectively 'hidden' from the motherboard microprocessor. When COM1_CONTROL or COM2_CONTROL is set to Low, the pull up resistor drops the line voltage to 0 V and the TX, RX, and RING lines are enabled allowing the motherboard microprocessor to recognize a device connected to the COM port. Through this circuit, up to two COM ports are independently enabled or disabled.

Figure 6:
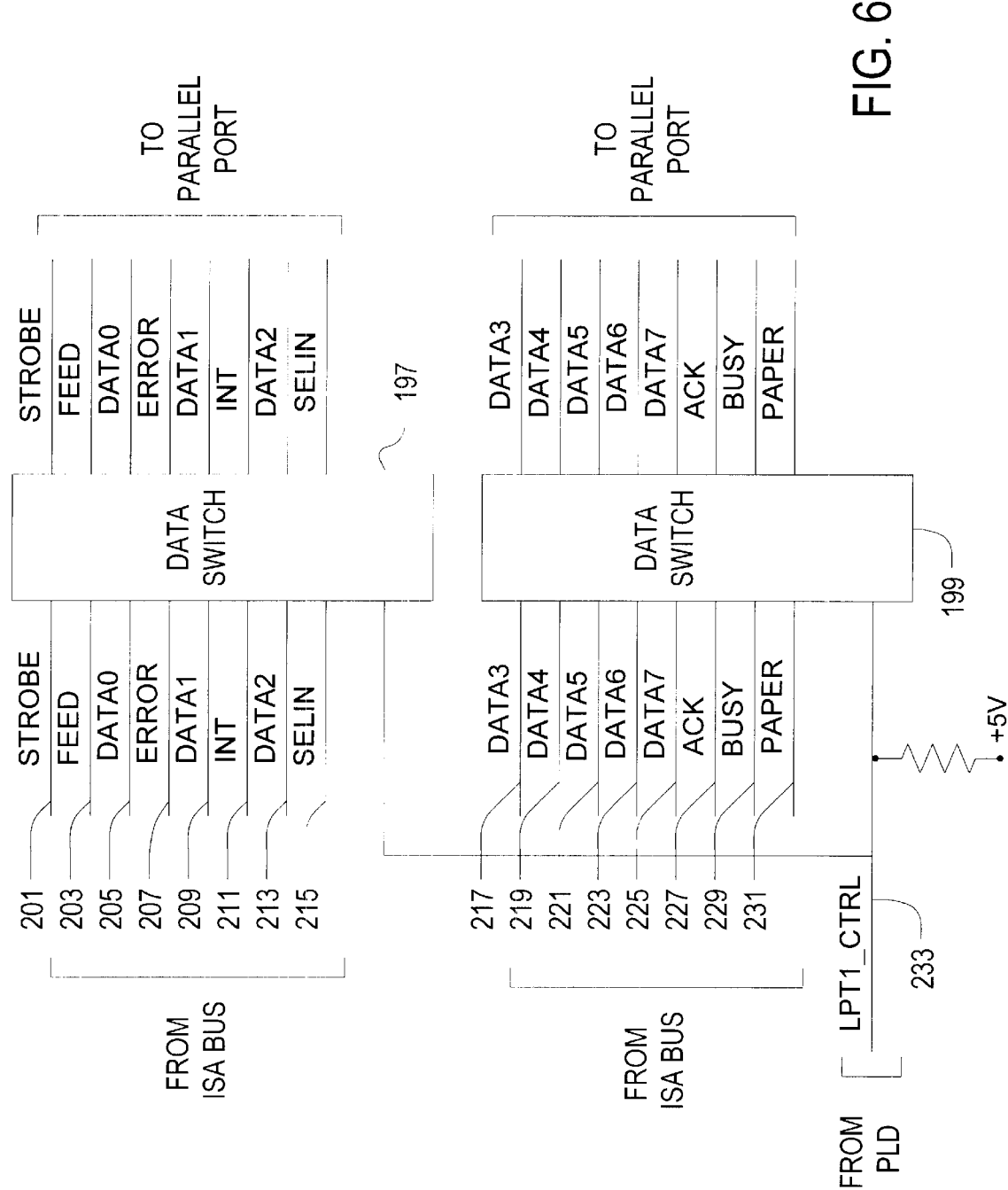
FIG. 6 is a simplified schematic of the Parallel port enable/disable circuit.

Parallel Port Enable/Disable Circuit: As shown in FIG. 6, this circuit comprises two identical data switch ICs 197 & 199 with eight lines of one of the data switches, STROBE 201, FEED 203, DATA0 205, DATA1 207, DATA2 209, ERROR 211, INT 213 and SELIN 215 logically connected to the ISA Bus 115, and eight corresponding lines logically connected to a parallel port connector. On the second data switch, eight lines, DATA3 217, DATA4 219, DATA5 221, DATA6 223, DATA7 225, ACK 227, BUSY 229, and PAPER 231 are logically connected to the ISA Bus 115, and eight corresponding lines, logically connected to the parallel port connector. A control line, LPT1_CTRL 233, logically connects one of the data switch ICs to the programmable device 141 which is connected to the security engine microprocessor. This control line is logically connected to both data switch ICs. The preferred data switch IC for this invention is a high speed CMOS, 8 bit, low resistance, Bus switch although one skilled in the art would recognize that other components that perform the same function may be substituted without materially modifying the scope or spirit of this invention. The line LPT1_CTRL 233 is used to disable or enable the parallel port. Connected to the control line between the data switch ICs 197 & 199 and the programmable device 141 is a pull up resistor. When this control line is set to High by the security engine microprocessor the two sets of eight lines for both data switch ICs are disabled and any device connected to the parallel port is effectively 'hidden' from the motherboard microprocessor. When the control line is set to Low, the pull up resistor drops the line voltage to 0 V and the lines are enabled allowing the motherboard microprocessor to recognize a device connected to the parallel port.

Figure 7:
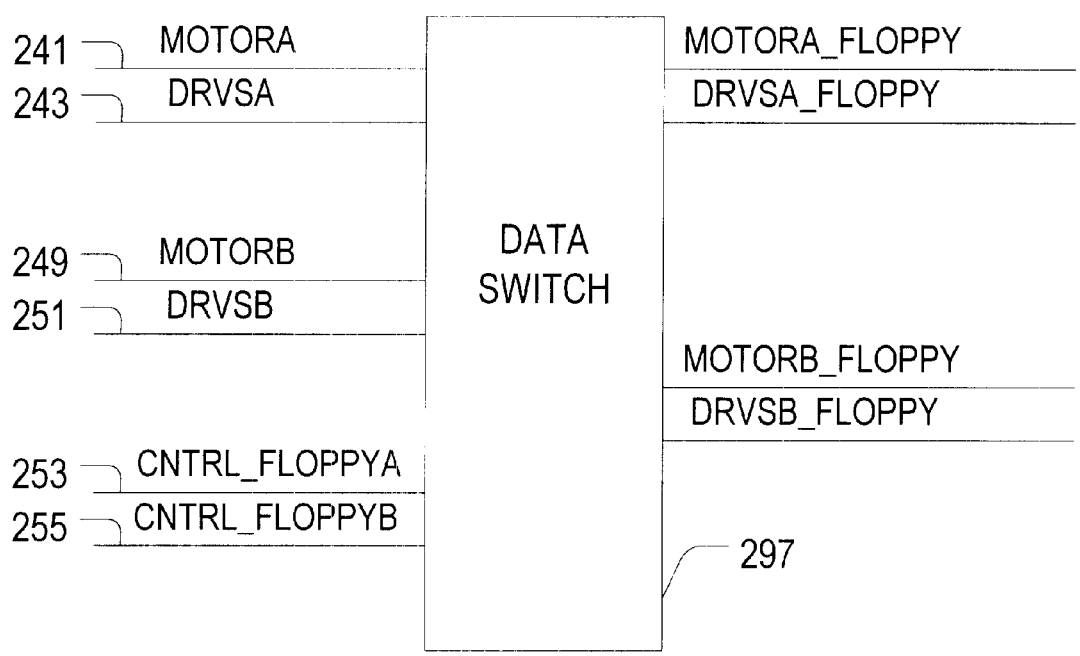
FIG. 7 is a simplified schematic of the floppy drive enable/disable circuit.
Figure 8:
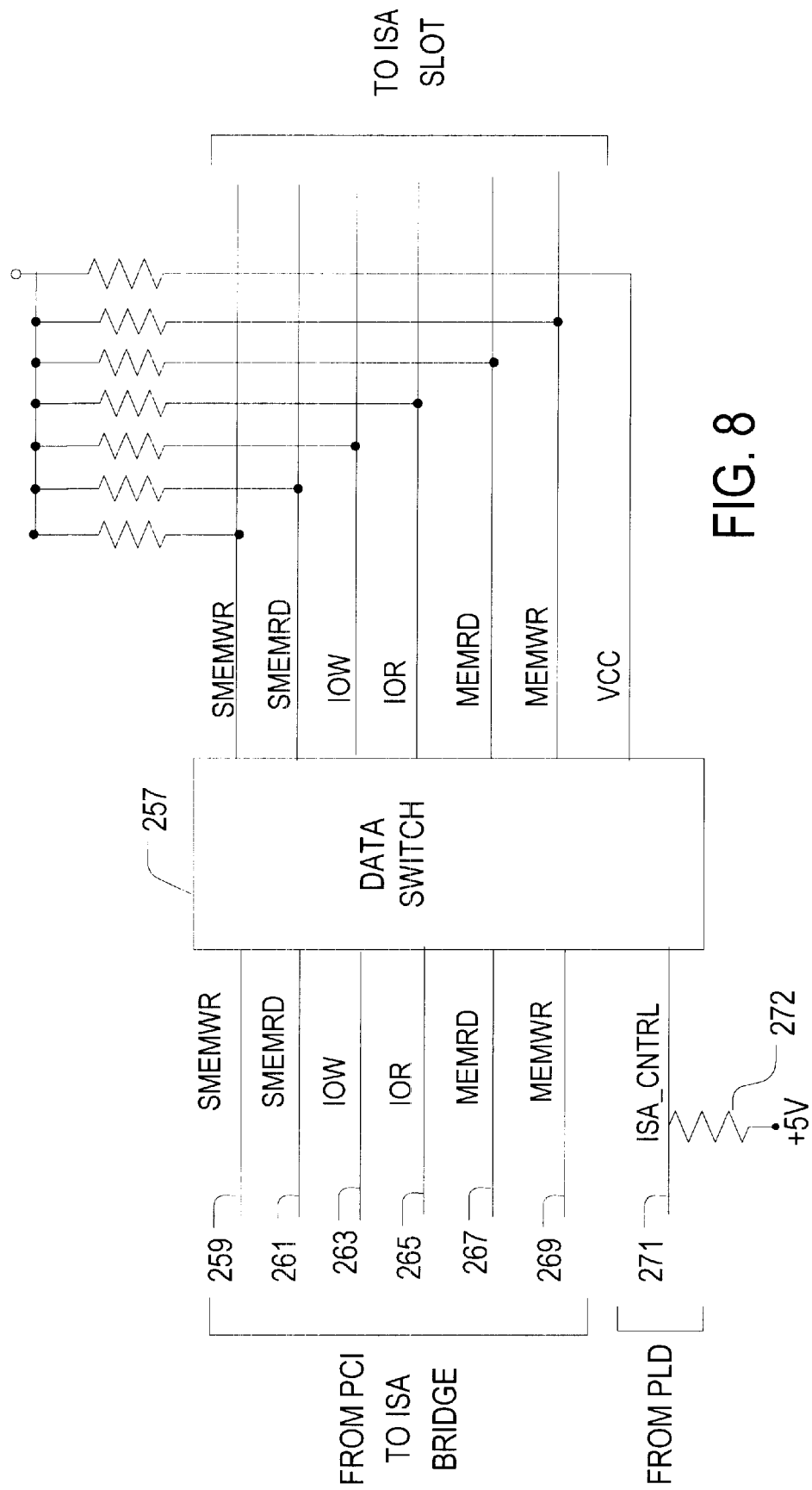
FIG. 8 is a simplified schematic of the ISA slot enable/disable circuit.

Floppy Drive Enable/Disable Circuit: FIG. 7 shows the floppy drive enable/disable circuit. This circuit comprises a data switch IC 235 with two lines, MOTORA (motor) 237 and DRVSA (floppy drive head) 239 logically connected to one floppy drive connector, two corresponding lines 241 & 243 connected to the ISA to PCI bridge 113, another two lines, MOTORB 245 and DRVSB 247 logically connected to a second floppy drive connector if present, two corresponding lines 249 & 251 connected to the ISA to PCI bridge 113, and two floppy drive control lines, CTRL_FLOPPYA 253 and CTRL_FLOPPYB 255, logically connected to the programmable device 141 which is connected to the security engine microprocessor through a programmable device. The preferred data switch IC for this invention is a high speed CMOS 8 bit Bus switch although one skilled in the art would recognize that other components which perform the same function may be substituted without materially modifying the scope or spirit of this invention. One of two floppy drive control lines, CTRL_FLOPPYA 253, is used to disable or enable one floppy drive. CTRL_FLOPPYB 255 is used to disable or enable a second floppy drive if present. Connected to the CTRL_FLOPPYA line 253 between the data switch IC 235 and the programmable device 141 is a pull up resistor and a second pull up resistor is also connected to the CTRL_FLOPPYB line 255 between the data switch IC 235 and the programmable device 141. When CTRL_FLOPPYA 253 or CTRL_FLOPPYB 255 is set to High by the security engine microprocessor via the programmable device 141, the MOTOR and DRVS lines are disabled and any device connected to the floppy drive connector is effectively 'hidden' from the motherboard microprocessor. When CTRL_FLOPPYA or CTRL_FLOPPYB is set to Low, the pull up resistor drops the line voltage to 0 V and the MOTOR and DRVS lines are enabled, allowing the motherboard microprocessor to recognize a device connected to the floppy drive connector. Through this circuit, up to two floppy drive connectors are independently enabled or disabled. ISA Slot Enable/Disable Circuit: This circuit, as shown in FIG. 8, can independently enable/disable up to three ISA slots. The circuit for enabling/disabling a single ISA slot is comprised of a single data switch IC 257 with six lines: SMEMWR (system memory write) 259, SMEMRD (system memory read) 261, IOW (I/O write) 263, IOR (I/O read) 265, MEMRD (memory read) 267 and MEMWR (memory write) 269 logically connected to the PCI to ISA Bridge 113, and six corresponding lines logically connected to an ISA slot. A control line, ISA_CTRL 271, logically connects the data switch IC 257 to the programmable device 141 which is connected to the security engine microprocessor 125. The preferred data switch IC for this invention is a high speed CMOS, 8 bit, Bus switch although one skilled in the art would recognize that other components which perform the same function may be substituted without materially modifying the scope or spirit of this invention. The line ISA_CTRL 271 is used to disable or enable the ISA slot 108. Connected to the control line 271 between the data switch IC 257 and the programmable device 141 is a pull up resistor 272. When this control line 271 is set to High by the security engine microprocessor 125 the two sets of six lines for the data switch IC 257 are disabled and any device connected to the ISA slot 108 is effectively 'hidden' from the motherboard microprocessor 101. When the control line 271 is set to Low, the pull up resistor 272 drops the line voltage to 0 V and the lines are enabled allowing the motherboard microprocessor 101 to recognize a device connected to the ISA slot 108. PCI Slot Enable/Disable Circuit: The simplified schematic for the PCI slot enable/disable circuit is shown in FIG. 9. This circuit can enable/disable up to four PCI slots. The circuit for enabling/disabling a single PCI slot is comprised of two data switch ICs 273 & 275 with two GNT (grant) lines 277 & 279 and two FRAME (cycle frame) lines 281 & 283 logically connecting the first data switch IC 273 to the PCI Master 103. From the second data switch IC 275 in the enable/disable circuit TRDY (target ready) 285, DEVSEL (device select) 287 and REQ (request) 289 lines are logically connected to the PCI Master 103 and three corresponding lines are connected to a PCI slot. A control line, PCI CTRL 291, logically connects both data switch ICs 273 & 275 to the programmable device 141 which is connected to the security engine microprocessor 125. This control line is logically connected to both of the data switch ICs. The preferred data switch IC for this invention is a high speed CMOS, 8 bit, Bus switch although one skilled in the art would recognize that other components which perform the same function may be substituted without materially modifying the scope or spirit of this invention. The line PCI_CTRL 291 is used to disable or enable the PCI slot. Connected to the control line between the data switch IC and the programmable device is a pull up resistor. When this control line is set to High by the security engine microprocessor, the two GNT 277 & 279 and two FRAME lines 281 & 283, TRDY 285, DEVSEL 287 and REQ 289 lines are disabled and any device connected to the PCI slot is effectively 'hidden' from the motherboard microprocessor. When the control line is set to Low, the pull up resistor drops the line voltage to 0 V and the lines are enabled allowing the motherboard microprocessor to recognize a device connected to the PCI slot.

Figure 10B:
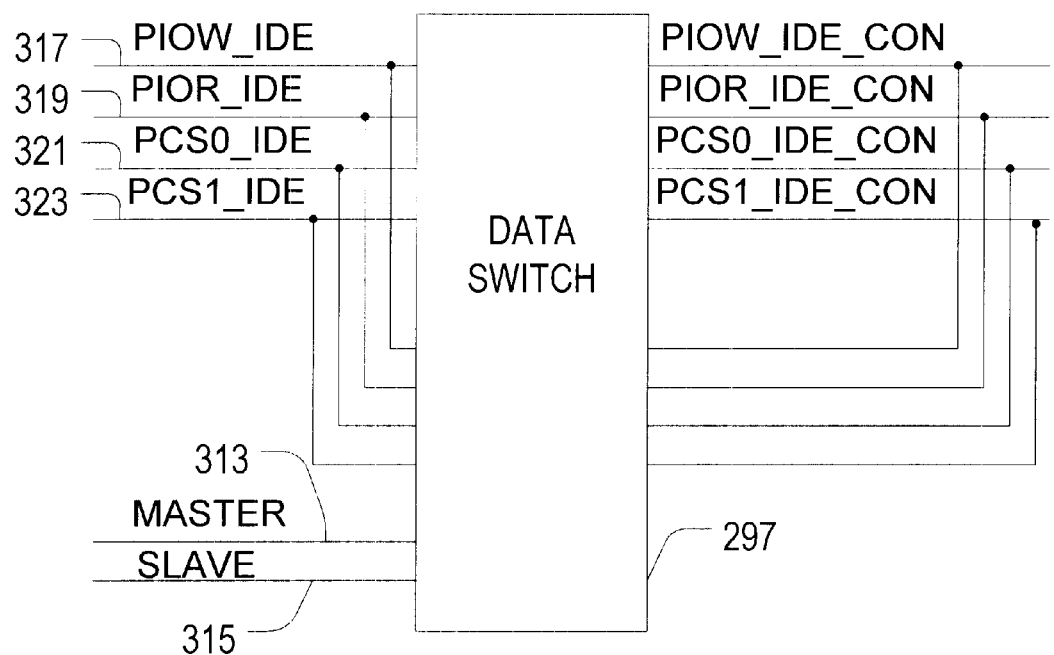

IDE Enable/Disable Circuit: FIGS. 10A & 10B show the IDE enable/disable circuit. This circuit can enable/disable up to two IDE slots, either in the Primary IDE 111 or in the Secondary IDE 112. The circuit for enabling/disabling the Primary IDE is comprised of two decoder/multiplexer ICs 293 & 295, one data switch IC 297, a FLIP FLOP IC 299, two Positive 'AND' gates 301 & 303, and two Positive 'OR' gates 305 & 307. A matching circuit is used to enable/disable the Secondary IDE. The following description of the enable/disable circuit is for the Primary IDE but an identical circuit is required to enable/disable the Secondary IDE. One entire circuit is required for the Primary IDE and one for the secondary IDE.

The preferred decoder/multiplexer IC for this invention is a three line to eight line decoder/multiplexer although one skilled in the art would recognize that other components which perform the same function may be substituted without materially modifying the scope or spirit of this invention. The preferred data switch IC for this invention is a high speed CMOS, 8 bit, Bus switch although one skilled in the art would recognize that other components which perform the same function may be substituted without materially modifying the scope or spirit of this invention. The preferred FLIP FLOP IC for this invention is a dual D-type positive edge triggered FLIP FLOP with preset and clear although one skilled in the art would recognize that other components which perform the same function may be substituted without materially modifying the scope or spirit of this invention. The preferred 'AND' gate for this invention is a triple three input positive 'AND' gate although one skilled in the art would recognize that other components which perform the same function may be substituted without materially modifying the scope or spirit of this invention. The preferred 'OR' gate for this invention is a quadruple two input positive 'OR' gate although one skilled in the art would recognize that other components which perform the same function may be substituted without materially modifying the scope or spirit of this invention.

From the first decoder/multiplexer IC 293, three PDA (primary address) lines 308, 309 & 310 and one PIOW (Primary I/O pin write) line 311 are logically connected to the PCI to ISA Bridge 137. This first decoder/multiplexer IC 293 is then logically connected to the FLIP FLOP 299 and both of the 'AND' gates 301 & 303. The FLIP FLOP 299 is connected to both the 'OR' gates 305 & 307. One of these 'OR' gates 305 is logically connected to one of the 'AND' gates 301 which in turn is connected through a Master line 313 to the data switch IC 297. The other 'OR' gate 307 is logically connected to the second 'AND' gate 303 which in turn is connected through a Slave line 315 to the data switch IC 297. Logically connecting the data switch IC 297 to the PCI to ISA Bridge 137 are four lines: PIOW (Primary I/O write) 317, PIOR (Primary I/O read) 319, and two PCS (Primary host chip select) lines 321 & 323. Four corresponding lines logically connect the data switch IC 297 with an IDE connector.

From the second decoder/multiplexer IC 295, a PIOR (Primary I/O pin read) 325 and PCS (Primary host chip select) line 327 are connected to the PCI to ISA Bridge 137. This second decoder/multiplexer IC is logically connected to the two 'AND' gates 301 & 303 which are logically connected to the data switch IC 297, one through a Master line and the other through a Slave line.

A control line, PIDEMST_CTRL (Primary IDE Master control) 329, logically connects the programmable device 141, which is connected to the security engine microprocessor, and the 'OR' gate 305 which is connected to the Master 'AND' gate 301. The line PIDEMST_CTRL 329 is used to disable or enable the Primary Master IDE slot 111. Connected to the control line between the 'OR' gate 305 which is connected to the Master 'AND' gate 301 and the programmable device 141 is a pull up resistor. When this control line is set to High by the security engine microprocessor 125, the PIOW (Primary I/O write) 317, PIOR (Primary I/O read) 319, and two PCS (Primary host chip select) 321 & 323 lines are disabled and any device connected to the Primary Master IDE slot is effectively 'hidden' from the motherboard microprocessor. When the control line is set to Low, the pull up resistor drops the line voltage to 0 V and the lines are enabled allowing the motherboard microprocessor to recognize a device connected to the Primary Master IDE slot.

A second control line, PIDESLV_CTRL (IDE Slave control) 331, logically connects the programmable device 141, which is connected to the security engine microprocessor 125, and the 'OR' gate 307 which is connected to the Slave 'AND' gate 303. The line PIDESLV_CTRL 329 is used to disable or enable the Primary Slave IDE slot 111. Connected to the control line between the 'OR' gate 307 which is connected to the Slave 'AND' gate 303, and the programmable device, is a pull up resistor. When this control line is set to High by the security engine microprocessor, the PIOW (Primary I/O write) 317, PIOR (Primary I/O read) 319, and two PCS (Primary host chip select) 321 & 323 lines are disabled and any device connected to the Primary Slave IDE slot is effectively 'hidden' from the motherboard microprocessor. When the control line is set to Low, the pull up resistor drops the line voltage to 0 V and the lines are enabled allowing the motherboard microprocessor to recognize a device connected to the Primary Slave IDE slot.

Modified BIOS

Connected to the computer's main BUS 108 via a bridge circuit 137 and the ISA BUS 115 is a ROM device 109 that contains the Basic Input/Output System (BIOS) software. The BIOS controls the computer's most basic, low level control functions and supervises its operations. In the present invention, the standard BIOS is replaced with a modified BIOS through the replacement of the ROM device containing the standard BIOS on the motherboard. The modified BIOS software allows the said security engine microprocessor to take over control of the computer from the motherboard CPU 101. This is supported through a modification to the design of a standard motherboard in which the address, data, and control lines which carry the signals of the main BUS are physically rerouted to be logically connected to the microprocessor of the security engine. The modified BIOS also sets up all security procedures upon computer start up and secures data during the computer's operation and hides all data storage devices and other user selected peripheral data storage and communication devices upon start up and shut down of the computer. The modifications of the present invention's BIOS include software routines that support:

Access Control Management: The user can configure a single computer system to allow different levels of access.

Controlling the loading of device drivers for all peripheral storage and communication devices and creating a system manager before the O.S. takes over the system.

Disabling of all non-authorized peripherals according the security procedures established on the security configured security engine.

Setting up the security configuration of the computer. The settings for the security configuration include: which peripheral devices are to be enabled or disabled for a specific user and which device drivers will have encryption or decryption capabilities. For example, this latter setting allows the user the ability to select which data storage devices such as an IDE or SCSI hard drive are to be encrypted.

Providing a way to securely communicate with and authenticate the identity of other computers that are using the same technology as this invention.

Smart Card

A smart card reader 133 is logically connected to the smart card reader interface 135 which in turn is connected to the programming circuit 129 and the microprocessor 125 of the security engine. In the preferred embodiment of the invention, encrypted integrated circuit cards (smart cards) are used for the identification and verification of authorized users and which control the level of access to a computer system by its containing cryptographic keys which are required before any particular peripheral device will be enabled. By limiting the number of keys present in a smart card, access to specific peripherals can be restricted on a device by device basis. The smart card is read through a smart card reader connected to the security engine. The smart card suitable for this invention typically contains a microprocessor and more than one internal memory. In the preferred embodiment, this plurality of internal memory comprises internal RAM, on-board ROM and EEPROM. The preferred card is one which is compatible with ISO 7816 standards although one skilled in the art would readily recognize that other smart cards may be substituted without materially modifying the scope or spirit of this invention.

Contained within the first internal memory or ROM of the smart card is software which may be considered a small operating system with a BUS that supports data flows between one and five bits in length depending on which type of smart card is used.

Also stored within the ROM are the same six encryption algorithms as are found in the flash memory of the security engine. The first is a public key based cryptographic algorithm that provides encryption and decryption for 48 and 64 bits of data. This, and the same encryption algorithm stored in the security engine ensures that the initial data flowing between the smart card reader and the security engine microprocessor during the synchronization of communications is secure if intercepted. In the preferred embodiment, the algorithm used in the smart card for this task is RSA although one skilled in the art would readily recognize that other algorithms that are compatible with RSA may be substituted without materially modifying the scope or spirit of this invention. The same algorithm can be used for 6 and 8 bits of data.

The second algorithm stored in the ROM of the smart card, is an algorithm used to generate hash numbers from the personal information entered by the user in the Identification area of the smart card's ROM memory map. The preferred algorithm is HAVAL although one skilled in the art can easily see that a similar algorithm may be substituted without materially changing the invention.

The smart card ROM also contains the same linear congruency function, algorithm for generating the CK, algorithm for encrypting all data which is stored in peripheral storage devices or passes through communication devices, and algorithm for creating a CRC matrix, as is stored in the internal memory of the security engine microprocessor.

The second internal memory or EEPROM memory of the smart card is used for user authentication and is divided into three major parts—Identification, Key Management, and Application.

Contained within the Identification area is space for personal identification information inputted by the computer user. This includes such things as the user's name, address, telephone number etc. In this area, there is also space for identification numbers and account numbers to be inputted by outside or external agencies such as the government, financial institutions, health care agencies etc. The Identification area also contains a register of codes which are used to identify the type of smart card.

The Application area is divided into two sections, an index and a data storage section. The index operates similar to a small File Allocation Table (FAT) which records the location and the amount of space occupied by each application. The index is also responsible for allocating extra space to an application if required. Each application in this area is uniquely identified by a two byte code which identifies the communication key for each application. The use of this two byte code supports the inclusion of up to 65,536 different applications.

Space is allocated in the Application area for the storage of general information inputted by the user or authorized outside agencies. Read and write access to this area can only be done by another computer which utilizes the present invention and possesses a cryptographic communication key which matches the one stored in the smart card to which access is desired. Access to a specific application also requires the two byte code in order to locate the data. The data storage section can contain application data or software which can also be loaded into the internal RAM or EEPROM of the smart card and run.

Within the EEPROM of the smart card is a lookup table which contains all the commands which are required for this invention. If in the future, more commands are required the size of the table in the EEPROM can be increased and more commands added.

All communication keys necessary for encrypted communication, such as communications between the smart card and the security engine microprocessor, are also placed in the Key Management area of the smart card EEPROM.

In this invention, three different lengths of communication are supported between the security engine microprocessor and the smart card reader. They are 1 byte, 6 bytes and 8 bytes. This allows the invention to be compatible with several different types of smart cards and to also support other identification and authentication devices such as button memory and biometric readers. Status commands involving communication set-up, synchronization, and prompts are encrypted and are eight bits in length. All commands are 48 bits long and data flows are 64 bits long and are also encrypted. Due to the amount of information which must move between the security engine and the smart card, the speed required, and the necessity to support different lengths of communication protocols, this invention involves a check for errors using a CRC (Cyclic Redundancy Check) algorithm. In this invention the algorithm used is the Hamming Code although one skilled in the art would readily recognize that other algorithms which are compatible with the Hamming Code may be substituted without materially affecting this invention.

This area also contains hash numbers that are created from the personal information stored in the Identification area and are unique to each computer system implementing this invention. Also stored in the Key Management area of the smart card ROM are unique, encrypted identification codes that are used to create different types or classes of smart cards with different capabilities.

There are three major classes of smart cards: vendor, repair, and user.

One class of identification codes is reserved exclusively for 'vendor' cards. The vendor cards are used only by sellers of computer systems containing the invention. The EEPROM of the vendor card is divided into only two areas, a Key Management area and an Identification area. The Key Management area contains security parameters such as the allowed key length for encryption algorithms inputted during the card's manufacture, and the previously noted public key based cryptographic algorithm for initial communications between the security engine and the smart card. The Identification area contains a unique vendor identification number and the common register of identification codes. These cards allow limited access to set up and check a computer before the security procedure is set up and, when used in conjunction with a repair card, allows limited access to repair or service the computer after the security procedure has been implemented.

The 'repair' class of smart cards can be used only with a matching computer containing the present invention and provide limited access to the computer in order to diagnose and repair it. The code for a repair card is placed in the smart card register during its manufacture and this code can never be changed. This class of smart cards contains the H2' hash number that is the complement of the H2 hash number which is stored in the security engine memory, and the same key for communication. The repair type smart card contains only two areas in its memory—the Key Management area and a Restricted area. The Key Management area contains only the hash numbers and the communication key. The Restricted area contains an index of data files or directories that are hidden and therefor cannot be accessed. This allows the computer to be fully functional for repairs while still maintaining the confidentiality of data stored in it. In addition, the repair card will have no ability to make any changes to the Identification or Application areas as they are not present in the card.

The other major class of identification codes is for 'user' cards. User smart cards are further identified by code as 'new' or 'used'. 'New' user smart cards are those which have not previously had identification information inputted into the Identification area of the smart card and subsequently do not also contain hash numbers.

In order to support hierarchies of smart cards and corresponding computers, user smart cards can also be coded as 'Standalone Master' cards (SAM), 'Master/Slave' cards (MS) or 'Slave' cards. The designation of a new user card as a SAM, MS or Slave type is decided during its initial set-up by the user. The identification code for a user smart card is then placed in the register of codes in the smart card memory. The computer system in which a particular type of user card is created also carries the same designation as the smart card. Thus, the creation of a SAM card creates a SAM computer. The particular card and computer can be referred to as a SAM system.

A SAM card is typically used by a system administrator and is used to set up MS cards or Slave type cards. As its name suggests, it is also used for individual computer systems which have no related computer systems in its network or family. The presence of a code identifying a smart card as a Standalone Master card gives it access to a routine which allows the set up of any number of Master/Slave or Slave systems. In addition, Master/Slave systems have the capability to set up both subordinate MS systems and Slave systems, while Slave cards cannot generate any other smart cards. In this manner, a hierarchy of related computers can be created. In a family of related computers, there can be only one SAM card and subsequently only one SAM computer. Also, no matter the number of computers in a family, there must be one SAM card and its corresponding computer.

Although MS cards have the ability to create subordinate MS or Slave systems, this function may be disabled during the creation of an MS system. If a user chooses to disable the MS card's ability to create subordinate systems, the card is identified by an identity code for disabled MS cards in the Key Management area of the smart card ROM.

In the Key Management area of the smart card ROM of a SAM card, one set of three hash numbers H1', H2', and H3' are stored. These three hash numbers are generated through a two step process. The first step involves the use of an algorithm on the personal identification information which is placed in the memory of the security engine microprocessor during the initial set-up by the user. This creates three hash numbers H1, H2, and H3. The preferred algorithm for this is HAVAL although one skilled in the art can easily see that a similar algorithm may be substituted without materially changing the invention. The second step involves applying a linear congruency algorithm such as XOR to these three hash numbers in order to generate H1', H2' and H3'. In addition, a single key (CK) required for communications, also stored in the Key Management area, is created and used by a SAM card. This communication key is generated from H2' through the use of an algorithm. The preferred algorithm used to produce this communication key is IDEA although one skilled in the art can easily see that a similar algorithm may be substituted without materially changing the spirit or scope of this invention. The SAM card is able to write in the set-up area of an MS or Slave smart card of another computer which utilizes the present invention but which has not been previously set up. However, a subordinate MS or Slave computer is not empowered to access and change its security configuration or identification information. Thus, a subordinate MS or Slave computer that has been set up by a SAM card can only have its security configuration or identification information modified by that SAM card and no other. However, the subordinate computer can be operated through the use of, either the smart card which was set up with it, or the SAM card which was used to create the subordinate system. In order to operate a subordinate computer that it created, the SAM card has stored in its internal memory the hash numbers stored in the memory of the security engine of the subordinate computer. In the Key Management area of an MS card, two hash numbers (H1' and H3'), which were created from the personal identification information inputted to the Identification area of the smart card, are stored. A third hash number, H2', is derived from the H2 stored in the SAM or MS card which is used to create the subordinate MS card, and also placed in the Key Management area of the MS card. In this way, using the fact that the H2 and H2' hash numbers are complementary, access to a subordinate MS computer only by the SAM or MS card which created it, or its own MS smart card, is established. No changes can be made to the MS card without the use of the SAM or MS creator card. In order to facilitate access by the card which created it, the subordinate MS card contains in its Key Management area the CK of the creator card. The MS card also has its own unique communication key derived from the H2' hash number through the use of an algorithm. The preferred algorithm used to produce this communication key is IDEA although one skilled in the art can easily see that a similar algorithm may be substituted without materially changing the spirit or scope of this invention.

As was previously noted, the MS card is able to create subordinate MS systems that can be operated through the use of the MS card which was produced in the creation of the system or the use of the MS card that was used to create the subordinate system. However, changes to the personal identification area or the security set-up require the presence of the MS card that was used in the creation of the system. During the creation of an MS card, the ability of the new card to further create new MS or Slave cards and systems itself can be disabled. This is done through a selection made in the security configuration set up of the new MS card. This decision is then stored as a code number in the Key Management area of the smart card internal memory.

In the creation of a subordinate MS system, the hash number H2' is taken from the MS card which is used to create the subordinate system. Using a pseudo-random number generator this hash number is then changed to create a new H2'. The preferred algorithm for this is a linear congruency function such as XOR although one skilled in the art can easily see that an algorithm with similar characteristics may be substituted without materially changing the invention. This new H2' number is placed in the Key Management area of the new MS card along with two hash numbers (H1' and H3') which were created from the personal identification information inputted in to the Identification area of the new MS smart card. The creator MS card is allowed access to the hash numbers stored in the memory of the security engine of the subordinate MS computer which it created. In this way, access to an MS computer only by the MS card which created it, or its own MS smart card, is established. However, no changes can be made to the subordinate MS system without the use of the MS card that created it. As mentioned, the subordinate MS system has a unique communication key derived from its H2' hash number in addition to the CK of the card which created it.

The Key Management area of a Slave card contains the hash numbers (H1', H2', and H3') and communication key (CK) of the SAM or MS card which created it. The Slave card also has a unique CK, generated from the H2' hash number given to it by its creator card. A Slave computer can therefor be accessed by its own Slave card and the MS or SAM card that was used to create it. The SAM or MS card which was used to set up the Slave card has full access to the use of the Slave computer and can be used to change the security configuration of that computer. Despite possessing the same hash numbers of the smart card that created it, due its identification code identifying it as a Slave card, the Slave card cannot be used in any other computer other than the one it was set up for. In addition, in order to prevent the Slave computer from being mistaken for the computer which created it, especially during communications with other computers, the Application area of the Slave smart card is disabled. In addition, the encryption and decryption function is disabled for all data which passes outside of the Slave computer. The Slave card does not have the ability to make any changes to the Identification area as this can only be done through the use of the MS or SAM smart card which originally set it up.

Device Driver Layer

Modifications are made to the Device Driver Layer that replaces the standard Device Driver Layer in the computer's Operating System that typically resides in the hard drive of a computer. The ability to stop the loading of peripheral devices during the start up or interrupt procedure of a computer is supported by modifications made to the device driver layer. This modification involves changes made to the device driver software in which the device drivers are not able to initialize and set up if a particular encrypted piece of code for it is not present in the flash memory of the security engine microprocessor.

The modified DDL also supports the ability of the computer employing this invention to 'hide' restricted files or folders during repair or maintenance procedures using a repair card. This modification requires that, upon the insertion of a repair card into the smart card reader of a system employing the present invention, the device driver which receives a read or write procedure call to read an encrypted list of restricted items which had previously been stored in RAM on the motherboard. If the read or write activity involves a file or folder which is on the restricted list, it is disallowed.

Modifications to the DDL and the inclusion of an I/O address map and circular memory buffer circuits also permit this invention to encrypt or decrypt selected data moving to and from peripheral devices. Through these circuits, data to be encrypted or decrypted is intercepted, temporarily stored in the circular memory buffer, encrypted or decrypted, and passed on to the appropriate peripheral device. This also requires providing the lower level functions necessary for real time encrypt and decrypt procedures under any Operating System, through the scratch memory. A modification to the DDL allows each driver to create a header for each task requiring encryption or decryption. This header contains information regarding the size of the plaintext to be encrypted, or the size of the encrypted code to be decrypted; the type of operation to be performed—whether involving a storage device, network or modem; and the number of plaintext divisions required given the circular memory buffer capacity.

The modifications to the DDL involving the provision of lower level functions necessary for real time encrypt and decrypt procedures under any Operating System, through the scratch memory and the generation of a header, also provide a base for the encryption of data, which is to be sent through a peripheral device such as a modem, or through a network, that can only be decrypted by a specific target computer employing this invention. They also allow for the encryption of data stored on some data storage medium such as a diskette, tape, CD, or hard drive that can only be decrypted by the target computer containing this invention. A key addition to these modifications is the inclusion of a parameter from the personal identification CMOS table and a unique motherboard serial number from the target system in the header created for the encrypted data. The parameter from the personal identification information used in the header is selected by the user.

ISA Circular Buffer

Figure 11A:
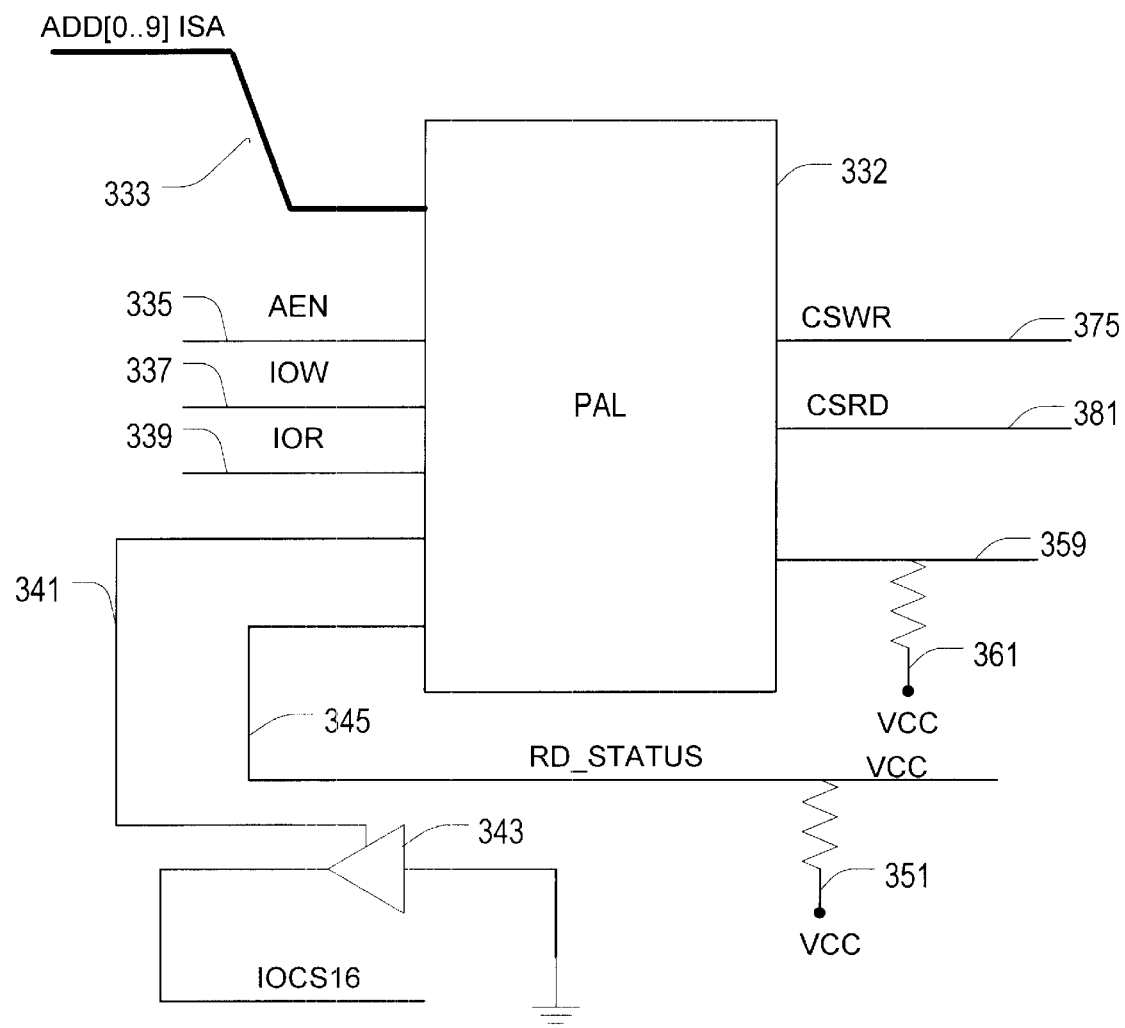
FIGS. 11A & 11B show a simplified schematic of the ISA circular memory buffer.
Figure 11B:
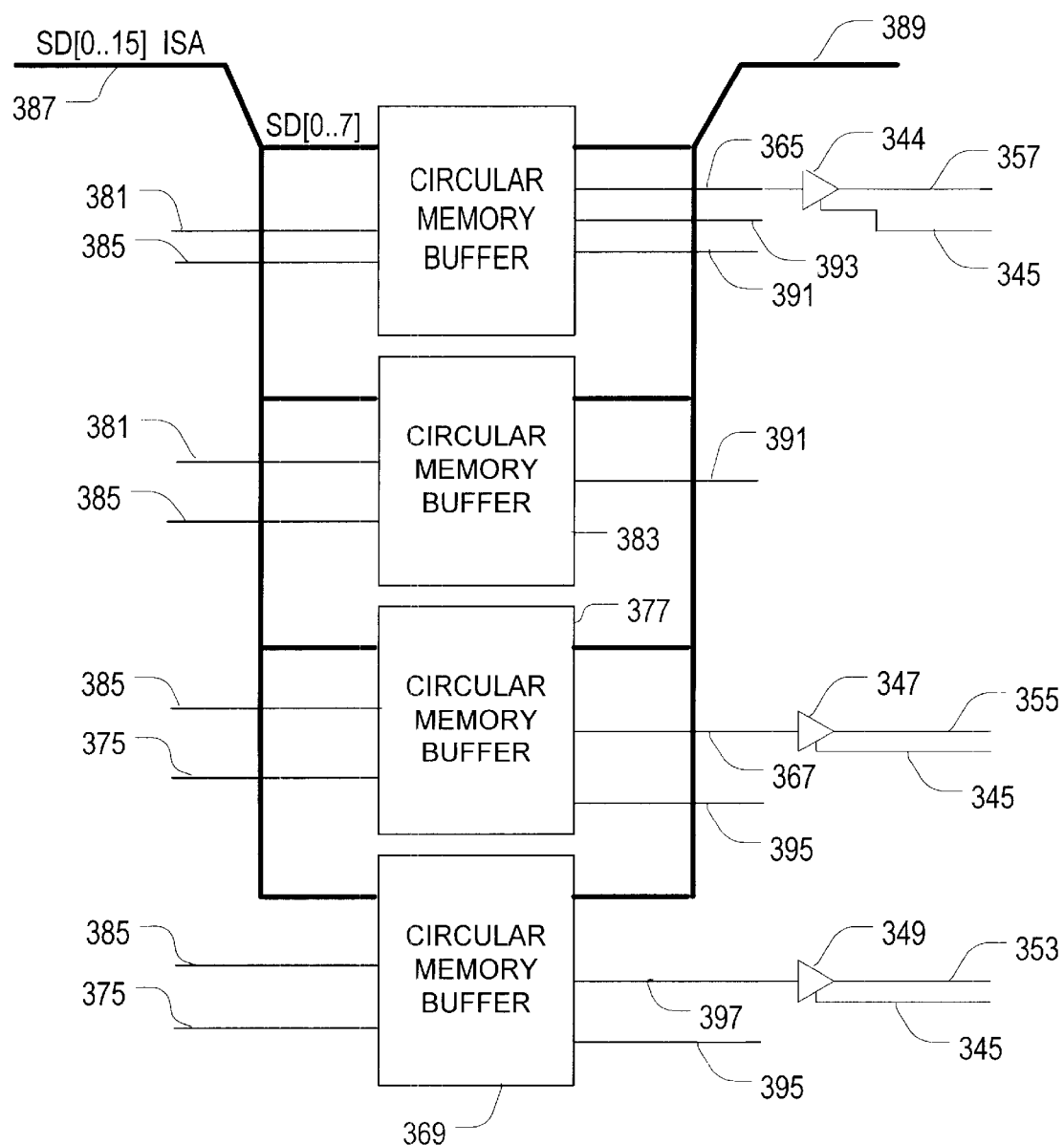

Another necessary modification is the logical connection of the device driver layer through the ISA Bus to the security engine microprocessor. This allows for the real time encryption and decryption of data flowing to all peripheral storage and communication devices using the cryptographic algorithms contained in the security engine memory. In order to achieve this, a circuit is placed between the ISA Bus and the security engine microprocessor in order to control and store data for encryption and decryption which is performed by the security engine microprocessor. The circuit that allows for this is comprised of a programmable IC, four circular memory buffer ICs, and four Bus buffer ICs. FIGS. 11A and 11B show a simplified schematic of the ISA Bus Circular Buffer.

The preferred programmable IC for this invention is a programmable array logic (PAL) device although one skilled in the art would recognize that other components that perform the same function can be substituted without materially modifying the scope or spirit of this invention. The preferred circular memory buffer IC for this invention is a CMOS a synchronous circular memory buffer dual port memory buffer although one skilled in the art would recognize that other components that perform the same function may be substituted without materially modifying the scope or spirit of this invention. The preferred Bus buffer IC for this invention is a quadruple Bus buffer with 3 state outputs although one skilled in the art would recognize that other components which perform the same function may be substituted without materially modifying the scope or spirit of this invention.

The programmable IC 332 is logically connected to the ISA Bus 115 through ten address lines (Address0 to Address9) 333 and AEN (address enable) 335, IOW (I/O write) 337, IOR (I/O read) 339, and I016 (line which indicates that a 16 bit address has been asserted) 341 lines. Connected to the I016 line 341 is a Bus buffer IC 343. A RD_STATUS (read status) line 345 logically connects the PAL IC 332 to the first Bus buffer IC 344, the third Bus buffer IC 347 and the fourth Bus buffer IC 349. On the RD_STATUS line 345 between the PAL 332 and Bus buffers 344, 347 & 349 is a pull up resistor 351. When the RD_STATUS 345 line is set to Low, the pull up resistor 351 drops the line voltage to 0 V and the data lines (SD0 353, SD1 355, and SD2 357 connected to the data Bus of the ISA Bus are enabled, allowing the status of the circular memory buffer for reading or writing to be sent to the device driver of the peripheral involved.

Logically connecting the programmable IC 332 and the security engine microprocessor 125 is a HEADER_HANDSHAKE line 359 that contains a pull up resistor 361. This line carries a signal to the security engine microprocessor 125. When the pull up resistor 361 sets the line Low, this causes the microprocessor 125 to read from the circular memory buffer a header that contains the settings for all encryption or decryption tasks. This header contains all the parameters for the encryption or decryption such as the size of the data block, the type of operation to be performed, and the number of plaintext divisions. The header is created in the device driver layer and placed in the circular memory buffer through the ISA Bus by the specific device driver that receives the encryption or decryption read or write request.

The first BUS buffer IC 343 in the circular memory buffer circuit is logically connected to the first circular memory buffer 363 through a SEC_ENGINE_RD_EMPTY (security engine memory empty read) 365 line. This buffer is also connected to line Data2 of the ISA Bus through line SD2 357. The third Bus buffer IC 347 is logically connected to the third circular memory buffer through a SEC_ENGINE_WR_FULL (security engine memory full write) line 367. This buffer is logically connected to the Data1 line of the ISA Bus through a SD1 line 355. The fourth Bus buffer IC 349 is directly connected to the fourth circular memory buffer IC 369 through the SEC_ENGINE_RD_EMPTY line 397 and to the Data0 line of the ISA Bus through an SD0 line 353. The third 347 and fourth 349 Bus buffers are logically connected to each other and through the RD_STATUS line 345. A CSWR (chip select write) line 375 logically connects the third 377 and fourth 379 circular memory buffers. The CSWR line 375 is connected to two circular memory buffers that are connected by the same RD_STATUS line 373. These two circular memory buffer act as data memory buffers for the encryption or decryption of all write procedures initiated in the device driver layer. A CSRD (chip select read) line 381 logically connects the first 363 and second 383 circular memory buffers. Only the first circular memory buffer 363 is connected to the RD_STATUS line 345 from the PAL 332. These two circular memory buffers 363 & 383 act as data memory buffers for the encryption or decryption of all read procedures initiated in the device driver layer. Logically connecting all four circular memory buffer ICs and the ISA Bus is a RESET line 385. Each circular memory buffer is also connected to the ISA Bus through eight SD (ISA data) lines 387. Each circular memory buffer is logically connected to the security engine microprocessor through eight DO (security engine data) lines 389. The first 363 and second 383 circular memory buffer ICs, which are connected by the CSRD line 381 from the PAL, are both connected to the security engine microprocessor through a SEC_ENGINE_WR (security engine write) line 391. The first circular memory buffer IC 363, has SEC_ENGINE_RD_EMPTY 365 and SEC_ENGINE_RD_FULL 393 lines which are logically connected to the security engine microprocessor. The third 377 and fourth 379 circular memory buffer ICs, which are connected by the CSWR line 375 from the PAL 332, are both connected to the security engine microprocessor through a SEC_ENGINE_RD (security engine read) line 395. The third circular memory buffer IC 377 has a SEC_ENGINE_WR_EMPTY (security engine memory empty write) line 397 and SEC_ENGINE_WR_FULL (security engine memory full write) line 367 that are logically connected to the security engine microprocessor.

PCI Circular Buffer

Figure 12:
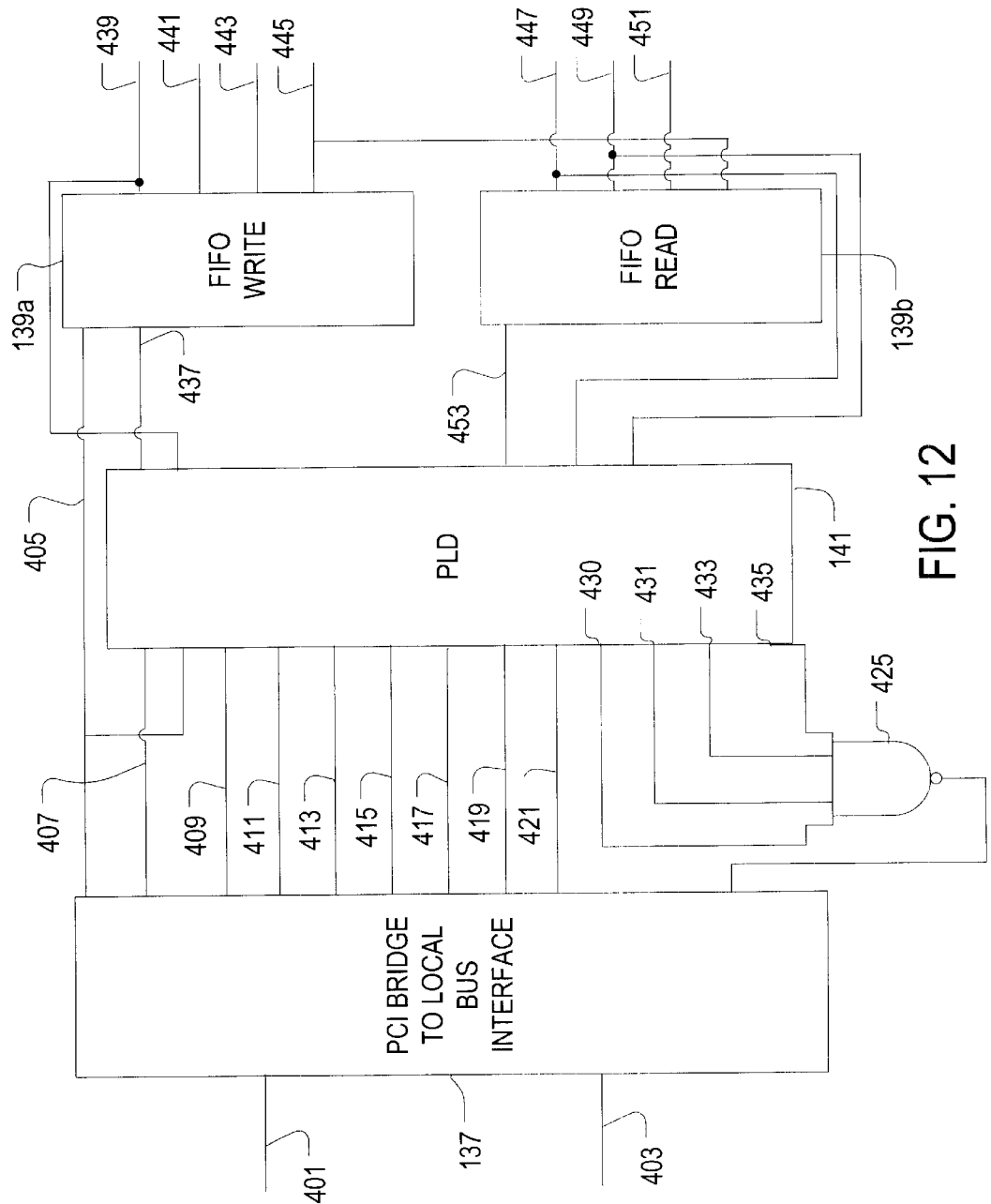
FIG. 12 is a simplified schematic of the PCI circular memory buffer.

Another necessary modification is the logical connection of the device driver layer through the PCI Bus to the security engine microprocessor. This allows for the real time encryption and decryption of data flowing through the PCI Bus. As with the ISA circular buffer, cryptographic algorithms contained in the security engine memory are used. In order to achieve this, a circuit is placed between the PCI Bus and the security engine microprocessor in order to control and store data for encryption and decryption which is performed by the security engine microprocessor. The circuit that allows for this is comprised of a Programmable IC, two circular memory buffer ICs, one 'NAND' Gate IC, and a PCI Bridge to Local Bus Interface IC. This is shown in FIG. 12.

The preferred Programmable IC for this invention is a programmable logic device (PLD) although one skilled in the art would recognize that other components that perform the same function can be substituted without materially modifying the scope or spirit of this invention. The preferred circular memory buffer IC for this invention is a CMOS synchronous bi-circular memory buffer with Bus matching although one skilled in the art would recognize that other components that perform the same function may be substituted without materially modifying the scope or spirit of this invention. The preferred 'NAND' gate for this invention is a quadruple two input positive 'NAND' gate although one skilled in the art would recognize that other components which perform the same function may be substituted without materially modifying the scope or spirit of this invention. The preferred PCI Bridge to Local Bus Interface IC is a V292PBC although one skilled in the art would recognize that other components which perform the same function may be substituted without materially modifying the scope or spirit of this invention.

The PCI Bridge to Local Bus Interface IC 137 is logically connected to the PCI Bus 108 through a PCI Bus line 401. A PCLK (PCI Clock) line 403 also logically connects the PCI Bridge 108 to the Local Bus Interface IC 137. Connecting the PCI Bridge to Local Bus Interface IC 137 to the programmable device 141 is a Local Bus. This Local Bus is logically connected to the programmable device through the following lines: ID(31:0) (Local instruction and data Bus) 405, A(31:2) (Address and data) 407, LREQ (Local Bus request) 409, BURST (Burst request) 411, RDY (Local Bus data ready) 413, LBREQ (Local Bus request) 415, LBGNT (Local Bus grant) 417, R/W (Read/write) 419, LCLK (Local Bus clock) 421, and LINT (Local Bus interrupt) 423. Logically connected to the LINT line 423 is an 'NAND' gate 425. This 'NAND' gate has READ_EMPTY 430, WRITE_FULL 431, WRITE_EMPTY 433, and READ_FULL 435 lines logically connected to the programmable device 141. The ID(31:0) line 405 is logically connected to the programmable device 141 and both circular memory buffers 139a & 139b. The A(31:2) line 407 is directly connected to the programmable device.

A WRITE line 437 is logically connected to the first circular memory buffer 139a. From this WRITE circular memory buffer a SEC_ENGINE_WR_FULL (Security engine write full) 439 and a SEC_ENGINE_WR_EMPTY (Security engine write empty) 441 line are logically connected to the security engine microprocessor. The SEC_

ENGINE_WR_FULL line 439 is also connected to the programmable device 141. Also connecting the security engine microprocessor 125 and the first circular memory buffer 139a is a SEC_ENGINE_RD (Security engine read) line 443 and a SEC_ENGINE_DATA_BUS (Security engine data Bus) line 445. The SEC_ENGINE_DATA_BUS line 445 is also logically connected to the second circular memory buffer 139b.

A READ line 453 is logically connected to the second circular memory buffer 139b. From this READ circular memory buffer a SEC_ENGINE_RD_FULL (Security engine read full) 447 and a SEC_ENGINE_RD_EMPTY (Security engine read_empty) 449 line are logically connected to the security engine microprocessor 125. The SEC_ENGINE_RD_EMPTY line 449 is also connected to the PCI Buffer programmable device 141. Also connecting the security engine microprocessor 125 and the second circular memory buffer 139b is a SEC_ENGINE_WR (Security engine write) line 451.

Operation
Initial Set-up by Vendor

Figure 13A:
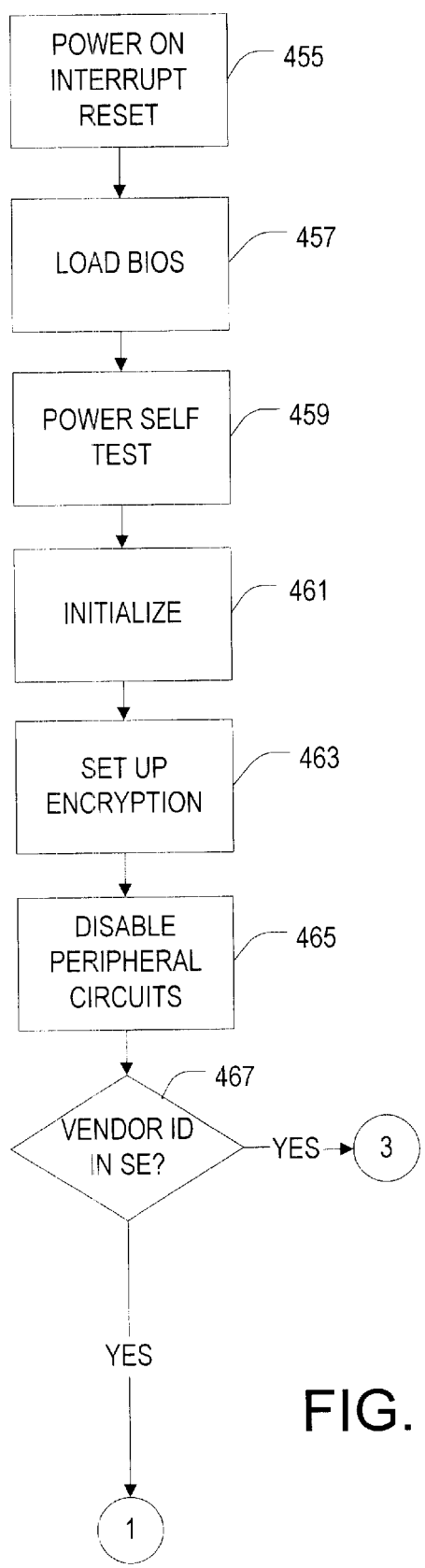
FIGS. 13A to 13V together comprise a flow chart that sets forth the set up and operation of the invention.
Figure 13B:
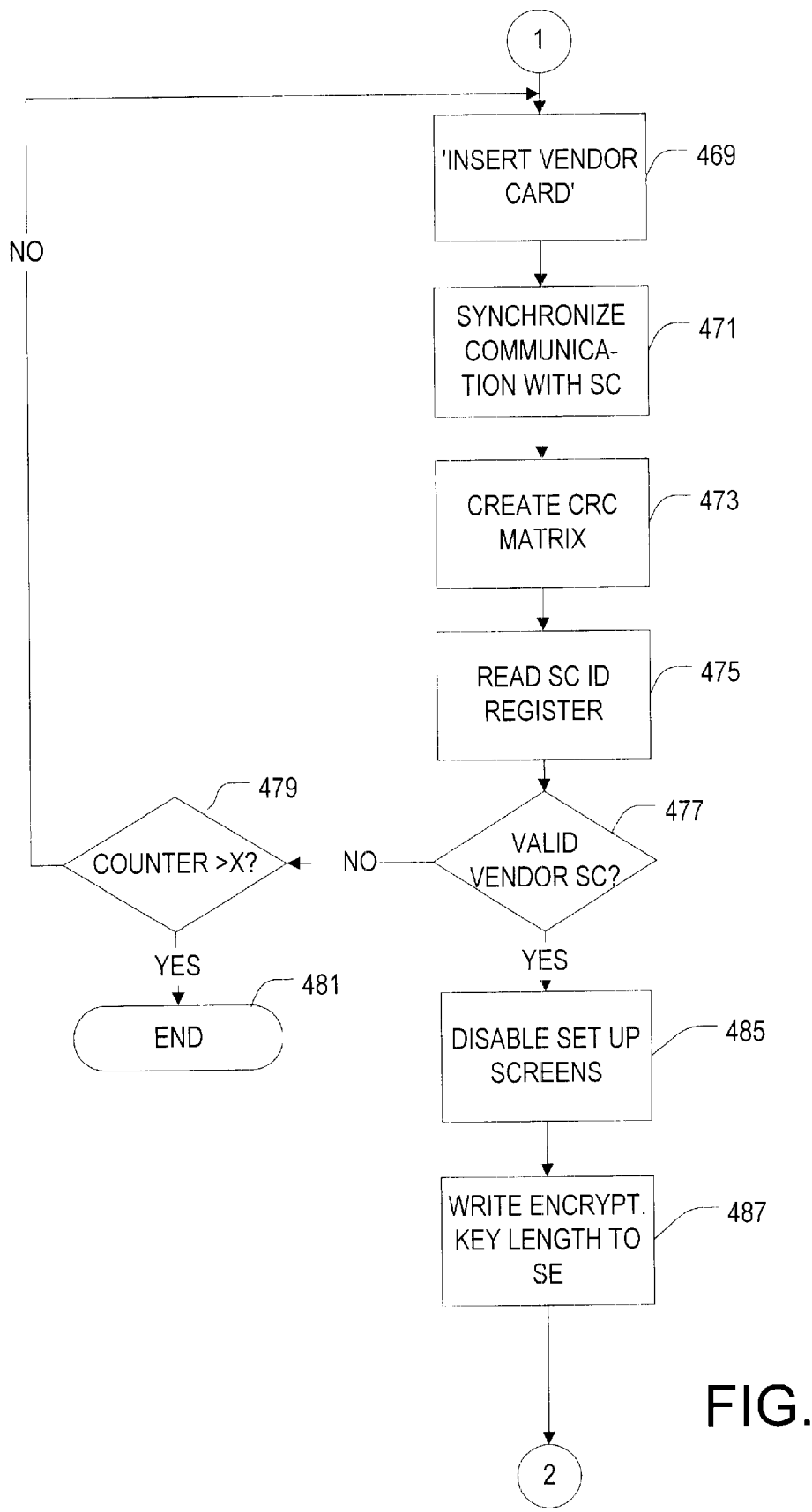
Figure 13C:
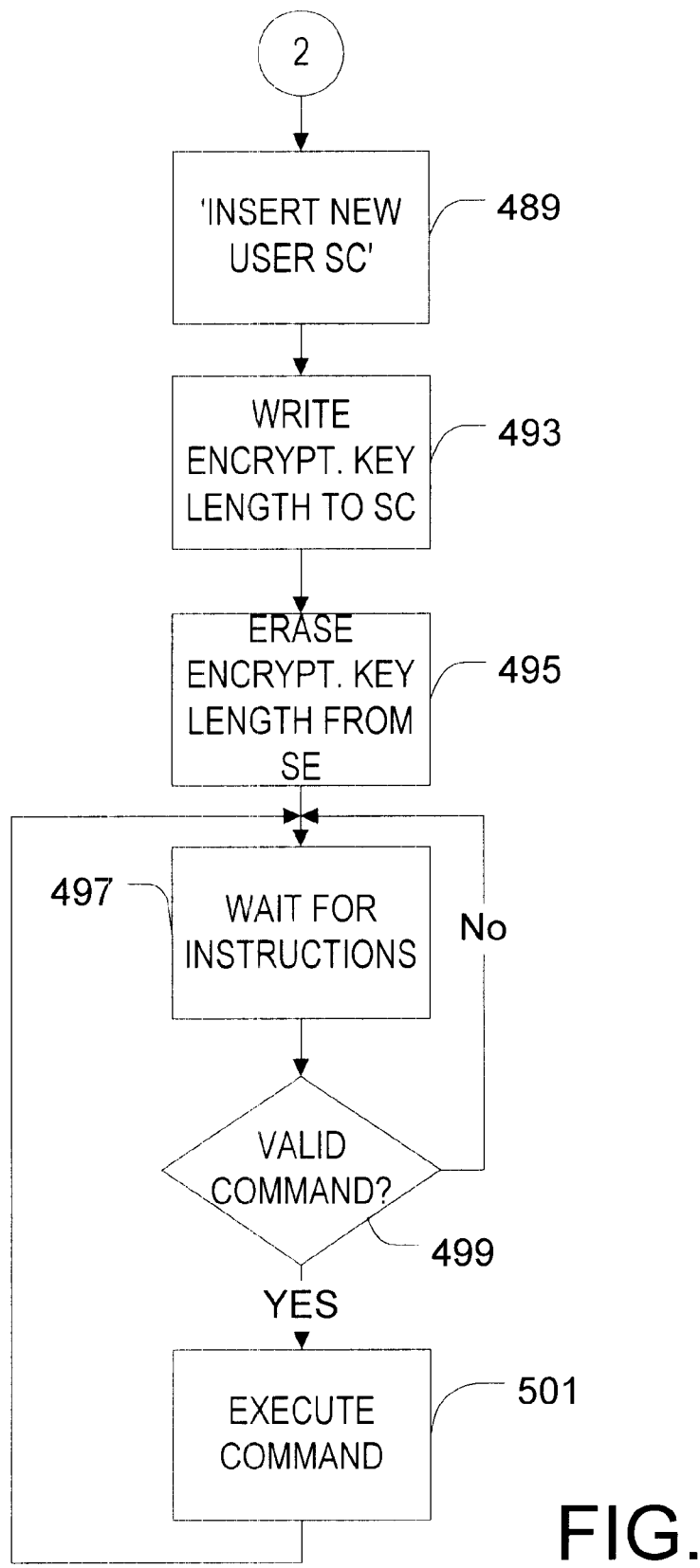

The initial set up of the computer and smart card by a vendor is shown in FIGS. 13A, 13B & 13C. Whenever a computer which contains this invention is powered on, reset or interrupted 455, the modified BIOS is decompressed and downloaded to the main RAM memory of the motherboard 457. As it is connected to a battery, the security engine microprocessor is always powered on. One of the main functions of the modified BIOS is to allow the security engine microprocessor to take over control from the CPU 101 on the motherboard. Essentially this is done by placing the computer's microprocessor into a continuous loop through the I/O from the main BUS when control is to be passed over to the security engine microprocessor 125.

The BIOS begins a POST (Power On Self Test) procedure testing the computer's microprocessor 459, and beginning the initialization of the hardware 461. At the same time, the security engine microprocessor sets up the encryption and decryption procedures to the memory buffer 463, and disables all peripheral circuits except those for the monitor, keyboard and smart card reader 465.

Once this process is completed, a check is made of the security engine memory to see if the security system had previously been set up by a vendor 467. The presence of vendor identification data and encryption key length information in the flash memory of the security engine indicates this. If it had not previously been set up, a check is made to determine if a vendor type smart card is currently inserted in the smart card reader 133. If one is not, a command is sent to the BIOS to display the message "Insert Vendor Card" 469.

Upon insertion of any smart card into the reader, the security engine microprocessor begins procedures to synchronize communications with the smart card 471. The synchronization process involves the reading of a block of data from the smart card by the security engine. Included in this block of data are: the allowed key length for all encryption procedures, the smart card register code for the smart card which identifies the type of card it is, the number of communication keys stored in the EEPROM of the smart card, the number of commands which are stored in the look up table of the smart card ROM, and a CRC (Cyclic Redundancy Check) check sum.

Upon receiving the check sum from the smart card, the security engine microprocessor then creates a CRC matrix in order to check for errors in the communications between the smart card and the security engine 473. In this embodiment of the invention, the preferred algorithm for the CRC is the Hamming algorithm, although one skilled in the art can readily see that other algorithms which perform a similar function may be substituted without materially modifying the scope or spirit of this invention. During the synchronization of communications between the smart card and security engine, the smart card undertakes a check sum calculation in order to check for damaged or erroneous data fields. If the check sum is not correct, the identified areas are reconstructed using data stored in the security engine flash memory.

This communication synchronization procedure is performed every time a smart card is inserted into the smart card reader. In order to secure this initial transfer of data as it passes between the security engine and smart card, a public encryption algorithm embedded in the smart card ROM before its delivery to the vendor, is used. Using this encryption algorithm, this block of data is encrypted by the smart card before it is sent to the security engine. In this embodiment of the invention, the preferred algorithm for the public encryption key is the RSA algorithm, although one skilled in the art can readily see that other algorithms which perform a similar function may be substituted without materially modifying the scope or spirit of this invention.

Subsequent communications between the smart card and security engine are protected through the use of a different encryption algorithm, such as IDEA, and a unique communication key (CK) which are stored in the smart card and security engine memories.

The CK, which is stored in the internal memory of the smart card and the internal memory of the security engine, is used as an encryption key with an algorithm to encrypt or decrypt all communications after the first transfer of data between the security engine and the smart card. Commands or data encrypted using a smart card's CK is decrypted by the recipient security engine using its CK and visa versa. Only smart cards which have the same CK as found in the security engine internal memory can correctly decrypt the encrypted message and thus communicate with that computer. Consequently, only a smart card and security engine which were personalized together as an individual system or a smart card which was used to create subordinate systems and the subordinate computers themselves can communicate with each other.

When the registers are read from the smart card to determine the type of card is inserted, an encrypted code number is read from the register of the inserted smart card and decrypted by the security engine microprocessor using the public encryption key 475. This code is then compared to a table of smart card code numbers that are stored in flash memory in the security engine 477. From this comparison, the type of smart card can be ascertained. By default, all smart cards, with the exception of vendor smart cards, have the code for a 'new' card in the appropriate register location until changed through the set up procedure.

If a vendor card is not inserted within a preset number of tries 479, a command is sent to the BIOS to terminate the start up procedure 481. At this time, the memory buffer is erased, and all peripherals with the exception of the smart card reader, monitor, and keyboard are disabled. This procedure is performed every time the start up process is terminated.

This code is compared to a table of acceptable vendor numbers stored in ROM in the security engine. Once it has been ascertained that the inserted smart card is a valid vendor card, all set up routines for the security system are hidden 485 and the security parameters and vendor identification data are read from the vendor smart card and stored in internal RAM 487. The security parameters include such things as the maximum key length allowed for encryption procedures—a variable that differs from country to country depending on national encryption laws. The vendor card is then ejected and a message to insert a new user card is displayed on the monitor 489.

If a new smart card (one with no data in the Identification area and indicated by a code in the smart card register) is inserted into the card reader, the security engine writes the security parameters and vendor information to the Key Management area of the EEPROM of the user smart card 493. The security parameters and vendor data are then erased from the security engine RAM 495. The security engine then waits for instruction 497. Any command received is compared to those listed in the command table stored in the ROM memory of the smart card 499. More commands may be added in the future if desired. If the command received is a match it is executed by the smart card microprocessor 501 and it goes in to a wait state once again. At this point, the encryption functions are totally disabled and all non-security related functions are enabled. The smart card and the computer system can be fully prepared and tested by the vendor for delivery to a customer and to be 'personalized' by that customer.

Initial User Security System Set-up

FIGS. 13D–13H show the set up procedure for a SAM system. If the security system had previously been set up by the vendor, the security engine microprocessor checks for the presence of a smart card in the attached smart card reader 507. If a smart card is not present in the smart card reader a request to the user to insert a smart card is given via a display command sent to the BIOS 509. If a valid one is not inserted within a preset number of tries 511, a command is sent to the BIOS that the proper security is not in place and the start up procedure is terminated 513.

If a smart card is inserted in the smart card reader 133 communications are synchronized between it and the security engine 515, a CRC matrix is created 517 and the identification code register is read from the smart card 519.

Following this, the smart card identification code is checked to determine whether or not it is a new user type smart card 521. This is determined by the presence of encrypted code numbers in the Key Management area of the smart card memory which indicates that the card is 'new' and a 'user' smart card.

If it is a new user smart card, a check is made by the security engine to determine if any personal identification data or security configuration parameters are stored in their respective areas of the flash memory 523. If there is, the start procedure is terminated 524. If there is neither, this indicates that the system has not yet been 'personalized' and this procedure is initiated.

In the first step of this procedure, the encryption key length parameter is read from the Key Management area of the smart card memory 525. As previously noted, this parameter is loaded into the vendor smart card during its manufacture and varies from country to country. This key length ultimately determines the strength of the encryption algorithms used in this invention.

Following this, another command is sent to the BIOS to display the user identification set up screen 527. This screen displays a unique serial number assigned each security motherboard during its manufacture and allows the user to input personal information to be used to 'personalize' each computer and smart card 529. The personal information can include such items as the user's name, address, phone number, a credit card number, a one-time password and other information. At this point control is passed back to the BIOS which instructs the security engine microprocessor to read the information inputted by the user and write this data to a CMOS (Complementary Metallic Oxide Semiconductor) table in the scratch memory of the security engine 531. If the entry of the personal identification information is completed 533, the information inputted by the user is also written to a look up table in the Identification area in the internal memory of the inserted smart card 535. Some of this personal data may be changed at any time although this requires the insertion of an authorized smart card and a further check of the identity of the individual requesting the change such as by the entering of certain key information known only to the authorized individual user such as a password or some personal identification number.

After the user has inputted all the data required by the identification set up screen and the information has been stored in both the smart card and security engine memories, a command is then sent to the BIOS to display the security configuration set up screen 537. Through this screen, the user can set the level and type of security for the system. This includes such parameters as the specific peripheral devices to be enabled in the system as well as the designation of the system as a Stand Alone Master, Master/Slave or Slave. As with the identification set up screen, the security configuration information inputted by the user 539 is written to the CMOS table in the security engine scratch memory buffer and also to the Identification area of the internal memory of the inserted smart card 541. This security configuration data can also be changed if the proper authorization is given.

Once all the user inputted data has been written to the scratch memory 543, the security engine microprocessor writes a boot load subroutine 545, which is stored in the flash memory, to the internal RAM of the microprocessor. The boot load subroutine contains software of all the procedures necessary to burn the data stored in the scratch memory to the flash memory. Every time the programming circuit is required to bum data from the scratch memory to the security engine flash memory, this boot load program is created.

By default, the initial user set-up procedure involves the designation of the first new smart card and computer as a 'Stand alone Master' (SAM). If a new card is designated to be a SAM, the identification code for a SAM is written into the command register of the smart card 547 and the SAM set up procedure is initiated by the security engine microprocessor 549. Next, using the personal information that was previously entered by the user, the hash numbers H1, H2, and H3 are calculated by the security engine microprocessor and stored in its scratch memory 551. As previously noted, the preferred algorithm used to produce these three hash numbers is Haval.

The security engine microprocessor then generates a communication key from H2 it had created and stores it in the scratch memory 553. As noted, the preferred algorithm used to produce this key is IDEA, although one skilled in the art can easily see that a similar algorithm may be substituted without materially changing the spirit or scope of this invention.

Within the smart card, the same algorithm as used by the security engine microprocessor, is used to generate a set of three hash numbers H1, H2 and H3 555. After this, by applying a linear congruency function algorithm to H1, H2 and H3 in the smart card, new hash numbers H1', H2' and H3' are calculated 557. These three hash numbers are then stored in the Key Management area of the smart card 559.

These unique hash numbers are used to check if a particular smart card is authorized for use with a particular computer. For example, before granting access to the holder of a particular smart card, the security engine compares the H1 and H3 hash number read from the security engine to the H1' and H3' hash number read from the inserted smart card. As both the smart card and security engine contain the same linear congruency function which was applied to the security engine hash numbers (Hx) to generate the smart card hash numbers (Hx'), it can easily be determined if the two hash numbers are complements. If these two hash numbers are complements, access is allowed to the computer up to the level previously determined in the security configuration.

Next, the smart card microprocessor applies an algorithm to the hash number H2' to generate a communication key (CK) to be used in the encryption and decryption of all communications between the security engine and the smart card 561. This key is also written to the Key Management area of the EEPROM of the smart card 563.

At the same time the smart card microprocessor is generating the new H1', H2' and H3' hash numbers and creating the key for encrypting communications, the security engine sets up the programming circuit for burning the communication encryption key and prime hash numbers and other information such as the security configuration and identification data, to the flash memory of the security engine. This preparation involves the security engine microprocessor writing the entire contents of the flash memory to the scratch memory 565 and generating the boot load subroutine necessary to bum the flash memory and the internal memory of the smart card which is inserted in the smart card reader 567. Once this preparation is complete, the security engine enters an 'automatic programmning' mode and writes data to the security engine and smart card internal memories 569 as follows.

First, the security engine communicates the start of the auto-burn procedure to the smart card which is inserted in to the smart card reader. This is caused by setting the line PA0 138, which connects the security engine microprocessor 125 and the smart card reader 133, to 'High'. Upon receiving this signal, the smart card microprocessor 125 sets the PB3 line 149 which is connected to the voltage regulator 145 to 'High'. Physically, this causes the PB3 line 149 to be set to 5 volts. This causes the VPP line 151 which is connected to the security engine microprocessor 125, to 10V. Through the Read and Write lines which logically connect the scratch memory 127 and the security engine microprocessor 125, a read or write signal is sent by the microprocessor 125 to the memory 127. If it is a read signal, the data which is stored in the scratch memory 127 is burned to the flash memory of the security engine microprocessor 125 following the procedure provided by the boot load subroutine. Addresses required for this burn procedure are produced by the TTL latch device 147 and are transferred through the address lines which connect the latch device 147 to the scratch memory 127 and the microprocessor 125. Similarly, data is transferred through the data lines which are between the scratch memory and the security engine microprocessor. When new data is burned to the flash memory, any data previously stored in the flash memory is erased. When the auto-bum procedure has been completed, the security engine microprocessor 125 sets line PA0 138 to 'Low' (0V) to signal its completion. The security engine microprocessor 125 then resets the programming circuit 129, the scratch memory 127 is cleared, and normal operations resume.

Whenever a new user system is set up, immediately after the creation of the SAM, MS or Slave smart card, a repair card is created. Upon termination of the program to create the system smart card, a command is sent to the BIOS instructing the user to insert a repair card 571. Upon insertion of the card 571, the security engine calculates H2 from the H2' stored in the scratch memory of the security engine 573. Then, an algorithm is used to transform this hash number in the smart card to H2' 577 which is then written to the Key Management area of the repair smart card 579. Employing an algorithm, the hash number, H2' is used to generate a communication key (CK) to provide encryption of all communications between the security engine and the repair card 581. This key is also written to the Key Management area of the repair card 583.

Once the procedure to create a repair card is complete the contents of the scratch memory are erased 585. Then a request to reinsert the newly created SAM card is made 587. Next, all allowed peripherals are read from the security configuration table stored in the security engine flash memory and are enabled 589. Following this, a command is sent to the BIOS to install the operating system (O/S) kernal and begin loading of the O/S 591.

Subsequent Set-up of Subordinate Systems

If, during the start up procedure it is determined that the computer had not previously been personalized, as indicated by the absence of personal identification data in the security engine flash memory 593, and that the inserted smart card is 'used' 521, as indicated by the presence of a 'used' code in the smart card register, a procedure to create a subordinate system using this inserted smart card can be initiated. The procedure for creating a subordinate system is shown in FIGS. 13I–13M.

Figure 13D:
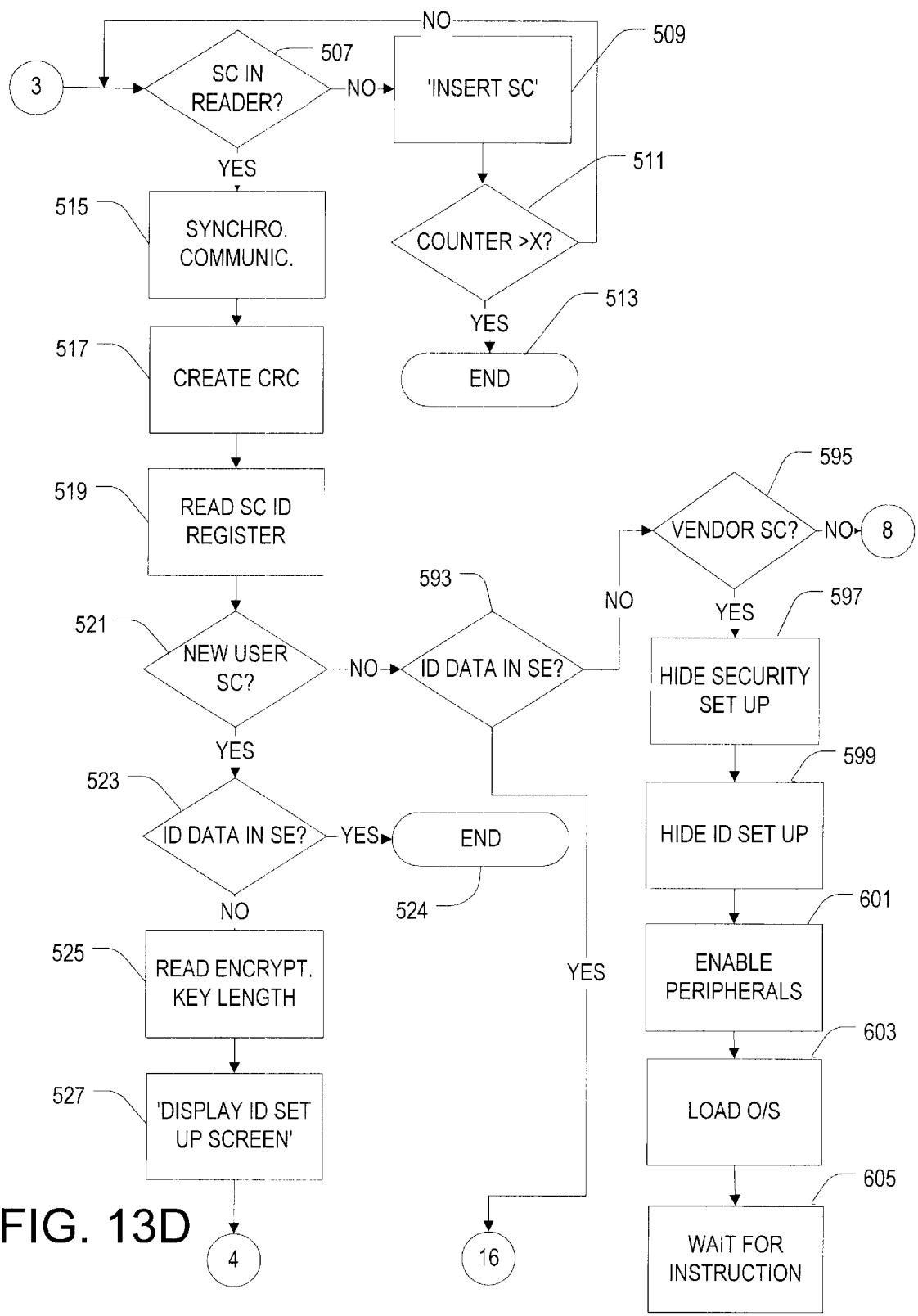
Figure 13E:
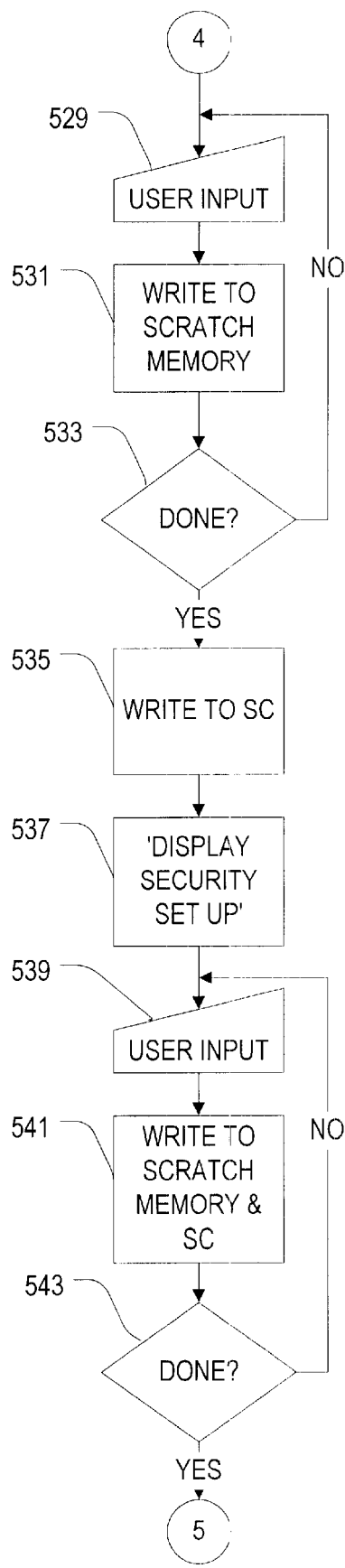
Figure 13F:
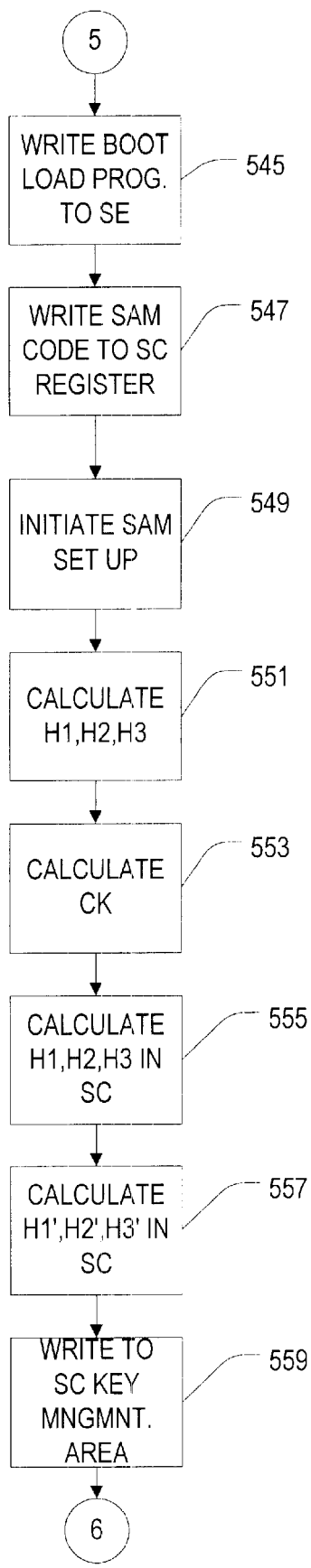
Figure 13G:
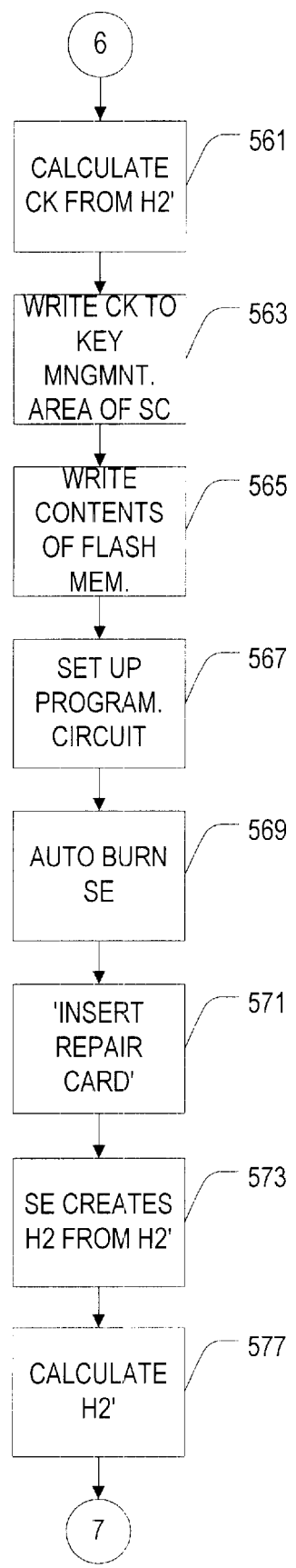
Figure 13H:
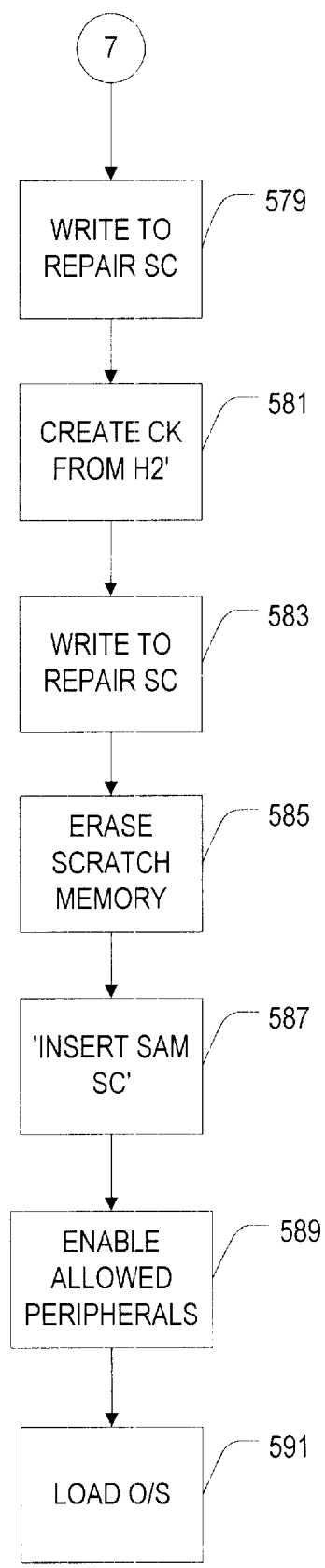
Figure 13I:
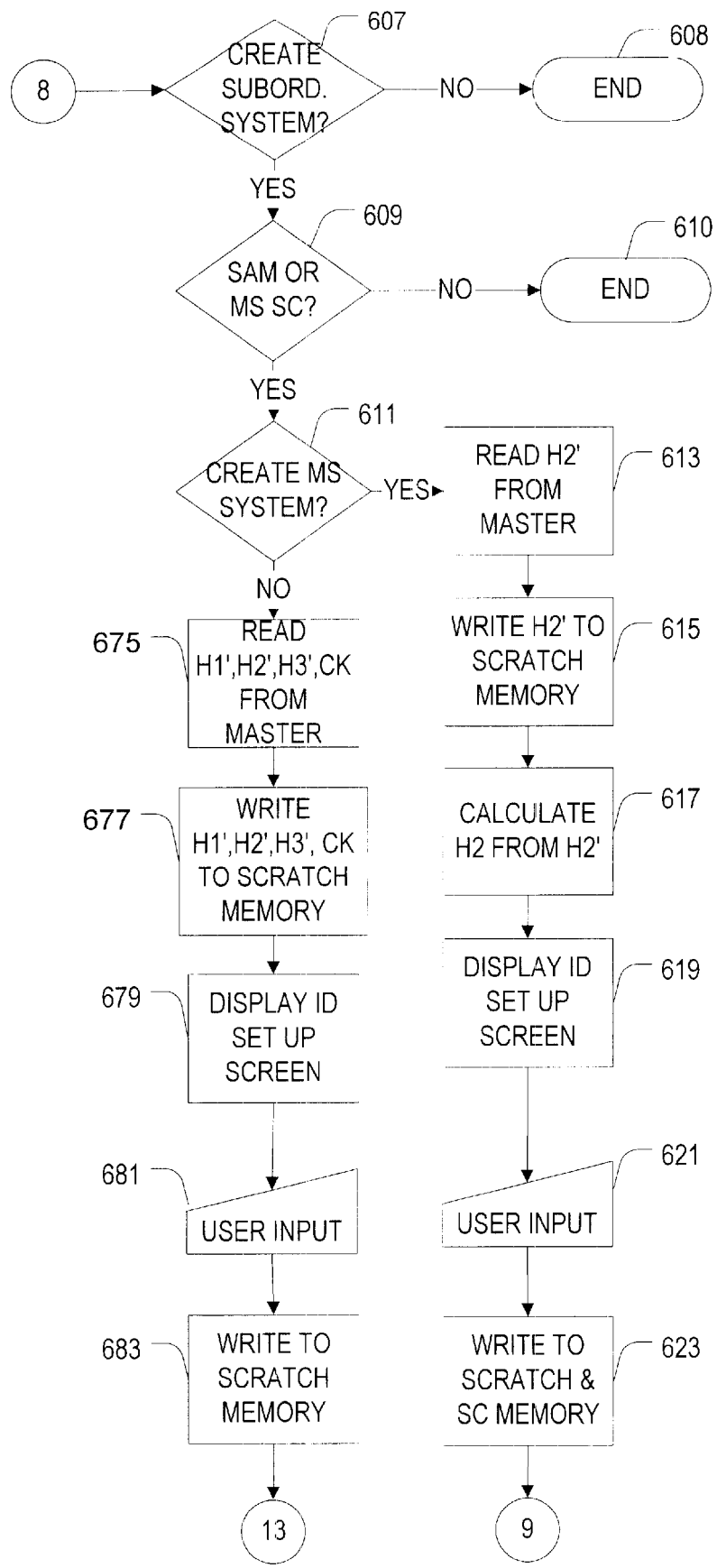
Figure 13J:
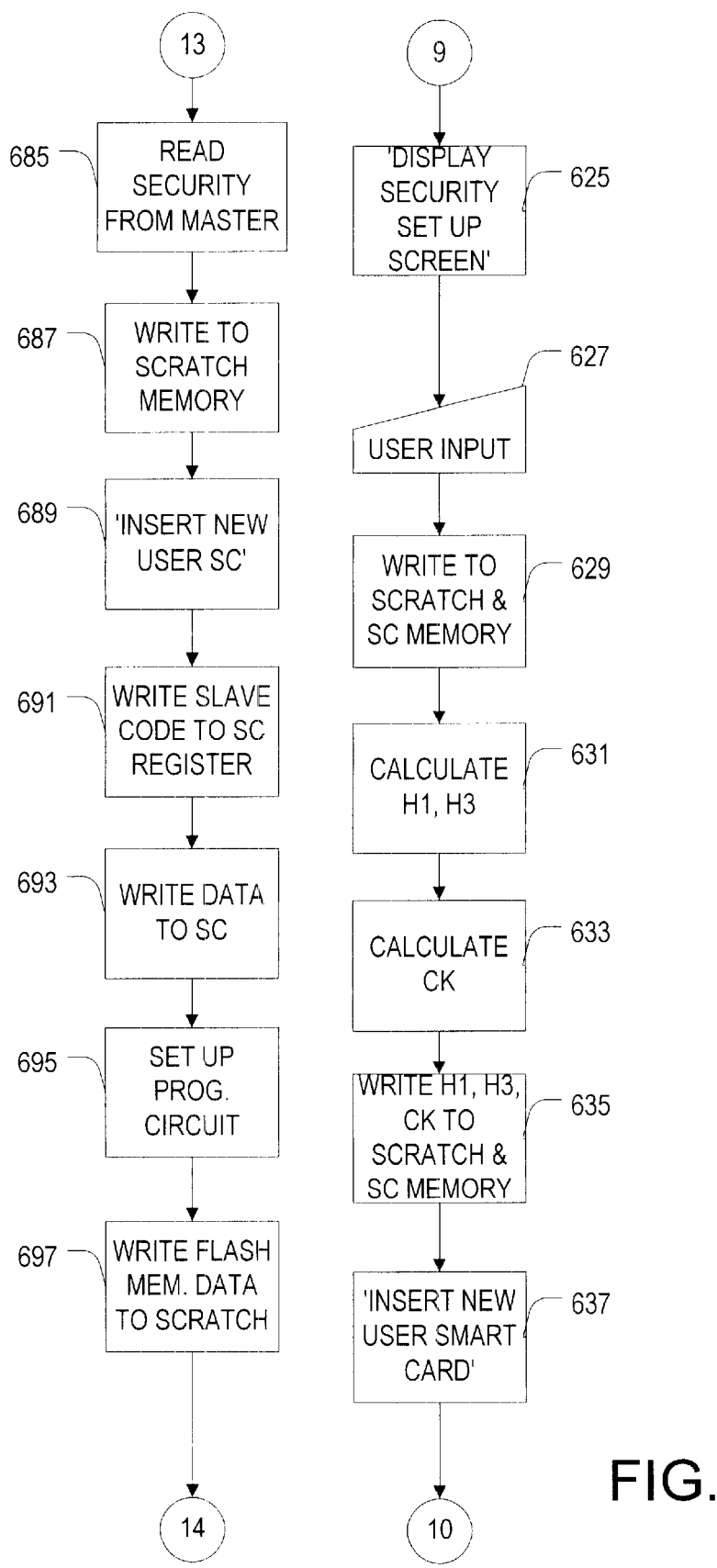
Figure 13K:
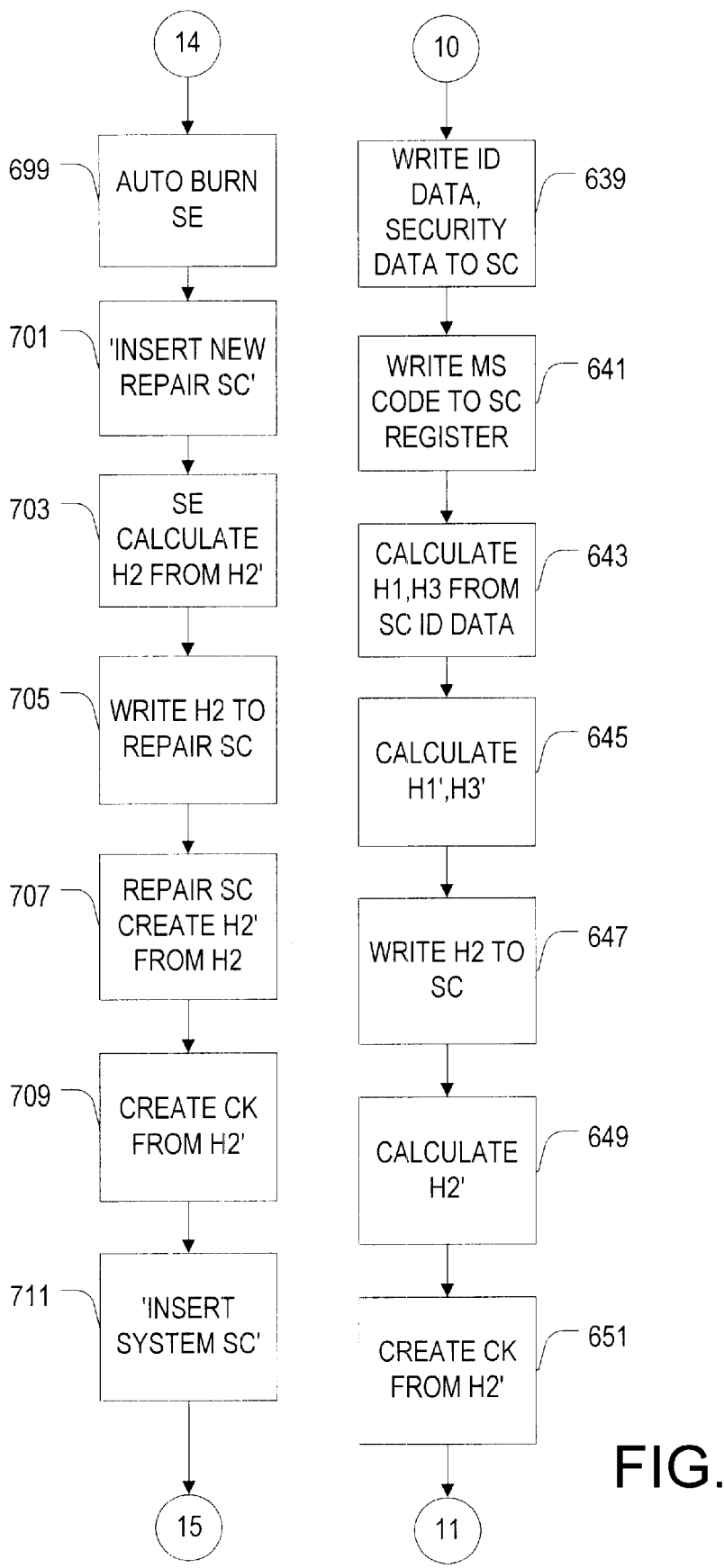
Figure 13L:
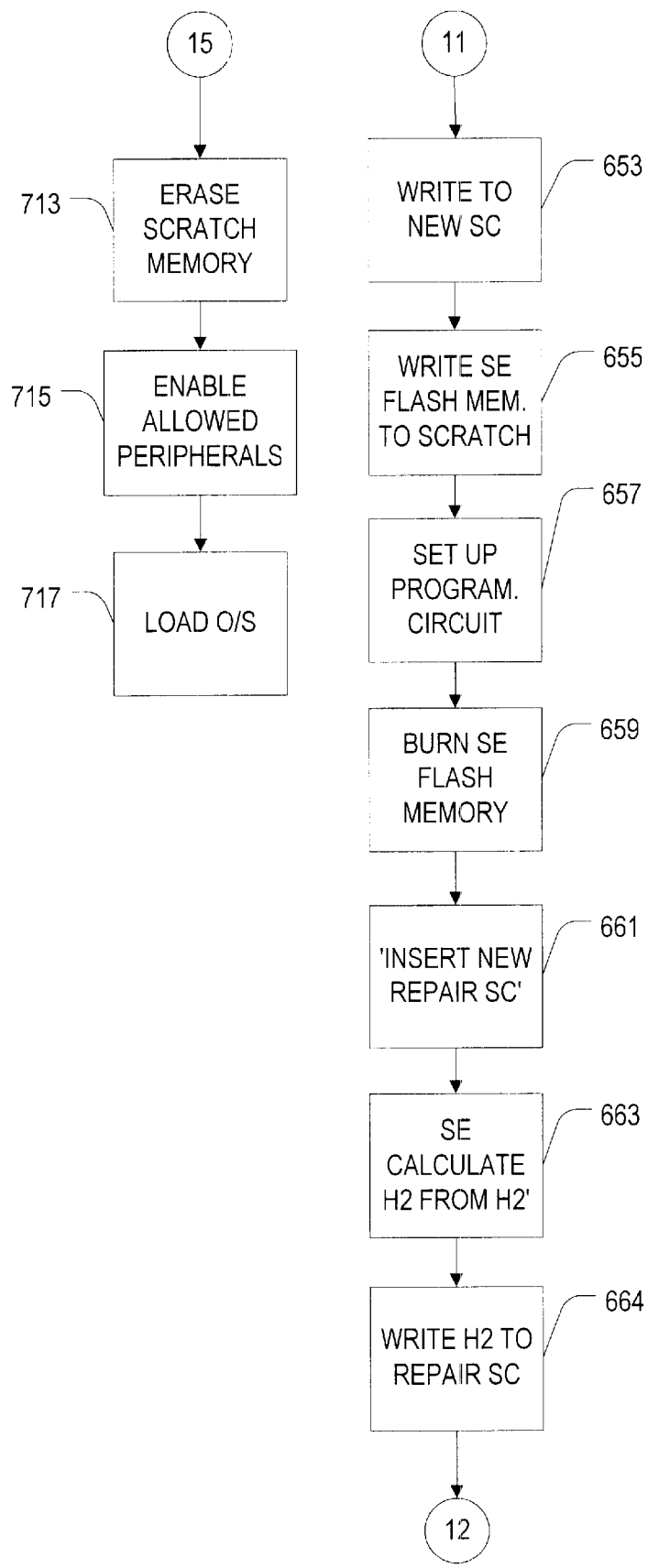
Figure 13M:
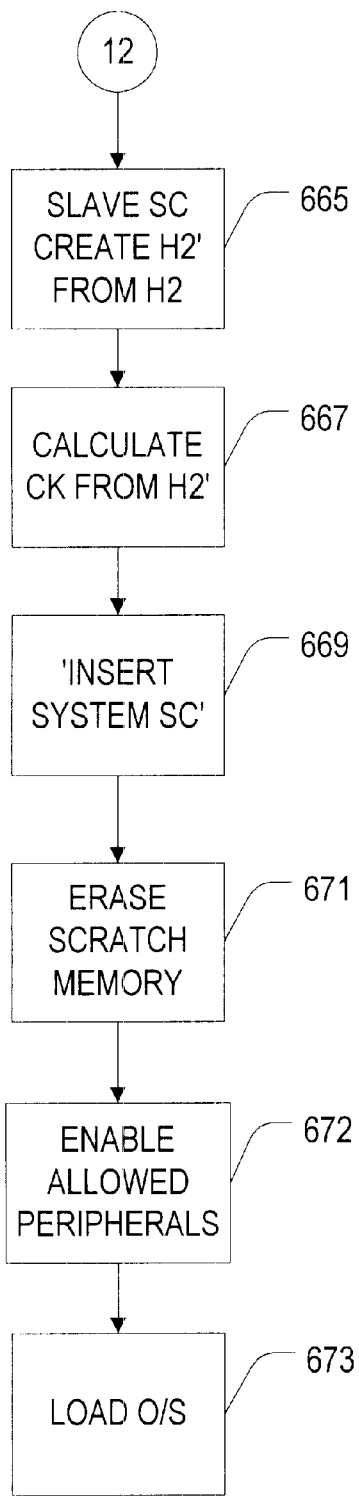

However, a check must first be made to determine if the inserted smart card is a vendor card 595. If it is, the security set up screen must be disabled 597 as well as the identification set up screen 599. Once this is done, all peripherals are enabled 601, the operating system is loaded 603 and the computer waits for instructions 605. This procedure is shown in FIG. 13D.

If the smart card inserted in the smart card reader is not a vendor smart card, the procedure to create a subordinate system is available 607. If this procedure is not initiated at this point, the start up process is terminated 608.

A SAM card or a Master/Slave card can create subordinate 'Master/Slave' (MS), or 'Slave' systems and both are referred to as a 'Master' card for this procedure. If a SAM or MS Master card is inserted in the smart card reader 609 and the option to create a MS subordinate system has been chosen 611, the following steps are taken. First, the hash number H2' is read from the Master card 613 and written to the scratch memory of the security engine 615. Using the same algorithm used by the smart card to generate the H2' number, a hash number H2 is derived from H2' 617.

At this point, a command is sent to the BIOS to display the identification set up screen 619 and the user is instructed to input the appropriate information 621. This personal data is then written to the Identification area of the Master smart card memory and the scratch memory of the security engine 623. When this is completed, the security configuration set up screen is displayed 625 and security configuration parameters inputted by the user 627. These parameters are then written to the security engine scratch memory and the Master smart card internal memory 629.

Following this, two new hash numbers H1 and H3 are created by the security engine microprocessor using the personal information previously inputted by the user 631.

Using an encryption algorithm on the previously derived H2, the security engine creates a CK 633. The two hash numbers H1 and H3 and the communication key (CK) are then written to the scratch memory buffer and the internal memory of the Master smart card 635. The storing of the subordinate system's hash numbers and communication key in the Master card's internal memory gives the Master smart card full access to the subordinate system.

The Master smart card is then ejected from the reader and the user is instructed to insert a new card 637. Once a new smart card has been inserted, the identification and security configuration data are written to the internal memory of the inserted smart card 639. If a new user card is designated to be a Master/Slave card, the identification code for this type of card is written into the command register of the smart card 641 and the set up procedure for the type of card to be created is implemented.

An algorithm stored in the smart card microprocessor is then used to generate the hash numbers H1 and H3 from the personal identification data stored in the Identification area of the smart card 643. Using a linear congruency function, these hash numbers are transformed into H1' and H3' 645. Following this, the hash number H2, which was previously read from the Master smart card and written to the security engine scratch memory, is written to the internal memory of the inserted smart card 647. An algorithm stored in the smart card is then used to generate a new hash number, H2' from H2 649. The preferred algorithm used to produce this hash number is a linear congruency function such as XOR although one skilled in the art can easily see that any similar algorithm may be substituted without materially changing the spirit or scope of this invention. Hash number H2' is transformed through the use of an algorithm to generate a communication key (CK) 651. Hash numbers H1', H2' and H3' and the communication key are then written to the Key Management area of the subordinate system smart card memory 653. Hash numbers H1', H2' and H3' and the smart card communication key are then written to the scratch memory of the security engine 655.

Next, the entire contents of the security engine flash memory is written to the scratch memory. The programming circuit is prepared 657 as previously described and the data in the scratch memory is burned in to the internal flash memory of the security engine through use of the programming circuit 659.

The new system smart card is ejected and the user requested to insert a 'Repair' card 661. When a valid Repair card is inserted, a hash number H2 is generated from the H2' stored in the scratch memory of the security engine 663. H2 is then written to the Key Management area of the Repair smart card 664. The Slave smart card microprocessor next creates H2' from this H2 using an algorithm such as the linear congruency function 665 and then generates a CK from this H2' employing another algorithm such as IDEA 667.

The repair card is then ejected and a request made to insert the subordinate system smart card 669. Following the usual synchronization and authentication routines, the scratch memory is erased 671, all allowed peripheral devices are enabled according to the parameters set in the security configuration table 672 and the operating system is loaded 673.

Using this procedure a hierarchy of Master/Slave systems can be created, each accessible by the card which was used to create it and the new card created as part of the system.

A SAM and MS card are also capable of creating a Slave system comprised of a Slave computer and Slave smart card. The procedure for this is as follows.

First, hash numbers H1', H2', H3' and CK are read from the Master card 675 and written to the scratch memory of the security engine 677. Next, the identification set up screen is displayed 679 and personal identification data is entered by the user 681 and written to the scratch memory 683. Following this, the security configuration parameters are read from the Master smart card 685 and also written to the scratch memory 687. The SAM or MS smart card is then ejected from the reader and the user is instructed to insert a new smart card 689. In the creation of a Slave system, as in the previous set up routine for a SAM or MS system, the identification code for this type of card is written into the command register of the new smart card 691.

The three hash numbers H1', H2' and H3', the CK are written to the Key Management area of the smart card memory, and the identification data and security configuration parameters are written to the Identification area of the smart card through the programming circuit 693. The programming circuit is then prepared for burning the flash memory 695 and the contents of the security engine flash memory are then written to the scratch memory 697 and all the data in the scratch memory is burned to the security engine flash memory 699.

The new system smart card is ejected and the user requested to insert a 'Repair' card 701. When a Repair card is inserted, the security engine calculates H2 from the H2' stored in the scratch memory 703. Next, H2 is written to the Key Management area of the Repair smart card 705. Then, using an algorithm, the smart card transforms the H2 to H2' 707. The Repair card microprocessor next creates a CK from H2' 709 which is used in any subsequent communications between the Repair card and its matching subordinate Slave computer.

The repair card is then ejected and a request made to insert the subordinate system smart card 711. Following the usual synchronization and authentication routines, the contents of the scratch memory are then erased 713, all allowed peripheral devices are enabled 715 and the operating system is loaded 717.

Normal Operating Procedure (After Set-up by Vendor and User)

Figure 13N:
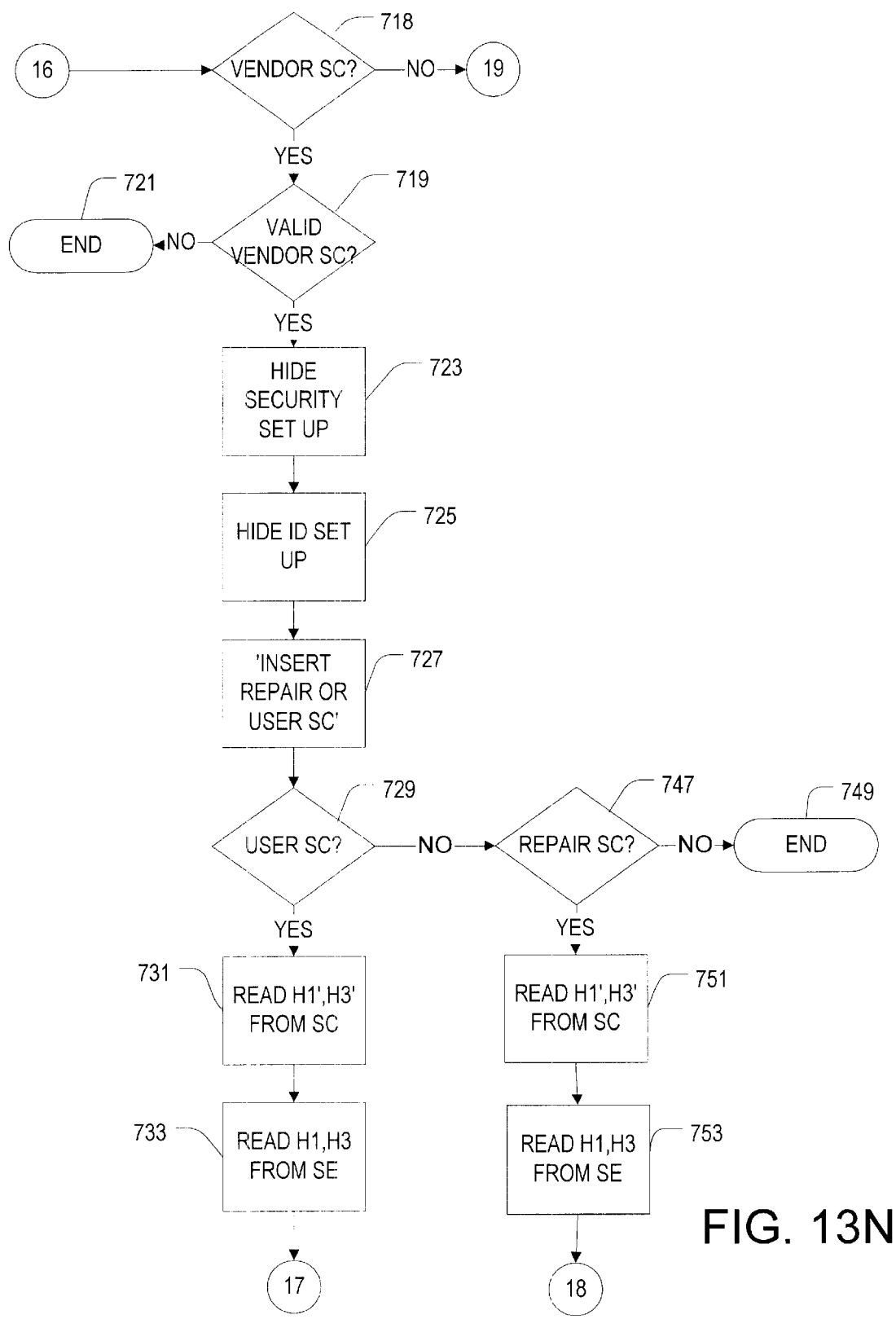
Figure 13O:
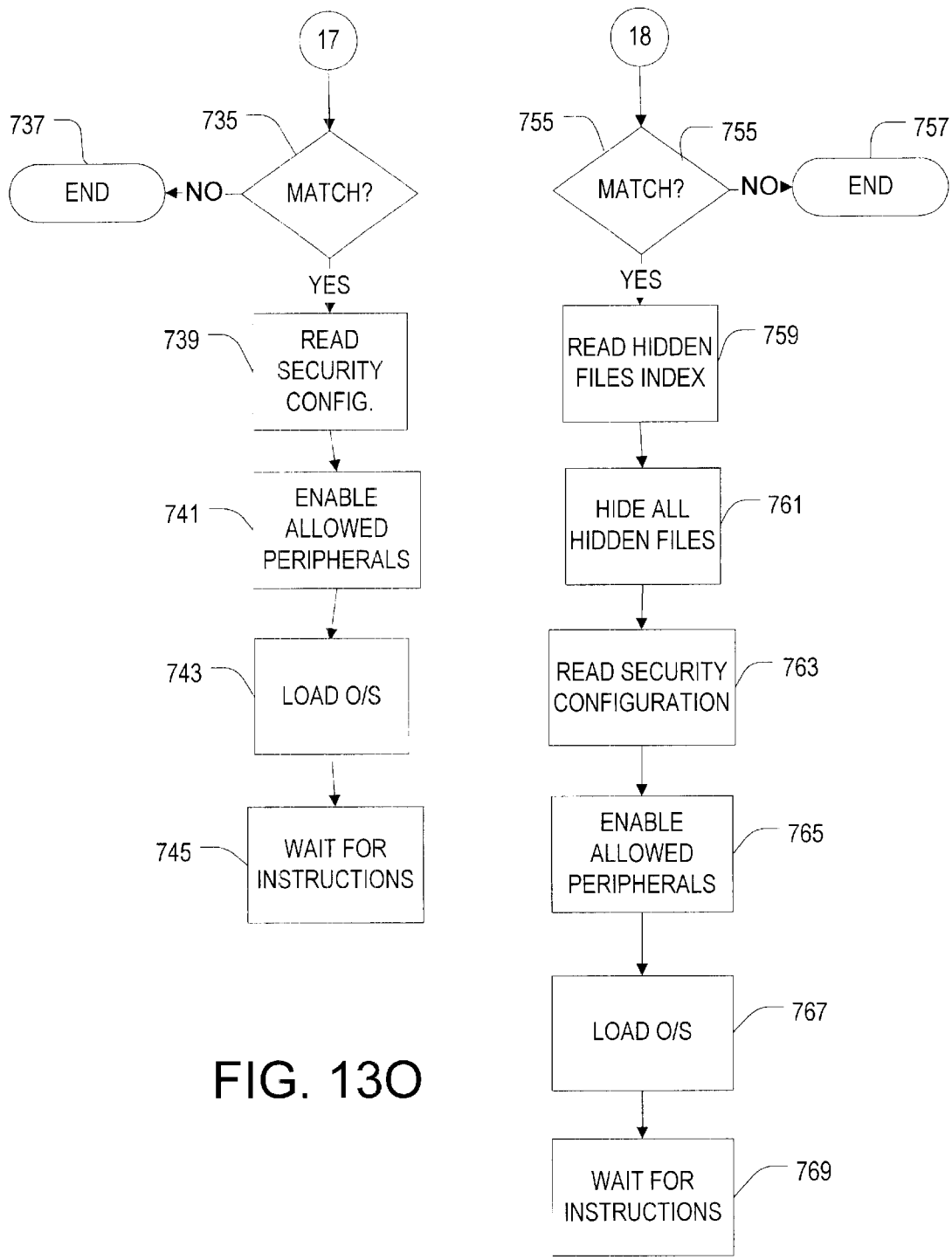
Figure 13P:
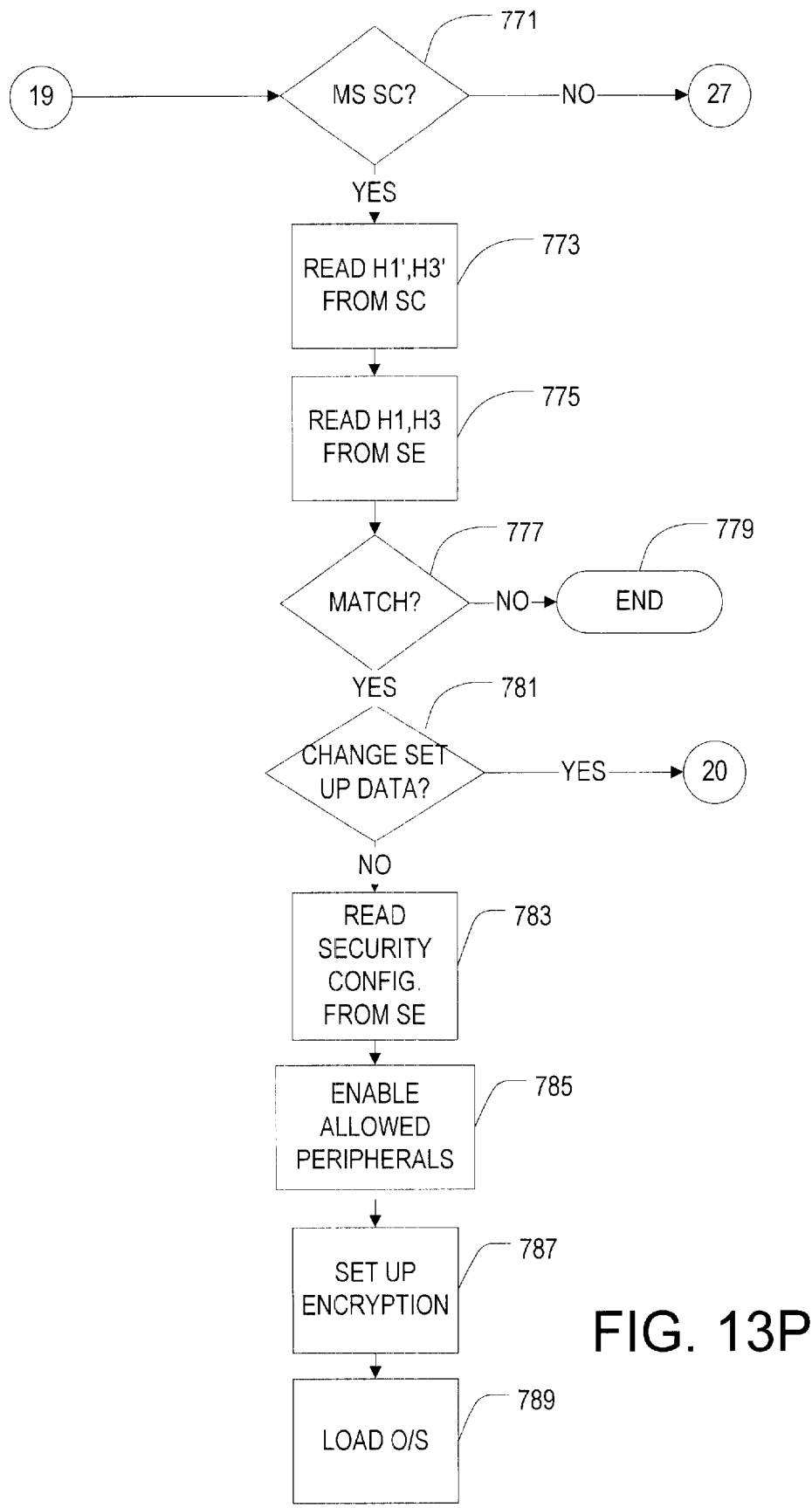
Figure 13Q:
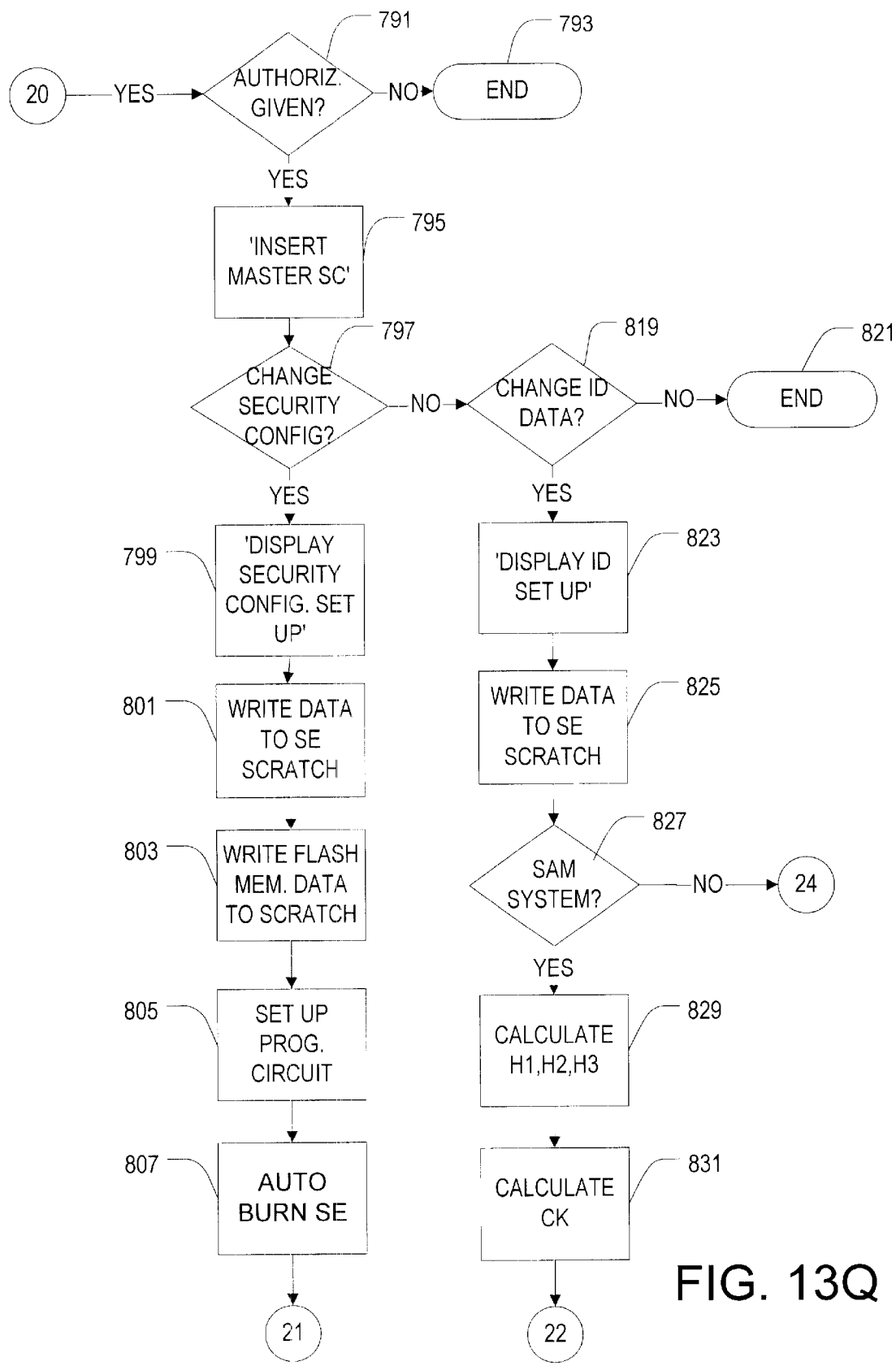
Figure 13R:
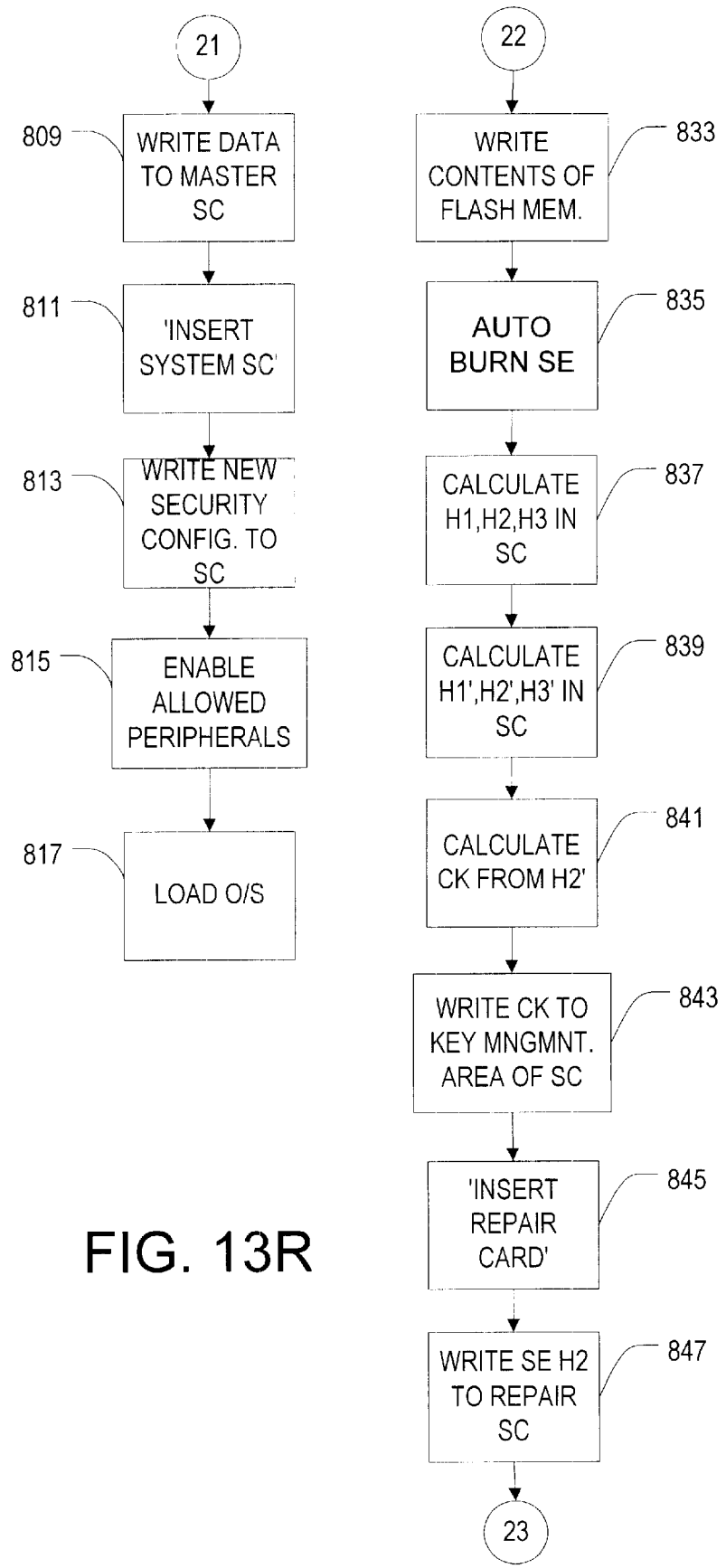
Figure 13S:
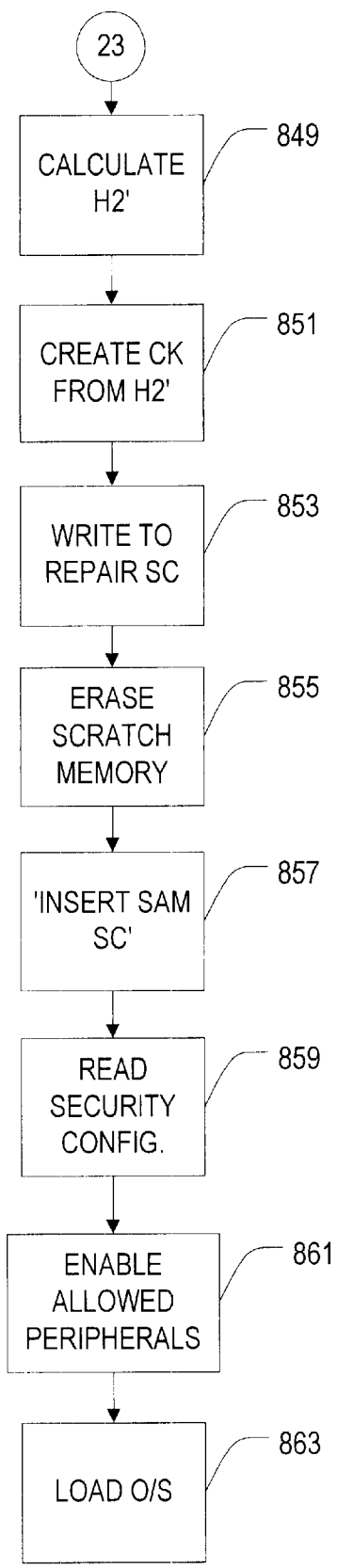
Figure 13T:
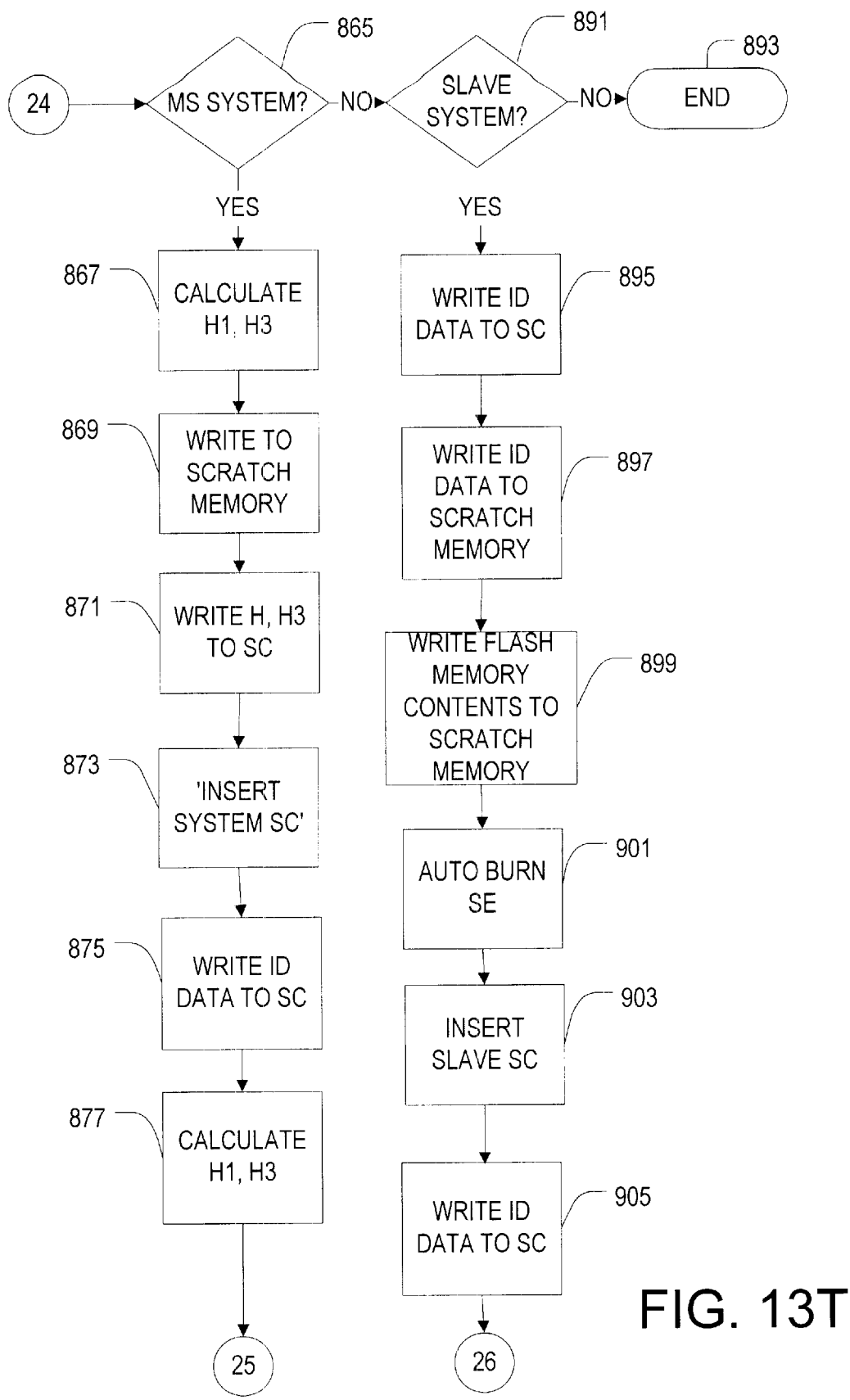
Figure 13U:
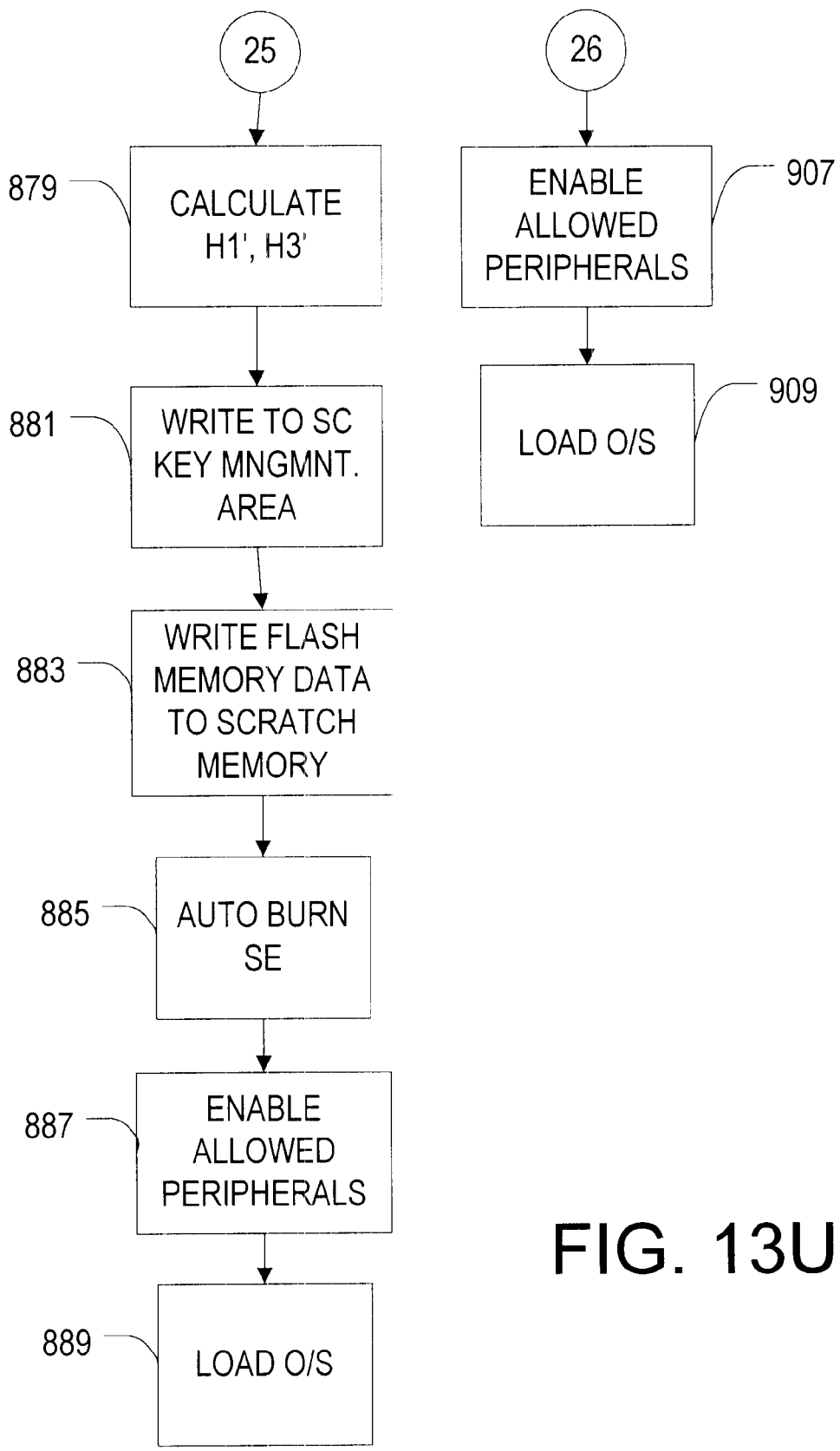

FIGS. 13N, 13O & 13P show the normal operating procedure for a computer system containing the present invention once it has been fully set up. If the computer containing the present invention had previously been set up by a vendor 467 and a valid, previously set up smart card is inserted in the smart card reader 521, and there is personal identification data in the security engine 593 the smart card registers are read to determine if the inserted smart card is a 'vendor', 'user', or 'repair' type smart card.

If the card is of the 'vendor' type 718, the security engine microprocessor determines if it is a valid vendor type smart card 719. If the decrypted code does not match those assigned to vendor cards, the start up procedure is terminated 721. If it is, a command is sent to the BIOS to hide the security set up routine 723 and the personal identification set up routine 725. Then a command is sent to the BIOS instructing the user to insert a user or repair card 727.

If the subsequently inserted smart card is a user smart card, communication is synchronized between the inserted smart card and the security engine as occurs every time a smart card is inserted in the smart card reader 729. Next, H1' and H3' hash numbers are read from the smart card 731 and H1 and H3 hash numbers are read from the security engine flash memory 733. The smart card H1' and H3' are then compared to the security engine's H1 and H3 735. The preferred algorithm for this authentication procedure is the Gillou-Quisquater scheme although one skilled in the art can easily see that a similar algorithm may be substituted without materially changing the spirit or scope of this invention. If a match does not exist, the memory buffer is erased, all peripherals except the monitor, keyboard and card reader are hidden and the start up procedure is terminated 737. If the hash numbers in the smart card and security engine memories do match, the security engine microprocessor reads the security configuration parameters from the flash memory 739 and all allowed peripheral devices are enabled 741. Following this, the operating system is loaded 743 and the system waits for further instructions 745.

If the code register indicates that the inserted smart card is a 'repair' type smart card 747, a process to authenticate the repair card is initiated. If the inserted smart card is not a repair card, the start up process is terminated 749. For the authentication procedure of the repair card, the H2' hash number is read from the smart card 751 and H2 is read from the security engine 753. These two hash numbers are then compared and if they are found to match 755, the index of hidden files are read from the repair card 759 and all the files in the index are hidden before the start up procedure continues 761. If a match is not found, the start up is terminated 757. Following this, the security configuration parameters are read from the security engine memory 763, all allowed peripheral devices are enabled 765, the operating system is loaded 767 and the system waits for further instructions 769.

If it is ascertained that a valid, previously set up, 'user' card has been inserted 771, the security engine microprocessor initiates an identification procedure. This procedure involves checking to see if the inserted smart card is authorized to operate that particular computer. The hash numbers H1' and H2' stored in the Key Management area of the smart card are read by the security engine 773 and H1 and H2 are also read from the security engine memory 775. These two sets of hash numbers are then compared using an algorithm stored in the security engine flash memory 777. The preferred algorithm for this authentication procedure is the Gillou-Quisquater scheme although one skilled in the art can easily see that a similar algorithm may be substituted without materially changing the spirit or scope of this invention.

If a match does not exist, a check is made of other hash numbers possibly stored in the Key Management area of the smart card to see if the smart card inserted is the Master smart card which created the system. If no match is made, the start up procedure is terminated 779.

If a match does exist and all security procedures are determined to be in place, a check is next made to determine if any changes are to be made to the identification data or the security configuration parameters 781. If none are to be made, a command is sent to the BIOS to read the security configuration look up table stored in the flash memory of the security engine 783. The BIOS then calculates which peripherals are allowed to be loaded by checking the appropriate entry in the security configuration table of the security engine. The BIOS next enables all allowed peripherals through the enable/disable circuits and does a self test of these peripherals and the main BUS 785. A check is then made for system errors. Following this, the BIOS sends a ready command to the security engine. The BIOS then sets up the real time encryption and decryption procedures for all selected peripheral devices such as data storage devices or data communication devices 787. Finally, the BIOS kernel which contains the address for the operating system is installed and the first entry to the operating system, which is stored in a data storage device on the computer, is retrieved, the operating system loaded and the computer ready to operate 789.

Changing of Personal Identification Data and Security Configuration:

The procedure for changing the personal identification data or the security configuration parameters is shown in FIGS. 13Q, 13R, 13S, 13T & 13U. During the boot phase of the computer's start up procedure, the personal information and security configuration stored in both the security engine and smart card memories may be changed if the proper authorization is provided 791. If the proper authorization is not given, the start up procedure is terminated 793. Optionally, changes to the Identification data and security set up could require the additional security feature of a password or PIN (Personal Identification Number) number. If during the boot phase, a specific key on the keyboard is pressed, a routine will be implemented which will allow the display and changing of the Identification data and security configuration if the proper smart card has been inserted. Through this, the system configuration may also be changed such as when a peripheral is to be removed or added to the system. Vendor and repair cards, as they contain no personal identification data, cannot be altered.

SAM systems can have the personal identification and configuration information changed only if the SAM card which matches the SAM computer is inserted in the card reader. An MS system's identification data can only be altered if the SAM or MS card that was used to create that particular MS system is present. The Identification data in a Slave system can only be changed if the MS or SAM card which was used to create that Slave system is inserted in the system's smart card reader at the time the changes are to be made.

When the appropriate key is pressed during the boot phase of the computer, a check is made to see if the Master smart card which was used to create the system is inserted in the smart card reader. If it is not, a command is sent to the BIOS to display a message to insert the 'Master' card 795. If it is inserted within a preset number of tries, the information change procedure is continued. Next, after communications between the computer's security engine and Master smart card are synchronized the set up screen to be changed is determined.

If the security configuration is to be changed 797, it is displayed 799 and the user inputs any new parameters. This new data is then written to the scratch memory of the security engine 801, and when all the changes have been entered, the procedure to bum this new data to the flash memory is initiated. As was previously described, this involves the writing of all data stored in the flash memory to the scratch memory 803, the setting up of the programming circuit 805 and the writing of the data in the scratch memory to the flash memory 807. The new data is also written to the Master smart card 809. A command is then sent to the BIOS to insert the system smart card 811 and the new security configuration is written to this smart card 813. According to the parameters of the new security configuration, all allowed peripheral devices are enabled 815 and the operating system loaded 817.

If personal information data is to be changed 819, a command is sent to the BIOS to display the personal identification screen 823. If neither the security configuration parameters or the personal identification data are selected to be changed, the start up is terminated 821. If the personal identification data is to be changed, a password may need to be entered in order to proceed with the change routine. If the authentication procedure is successful, changes can be made to the identification data and are written to the appropriate security engine look up table in the scratch memory of the security engine 825 and the internal memory of the inserted Master smart card. The next steps in this procedure depends on whether the system being changed is a SAM, MS or Slave system.

If it is a SAM system, the same procedure as for the original set up of a SAM system is initiated 827. The first step in this process is the calculation of hash numbers H1, H2, and H3 from the new identification information 829. Using an algorithm on H2, a CK is calculated 831. These three hash numbers and the CK are stored in the security engine scratch memory in preparation for later burning to the flash memory. Following this, the entire contents of the security engine flash memory, including the identification and security configuration look up tables, are written to the scratch memory along with the new hash numbers and CK 833. This data in scratch memory is then written to the flash memory of the security engine microprocessor through the use of the programming circuit 835.

Next, in the inserted smart card H1, H2 and H3 are calculated using an algorithm stored in internal memory 837. These three hash numbers are then changed to H1', H2' and H3' through the use of the linear congruency algorithm stored in the Key Management area of the smart card memory 839. From H2', using the IDEA algorithm, a CK is calculated 841. These Hx' hash numbers and Ck are then written to the Key Management area of the smart card 843.

These new H1', H2' and H3' numbers stored in the smart card take precedence over any hash numbers currently stored in internal memory. The new communication key generated also takes precedence over the old communication key. In order to enable communications with subordinate systems which were set up using the 'old' CK and hash numbers, the 'old' CK and hash numbers remain in both the smart card Key Management area and in the flash memory of the security engine. Due to the storage of the hash numbers for subordinate systems in the Key Management area, any changes made to the SAM card will not affect its ability to access and operate subordinate systems which it created.

Once these changes to the system security engine and Master smart card have been made, a command is sent to the BIOS for the user to insert the repair card in to the smart card reader 845. If the proper repair card is inserted in to the smart card reader, the H2 hash number stored in the flash memory of the security engine microprocessor is written to the repair smart card. Using a linear congruency algorithm, the hash number H2' is then calculated 849. The IDEA algorithm is then used on H2' to generate a repair card CK 851. The H2' and CK are next written to the Key Management area of the repair smart card 853. Following this, the contents of the scratch memory are erased 855, the repair card ejected from the smart card reader and a request to insert the SAM card is displayed 857. When the correct SAM card is inserted into the smart card reader, after the synchronization procedure, the security configuration parameters are read by the security engine microprocessor 859, all allowed peripherals are enabled 861, and the operating system loaded 863.

If changes are made to the personal identification data of an MS system 865, once the changes have been entered, the security engine microprocessor creates new H1 and H3 hash numbers from this information 867. These two hash numbers are written to the scratch memory of the security engine 869 and the internal memory of the Master smart card inserted in to the smart card reader 871. The H2 hash number remains the H2 from the Master card that was originally used to create the MS system. The Master card is then ejected and a request to insert the system smart card is displayed 873. When the system MS card is inserted into the card reader, the new identification information is written to the smart card 875 and new hash numbers H1 and H3 are calculated using an algorithm stored in internal memory 877. Using another algorithm, H1' and H3' are generated from H1 and H3 879. H2' remains the one which was originally created from the Master card H2. The new H1' and H3' are written to the Key Management area of the system smart card 881. As the H2 and H2' are the same as before, the communication keys and the hash number stored in the repair card are also unchanged from those previously generated. Once the system smart card is updated, preparation for updating the system security engine flash memory with the new identification information and hash numbers is begun. This involves the writing of the contents of the flash memory to the security engine scratch memory 883 and the burning of this data and the new data back to the flash memory 885. The scratch memory in the security engine is then erased, the security configuration parameters read by the security engine microprocessor and all allowed peripherals enabled 887. Finally, the operating system is loaded 889.

Changes also may be made to the identification data of a Slave card 891, but as the set of hash numbers are taken directly from the Master system which created it, this will not alter the Slave system's hash numbers or communication key. If it no changes are to be made to the system, the start up procedure is terminated 893. Any new data is written to the Identification area of the Master card that created the Slave system 895, and to the scratch memory of the Slave computer 897. The system is then prepared to burn the new information to the flash memory. First the contents of the flash memory are written to the security engine scratch memory 899, and this data and the new identification information are burned to the flash memory 901. The Master card is then ejected and a request to insert the system Slave smart card is displayed 903. Upon the insertion of the correct Slave card the new identification data is written to the Identification area of the Slave smart card 905. Next, the security configuration parameters are read by the security engine from the flash memory, all allowed peripheral devices are enabled 907, and the operating system loaded 909.

Repair Card Operation

Figure 13V:
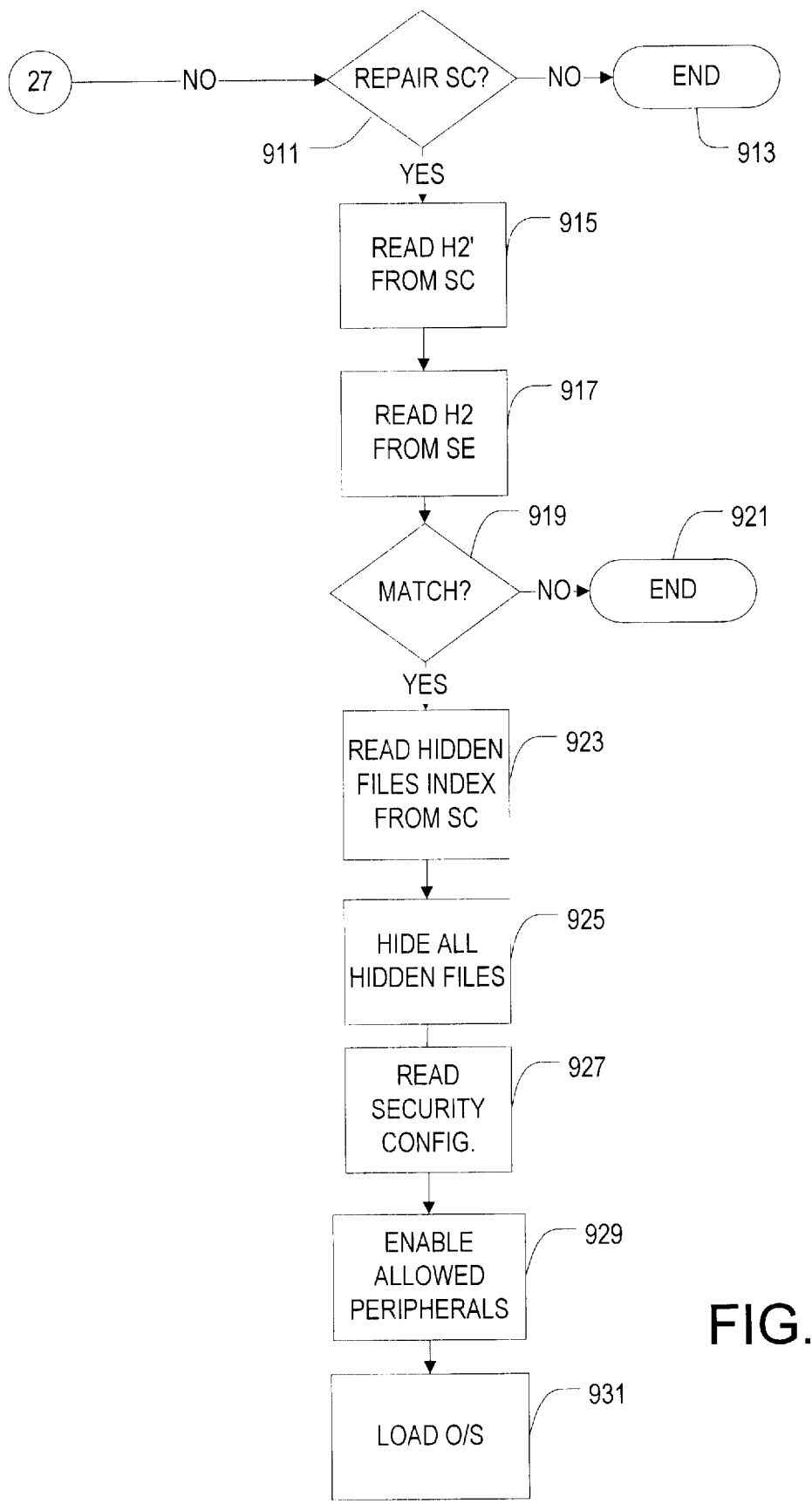

The normal operating procedure for a repair card is shown in FIG. 13V. If during the start up of a system containing the present invention it is determined that the vendor set up procedure had previously been completed 467, a 'used' smart card is inserted in the smart card reader 521, the computer system's set up procedures had been performed 593, and that the inserted smart card is not a vendor 718, or user smart card 771, a check is made to determine if the register code is for a repair smart card 911. If it is not, the start up procedure is terminated 913.

If the smart card register indicates that the inserted smart card is a repair card the first step is the reading of the hash number H2' from the repair card 915. Next, H2 is read from the flash memory of the security engine 917. These two hash numbers are compared by the security engine microprocessor using the Gillou-Quisquater algorithm 919 and if they do not match, the start up procedure is terminated 921. If they do match, the list of hidden files stored in the internal memory of the smart card is read 923 and all restricted files are hidden 925. Next, the security parameters are read from the security engine flash memory 927 and all allowed peripheral devices are enabled 929. The operating system is then loaded and the computer waits for instructions 931.

Real Time Data Encryption/Decryption (ISA):

Upon receipt of the command to encrypt or decrypt some data, the device driver for the peripheral which is involved in this operation and that received this command creates a header that contains the specific parameters for this task. The device driver then sends this header to the circular memory buffer through the ISA Bus. This memory buffer for the ISA Bus is depicted in FIGS. 11A and 11B. When an I/O read or write procedure that requires encryption is encountered by the device driver(s) involved, a signal is sent to the PAL 332 through the ISA Bus 333, setting up a particular address in the PAL. This address causes the HEADER_ HANDSHAKE line 359 to be asserted. This signal goes to the security engine microprocessor 125 interrupting the microprocessor and causing it to read the header previously placed in the circular memory buffer. With this header information, and the encryption parameters set previously by the user and stored in the security engine internal memory the encryption or decryption procedure is performed by the security engine microprocessor.

Utilizing the parameters set by the header, the security engine microprocessor reads data from the circular memory buffer, if available, then encrypts or decrypts the data as required. This data is then written to the circular memory buffer and then sent on to the appropriate peripheral device.

When an I/O write procedure is asserted through the ISA Bus a CSWR (chip select write) signal which goes through line CSWR 375 is generated by the I/O Address Mapping PAL IC. When an I/O read procedure is asserted through the ISA Bus a CSRD (chip select read) signal is generated through the CSRD line 381. At the same time, a signal is sent to the RD_STATUS line 345 setting it to Low enabling the status of the circular memory buffer to be checked. Upon the generation of a CSWR or CSRD signal, the device driver that originally initiated the I/O read or write procedure checks to see if the circular memory buffers involved are empty or full through the RD_STATUS line 345. This information is sent to the device driver layer through the data Bus 387 of the ISA Bus. The four status flag lines SEC_ ENGINE_RD_EMPTY 365, SEC_ENGINE_RD_FULL 393, SEC_ENGINE_WR_EMPTY 397, and SEC_ ENGINE_WR_FULL 367 connected to the two pairs of read and write circular memory buffers 363, 383, & 377, 379 allow the security engine microprocessor 125 to obtain the memory status of the circular memory buffer and decide to proceed or wait as required.

If an I/O read procedure was initiated by a device driver and the RD_STATUS 345 returns that the two circular memory buffers designated for read procedures are empty, the device driver enters into a wait state until data is in the circular memory buffer. When data is ready to be transmitted by the security engine to the circular memory buffer, the line SEC_ENGINE_WR (security engine write) 391 is set to Low by a pull up resistor and the data written to the circular memory buffer by the security engine. This data comes from the security engine through the DO lines 389. The data may have been encrypted or decrypted in the security engine depending on the setting chosen. If data is available to read, the PAL of the I/O Address Mapping circuit 332 asserts the IOCS16 line 341 and generates a 16 bit data transfer signal and data is sent from the circular memory buffer, through the SD lines 387 of the circular memory buffer to the ISA Bus and then to the device driver.

If an I/O write procedure was initiated by a device driver and the RD_STATUS 345 returns that the two circular memory buffer designated for write procedures 377, 379 are full, the device driver enters into a wait state until there is space in the circular memory buffer for more data. When data is ready to be transmitted to the security engine from the circular memory buffer, the line SEC_ENGINE_RD (security engine write) 395 is set to Low by a pull up resistor and the data read from the circular memory buffer by the security engine. This data goes to the security engine through the DO lines 389. The data may then be encrypted or decrypted in the security engine depending on the setting chosen. If space in the circular memory buffer is available to write, the PAL of the I/O Address Mapping circuit 332 asserts the IOCS 16 line 341 and generates a 16 bit data transfer signal and data is sent from the circular memory buffer, through the SD lines 387 of the circular memory buffer to the ISA Bus and then to the device driver.

Real Time Data Encryption/Decryption (PCI):

When a write or read procedure which requires encryption or decryption of data which is transferred through the PCI Bus, the device driver which received this command, generates a read or write register at address 0xC0000000 in the local Bus. This is performed through the PCI Bridge to Local Bus Interface IC 137 of FIG. 12 and is sent to the programmable device 141 through the Local Bus Address line 407. Up to eight bits of command data are sent to this or any other address on the programmable device through the ID (0 . . . 7) line 405.

If it is a write procedure, which is indicated by a write command at address 0xC0000000 sent to the programmable device by the device driver, the programmable device 141 next checks the SEC_ENGINE_WR_FULL line 439 to ascertain the memory status of the WRITE circular memory buffer 139*a*. If this line is set to High (5V), this indicates that the WRITE circular memory buffer is not full and therefor the write procedure may proceed. The data to be written is passed from the computer RAM 107, through the PCI Bus 108 to the PCI Bridge to Local Bus Interface IC 137. It is then passed through the Local Bus 405 to the programmable device 141 and to the WRITE circular memory buffer 139*a*. This data is then passed on to the Security Engine microprocessor 125, through the SEC_ENGINE_DATA_BUS line 445, where it is encrypted or decrypted as required and then passed back through the SEC_ENGINE_WR line 451 to the READ circular memory buffer 139*b*. This data is then passed to the PCI Bridge to Local Bus Interface IC 137 through the ID line 405. From here, the data can enter the PCI Bus 108 to go where the procedure requires.

If the SEC_ENGINE_WR_FULL 439 line is set to Low (0V), this indicates that the WRITE circular memory buffer 139*a* is full and therefor the device driver enters into a wait state until there is memory space in the circular memory buffer for data to be passed. A setting of Low on the SEC_ENGINE_WR_FULL line 439, causes the WRITE_ FULL line 431 of the L_INT line 423 in the Local Bus to be set to Low. This triggers an interrupt signal which travels through the PCI Bridge to Local Bus Interface IC 137 to the PCI Bus 108 and back to the device driver. The device driver then enters into a wait state until the interrupt signal is no longer being received.

If it is a read procedure, which is indicated by a read command at address 0xC0000000 sent to the programmable device 141 by the device driver, the programmable device checks the SECURITY_ENGINE_RD_EMPTY line 449 to ascertain if the memory status of the READ circular memory buffer 139*b*. If this line set to High (5V), this indicates that the READ circular memory buffer is not empty and therefor the read procedure may proceed. The data to be read is passed from the peripheral device where it resides, through the PCI Bus 108 to the PCI Bridge to Local Bus Interface IC 137. It is then passed through the Local Bus ID line 405 to the READ circular memory buffer 139b. This data is then passed on to the Security Engine microprocessor 125, through the SEC_ENGINE_DATA_BUS line 445, where it is encrypted or decrypted as required and then passed back through the SEC_ENGINE_RD line 443 to the WRITE circular memory buffer 139a. This data is then passed to the PCI Bridge to Local Bus Interface IC 137 through the ID line 405. From here, the data can enter the PCI Bus 108 to go where the procedure requires.

If the SEC_ENGINE_RD_EMPTY line 449 is set to Low (0V), this indicates that the READ circular memory buffer 139b is empty and therefor the device driver enters into a wait state until there is data in the circular memory buffer to be read by the device driver. A setting of Low on the SEC_ENGINE_RD_EMPTY line 449, causes the programmable device 141 to set the READ_EMPTY line 430 in the Local Bus to be set to Low. This triggers an interrupt signal which travels through the PCI Bridge to Local Bus Interface IC 137 to the PCI Bus 108 and back to the device driver. The device driver then enters into a wait state until the interrupt signal is no longer being received.

Personalized Encryption:

As previously noted, this invention can be used to encrypt data for receipt by another computer containing this invention which can only be decrypted by the recipient system and no other. This involves the modifications to the DDL which allows for the creation of a unique header for the data to be sent to another system. This header contains the size of the plaintext to be encrypted, or the size of the encrypted code to be decrypted; the type of operation to be performed—whether involving a storage device, network or modem; the number of plaintext divisions required given the circular memory buffer capacity and a parameter from the personal identification data from the target computer as well as its unique serial number.

Upon receiving a call from an application to prepare (encrypt) data for receipt by another computer containing this invention, the modifications to the DDL cause it to create a unique header as described previously. This header, along with the data to be encrypted, is written to the FIFO of the Circular Buffer and read by the security engine microprocessor to the security engine scratch memory buffer. The procedure for this follows that for real time encryption/decryption as previously described for this invention. The security engine microprocessor then uses the header information as a key in an algorithm to encrypt the plain text data. The preferred algorithm for this is IDEA although one skilled in the art can easily see that an algorithm that performs a similar function may be substituted without materially changing the scope or spirit of the invention.

Next, the header and the encrypted data are encrypted through the use of the public key encryption algorithm. The preferred algorithm for this is RSA although one skilled in the art can easily see that an algorithm that performs a similar function may be substituted without materially changing the scope or spirit of the invention. Once again following the procedure as described for real time encryption/decryption for this invention, the encrypted header and data are written to the FIFO of the circular buffer and to the peripheral device as directed by the DDL.

Upon receiving the encrypted data and header, the DDL of the target computer, when it receives the call to read and display this encrypted package, writes it to the security engine scratch memory buffer through the circular buffer. In the scratch buffer, the header and data are decrypted using the public key algorithm stored in the internal memory of the security engine. This results in a header which is completely decrypted and the data block which is still encrypted with the header key.

In order to check if this data was intended for the recipient computer, the CMOS table containing the target computer's personal identification information is written to the scratch memory buffer of the security engine. The security engine microprocessor then compares the personal information parameter provided in the header and the identification number with the same parameter field and identification number field written from the security engine flash memory. If both items match, the decryption procedure is allowed to continue. If either of the items do not match those from the recipient computer, the decryption procedure is terminated and the data remains encrypted.

Identification Over a Network:

The present invention also allows a 'personalized' computer system that contains this invention to identify and authenticate another 'personalized' computer connected to it in a network. In order to authenticate the identity of a second computer the first computer sends an identification request through application software which operates under the current operating system. This identification request is encrypted by a public key algorithm then forwarded through the network connection to the second computer. This request contains a request for selected identification data parameters which can be compared with the same parameters stored in a database of the requesting computer system. These parameters can include special identification codes that are stored in the Application area of the smart card. Upon receiving this request, the identification request is stored in the scratch memory buffer of the security engine and decrypted using the same public key algorithm as in the first computer. Next, an application in the second computer calls the appropriate device driver which in turn generates a header containing the address of the parameters requested and the identification task. If data is also requested from the Application area of the smart card, the unique two byte code for the specific application and the index location of the data required must also be included in the header. This header is sent to the security engine microprocessor which reads the desired identification data from the personal identification look up table in the flash memory and the identical table in the internal memory of the smart card. The secret identification number also stored in the flash memory is also read and both groups of data are written to the internal RAM of the security engine microprocessor.

Next, an encryption algorithm is used on the personal identification data to generate a hash number. The resulting hash number is then passed through a linear congruency function with the secret identification number creating an encrypted identification packet. This packet is then encrypted once more using the public key encryption algorithm.

This encrypted identification packet is then passed back to the first computer and received by the application which made the identification request. A call is then made to the appropriate device driver to decrypt this packet and authenticate the identity of the second computer. Upon receiving this call, the DDL creates a header for the packet which specifies the parameters for the decryption procedure. This header is sent along with the identification packet through the circular memory buffer to the security engine microprocessor internal RAM. Using the same public key algorithm as was utilized by the second computer, the security engine microprocessor of the first computer decrypts the first layer of encryption of the identification packet. The packet is then passed through the same linear congruency function that was used in the second computer, and using the secret identification number, the hash number is produced. Finally, the same hash number generating algorithm which was used to produce the hash number in the second computer is used to decrypt the hash number. This reveals the unencrypted identification parameters. The security engine microprocessor can then compare these parameters with those stored in the appropriate data base. If they are identical, this confirms the identity of the second computer.

What is claimed is:

1. An identification and security system for a personal computer having an operating system, said identification and security system comprising:
   a) a motherboard modified to include a security engine and enabling and disabling logic coupled to the security engine;
   b) a basic input output system (BIOS) coupled to said motherboard, said BIOS modified to allow a microprocessor within the security engine to take over control of a microprocessor for the personal computer coupled to the motherboard;
   c) a device driver layer (DDL) portion of said operating system modified to:
      1. prevent loading of device drivers unless an authorization code is present in an internal memory of said security engine;
      2. intercept all read and write operations to allow encryption and decryption of all data input to and output from said personal computer;
   d) a smart card reader coupled to said security engine for reading a smart card, said smart card for providing said authorization code.

2. The identification and computer security system as claimed in claim 1, wherein said modified motherboard comprises a means for controlling all the security functions of said computer; a means for enabling and disabling peripheral devices connected to said computer; a means for encrypting and decrypting all data moving through the bus system.

3. The identification and computer security system as claimed in claim 2, wherein said means for controlling the security functions of said personal computer comprises a microprocessor based security engine embedded in said motherboard.

4. The identification and computer security system as claimed in claim 3 wherein the microprocessor based security engine comprises a microprocessor with internal memory; external scratch memory; and a programming circuit for programming the internal memory of said security engine microprocessor.

5. The identification and computer security system as claimed in claim 3, wherein said internal memory contains encryption algorithms comprising a first algorithm for calculating hash numbers, a second algorithm for calculating an encryption key to be used for communications between the security engine microprocessor and said smart card system, a third algorithm for encrypting all application data, a fourth algorithm for altering said data, a fifth algorithm for encrypting data which is to be passed between at least two computers, and a sixth algorithm for performing a check for errors in the communications between said security engine and said smart card reader.

6. The identification and computer security system as claimed in claim 2, wherein said means for enabling and disabling peripheral devices comprises a plurality of enabling and disabling circuits embedded in said motherboard and connecting said peripheral devices and the security engine microprocessor.

7. The identification and computer security system as claimed in claim 2, wherein said means for encrypting and decrypting all data moving through the computer bus system under the control of said security engine microprocessor comprises a circuit with a programmable device and memory buffer connected to the computer bus system and the security engine microprocessor, and a header in said memory buffer which contains all parameters for a cryptographic procedure to be performed.

8. The identification and computer security system as claimed in claim 1, wherein said modified DDL creates a header for all encryption procedures for application data, creates a header for requesting identification from at least two computers, and creates headers for the decryption of identification requests received from said at least two computers.

9. The identification and computer security system as claimed in claim 1, wherein said modified BIOS comprises a first function which puts the motherboard Central Processing Unit into an endless loop upon power on or interrupt of the computer and passes control to the security engine microprocessor until all security procedures are performed, a second function which checks for the presence of said smart card upon power on, reset, or interrupt of the computer, and a third function which displays a security configuration set up screen and inputs user inputted data to the security engine scratch memory.

10. The identification and computer security system as claimed in claim 1, wherein said smart card reader is connected to the microprocessor of the security engine and a plurality of smart cards which contain internal memory, wherein one of said plurality of smart cards is identified to be a vendor card, at least one of said plurality of smart cards identified to be a user card, and an equal number of repair cards as user cards.

11. The identification and computer security system as claimed in claim 10, in which an internal memory of said vendor smart card is divided into two sections, a Key Management Area and an Identification area, wherein a parameter which sets the maximum key length for all cryptographic procedures is stored in the Key Management area and said key length parameter is passed to the internal memory of the security engine microprocessor when the vendor card is inserted into the card reader.

12. The identification and computer security system as claimed in claim 10, in which an EEPROM of the repair smart card is divided into two sections—a Key Management Area and a Restricted area wherein the Restricted area contains an index of files or directories that are to remain hidden when said repair smart card is inserted in the card reader of the computer system for which it was created.

13. The identification and computer security system as claimed in claim 10, wherein an internal memory of said user smart cards is comprised of ROM and EEPROM in which the EEPROM is divided into an Identification area for storing user identification data and a register of smart card identification codes; an Application area for the storage of data or programs by the user or outside agents; and a Key Management area for storing hash numbers, a communication key for communications between the security engine microprocessor and the smart card, and communication keys and identification codes for any applications which may be stored in the Application area and the ROM memory contains encryption algorithms comprising a first algorithm for calculating hash numbers, a second algorithm for calculating an encryption key to be used for communications between the security engine microprocessor and said smart card system, a third algorithm for encrypting all application data, a fourth algorithm for altering said data, a fifth algorithm for encrypting data which is to be passed between at least two computers, and a sixth algorithm for performing a check for errors in the communications between said security engine and said smart card reader; a look up table of commands and software which controls the security functions of the smart card.

14. A method of controlling access to a computer system and the data contained thereof comprising:

a. embedding a security engine comprising a microprocessor, scratch memory and a programming circuit connected to the security engine microprocessor in the computer system motherboard;

b. storing an algorithm for generating hash numbers in the internal memory of said microprocessor;

c. embedding a plurality of enable/disable circuits, connected to the security engine microprocessor and all peripheral devices in said motherboard;

d. embedding in said motherboard a memory buffer circuit comprising a programmable device and memory means connecting said security engine microprocessor and the ISA Bus;

e. embedding in said motherboard a memory buffer circuit comprising a programmable device and memory means connecting said security engine microprocessor and the PCI Bus;

f. connecting to the security engine microprocessor a smart card system comprising a smart card reader and at least one smart card which has more than one internal memory with a first memory containing an algorithm for creating hash numbers and a second memory having space for storing inputted data and the hash numbers created by the algorithm in the first memory;

g. replacing the standard BIOS with a modified BIOS which contains software routines that allow for the set up of the security configuration of the computer system, the input of user identification data and for the security engine microprocessor to take control of the start up of the computer system;

h. replacing the standard device driver layer of the computer system with a modified device driver layer, in which the modifications comprise the prevention of the loading of device drivers unless an authorizing code is present in the internal memory of the security engine microprocessor, the interception of all read and write procedures to enable the encryption and decryption of all data, the creation of a header for all encryption and decryption procedures for application data and the creation of a header for remote identification of said computer over a network;

i. personalizing said computer system and matching smart card by storing more than one hash number generated from identification information inputted by the user into the internal memory of the security engine microprocessor and complementary hash numbers into the second memory of the smart card;

j. authenticating the identity of a user upon attempted access to said computer system;

k. controlling access to said computer and peripheral devices;

l. securing all data stored in or moving through said peripheral devices through the use of cryptographic algorithms.

15. The method according to claim 14, wherein said smart cards comprises a plurality of smart cards, wherein one of said plurality of smart cards is identified to be a vendor card, at least one of said plurality of smart cards identified to be a user card, and an equal number of repair cards as user cards and the internal memory of said vendor smart card memory comprises a Key Management Area and an Identification area, wherein a parameter which sets the maximum key length for all cryptographic procedures for said computer system is stored in the Key Management area and which said key length parameter is passed to the internal memory of the security engine microprocessor when the vendor card is inserted into the card reader of the system for the first time.

16. The method according to claim 14, wherein a setup routine for the personalization of said computer identification and security system comprises the steps of:

a. inputting a plurality of identification data to the scratch memory of the security engine;

b. writing this data to the second memory of the smart card;

c. generating more than one hash number from the inputted identification data using the algorithm stored in the internal memory of said security engine microprocessor with the maximum key length of said algorithm determined by the key length parameter passed from said vendor card and stored in the internal memory of said security engine microprocessor;

d. burning the hash numbers to the internal memory of the security engine microprocessor using the programming circuit;

e. generating more than one hash number in the smart card using the complementary algorithm stored in the first memory using the identification data written to the second memory of the smart card;

f. writing the hash numbers to the second memory of the smart card microprocessor.

17. The method according to claim 14, wherein the authentication procedure for said computer identification and security system comprises the steps of:

a. checking by the security engine microprocessor, upon power on, reset or interrupt, the smart card reader for a valid smart card;

b. synchronizing communications between the security engine microprocessor and the valid smart card inserted in said smart card reader;

c. reading by the security engine microprocessor more than one hash number from the internal memory of the security engine and the complementary hash numbers from the second memory of the smart card if a valid smart card is inserted into the reader;

d. placing said hash numbers in the scratch memory of the security engine;

e. checking for a match between the security engine hash numbers and the smart card hash numbers using an authentication algorithm;

f. if a match exists, reading by the BIOS the security configuration for the computer, enabling all allowed peripheral devices, setting up cryptographic procedures for selected peripheral devices and allowing the loading of the computer operating system;

g. if a match does not exist, terminating the start up procedure.

18. The method according to claim 17, wherein the synchronization of communications between the smart card and the security engine microprocessor further comprises the use of communication keys unique to each computer and matching smart card that is generated from the hash numbers stored in the internal memory of the security engine microprocessor and the internal memory of said matching smart card.

19. The method according to claim 14, wherein the securing all data stored in or moving through said peripheral devices comprises the steps of:
   a. intercepting all read or write procedures in the device driver layer;
   b. creating a header in the device driver which contains all the parameters required for a cryptographic procedure;
   c. sending said header through the Bus system connected to the peripheral device which is involved in the read or write operation to the memory buffer circuit connected to said Bus system;
   d. reading said header and the encryption parameters stored in the memory of the security engine by the security engine microprocessor;
   e. reading of data to be encrypted or decrypted from the memory means of the memory buffer circuit by the security engine microprocessor;
   f. encrypting or decrypting said data and sending the altered data back to the memory means of the memory buffer circuit;
   g. sending said altered data to the appropriate peripheral device.

20. A method of uniquely personalizing a computer having a modified motherboard comprising a microprocessor based security engine, Flash memory in said microprocessor, scratch memory buffer in said security engine, an algorithm for generating hash numbers in the internal memory of said microprocessor and a programming circuit connected to the security engine microprocessor; a modified BIOS which contains software routines that allow for the set up of the security configuration of the computer system, the input of user identification data and for the security engine microprocessor to take control of the start up of the computer system; and a smart card system comprising a smart card reader connected to said security engine microprocessor and at least one smart card which has more than one internal memory with a first memory containing an algorithm for creating hash numbers which is a derivative of the algorithm in the security engine and a second memory having space for storing inputted data and the hash numbers created by the algorithm in the first memory; comprising the steps of:
   a. inputting a plurality of identification data to the scratch memory of the security engine;
   b. copying this data to the second memory of the smart card;
   c. generating more than one hash number from the inputted identification data in the security engine scratch memory using the algorithm stored in the internal memory of said security engine microprocessor;
   d. transferring all data from the security engine microprocessor flash memory to the memory buffer;
   e. burning the hash numbers and transferred data to the flash memory of the security engine microprocessor using the programming circuit;
   f. generating more than one hash number in the smart card using the algorithm stored in the first memory using the identification data copied to the second memory of the smart card;
   g. writing the hash numbers to the second memory of the smart card microprocessor.

21. The method according to claim 20, wherein upon the changing of said identification data said programming circuit is automatically updated by the writing of this data into the second memory of the smart card inserted into the card reader and the flash memory of the security engine.

22. The method according to claim 21, wherein the automatic updating of any changed identification data to the second memory of the smart card and the flash memory of the security engine microprocessor comprises the steps of:
   a. writing the contents of the security engine flash memory to the scratch memory;
   b. writing any changes made to the identification data to the identification look up table in the security engine scratch memory;
   c. writing any changes made to the identification data to the Identification area of the smart card internal memory;
   d. creating new hash numbers from the identification data by the smart card microprocessor;
   e. generating a new communication key for the smart card from the hash numbers;
   f. creating new hash numbers from the identification data by the security engine microprocessor;
   g. generating a new communication key for the security engine from the hash numbers;
   h. burning the contents of the scratch memory of the security engine to the flash memory.

23. A method for creating a hierarchy of subordinate computer systems in which the computer system used to create a subordinate system has access to said subordinate system, using more than one computer having a modified motherboard comprising a microprocessor based security engine, flash memory in said microprocessor, scratch memory connected to said security engine, an algorithm for generating hash numbers and an algorithm for generating a communication key in the internal memory of said microprocessor and a programming circuit connected to the security engine microprocessor; a modified BIOS which contains software routines that allow for the set up of the security configuration of the computer system, the input of user identification data and for the security engine microprocessor to take control of the start up of the computer system; a smart card system comprising a smart card reader connected to said security engine microprocessor and an equal number of smart cards as computers having more than one internal memory with a first memory containing an algorithm for creating hash numbers which is a derivative of the algorithm in the security engine and a second memory having space for storing inputted data, the hash numbers created by the algorithm in the first memory and a smart card identification code, of which one smart card is identified as 'used' having at least two unique hash numbers in its second memory and a second smart card is 'new' with no identification data or hash numbers in its internal memory; and at least one of said computers which contains no identification data in its security engine memory; comprising the steps of:
   a. inserting said used smart card into the card reader of the computer which has no identification data in its security engine memory;

b. writing one of said smart card's hash numbers to the scratch memory of the computer security engine;
c. creating a complement of said hash number;
d. creating a communication key from said hash number in the security engine;
e. writing said communication key to the security engine scratch memory;
f. inputting identification data to the scratch memory of the security engine;
g. inputting security configuration data to the scratch memory of the security engine;
h. creating two new hash numbers from the identification data in the scratch memory of the security engine;
i. writing the CK, two new hash numbers, and identification data and security configuration to the smart card inserted in the smart card reader;
j. ejecting the used smart card from the reader;
k. inserting a new smart card into the reader;
l. writing to said new smart card an identification code which identifies it as part of a subordinate system;
m. writing the hash number complement, identification data and security configuration to the new smart card;
n. calculating two new hash numbers, in the smart card, from the identification data;
o. creating a complement of the two hash numbers;
p. calculating a communication key from the complement of the hash number complement passed from the 'used' smart card;
q. writing the complement of the new hash numbers and the complement of the hash number passed from the 'used' smart card, and the communication key calculated by the new smart card to the internal memory of the new smart card;
r. writing all data in the security engine flash memory to the scratch memory;
s. burning the contents of the scratch memory to the security engine flash memory.

24. A method of identifying and authenticating, over a network, a uniquely personalized computer having a modified motherboard comprising a microprocessor based security engine, flash memory in said microprocessor, a look up table of personal identification data, a secret identification number which is the same for all computers containing this invention, in said flash memory; scratch memory in said security engine; an algorithm for generating hash numbers, a linear congruency function and a public key encryption algorithm in the internal memory of said microprocessor; a modified DDL that allows for the creation of headers; and a smart card system comprising a smart card reader connected to said security engine microprocessor and a personalized smart card which has internal memory with an Identification area for storing personal identification data and an Application area for storing external applications and an index for the location and identification codes for each application; and a data base of personal identification data for other personalized computers comprising the steps of:

a. a first personalized computer requesting identification through an application from a second personalized computer over a network comprising selected identification data from the second computer's identification data look up table and select information from the second computer's smart card;
b. a device driver in the second computer generating a header comprised of the identification task, the addresses of the identification parameters requested and the two byte code for any smart card application from which data is required and the location of said data;
c. sending this header to the security engine microprocessor;
d. reading of the identification data from the look up table in said security engine microprocessor flash memory;
e. reading of the identification data from the look up table of the internal memory of the smart card inserted in the smart card reader;
f. writing the retrieved identification data to the internal memory of the security engine microprocessor;
g. generating a hash number from the identification data stored in said internal memory;
h. passing said hash number through a linear congruency function using the secret identification number stored in flash memory;
i. encrypting the resultant number with the public key algorithm;
j. sending the encrypted data to the first computer;
k. the receiving application of the first computer calling a device driver to decrypt the data;
l. the device driver creating a header comprising the parameters for the decryption procedure;
m. sending this header with the encrypted data to the internal memory of the first computer's security engine microprocessor;
n. decrypting the data using the public key algorithm stored in the flash memory of the first computer;
o. passing the resultant data through the linear congruency function to produce the hash number generated by the second computer and the secret identification number;
p. decrypting the hash number using the hash number generating algorithm stored in the flash memory of the first computer;
q. comparing the identification data with that stored in the data base;
r. confirming the identity of the second computer if the data matches.

* * * * *